United States Patent [19]

Shostak

[11] Patent Number: 5,694,608
[45] Date of Patent: Dec. 2, 1997

[54] NON-MODAL DATABASE SYSTEM WTH METHODS FOR INCREMENTAL MAINTENANCE OF LIVE REPORTS

[75] Inventor: Robert Shostak, Portola Valley, Calif.

[73] Assignee: Borland International, Inc., Scotts Valley, Calif.

[21] Appl. No.: 379,225

[22] Filed: Jan. 27, 1995

[51] Int. Cl.⁶ .................................................. G06F 15/62
[52] U.S. Cl. ........................................ 395/767; 395/768
[58] Field of Search .................................. 395/148, 767, 395/768, 769; 385/149

[56] References Cited

U.S. PATENT DOCUMENTS

| | | | |
|---|---|---|---|
| 4,710,763 | 12/1987 | Franke et al. | 340/723 |
| 4,733,354 | 3/1988 | Potter et al. | 364/415 |
| 4,821,211 | 4/1989 | Torres | 364/521 |
| 4,831,580 | 5/1989 | Yamada | 364/900 |
| 4,866,634 | 9/1989 | Reboh et al. | 364/513 |
| 4,912,669 | 3/1990 | Iwamoto et al. | 364/900 |
| 4,945,475 | 7/1990 | Bruffey et al. | 364/200 |
| 4,956,773 | 9/1990 | Saito et al. | 364/200 |
| 4,982,344 | 1/1991 | Jordan | 364/521 |
| 4,984,180 | 1/1991 | Wada et al. | 364/518 |
| 5,008,810 | 4/1991 | Kessel et al. | 364/200 |
| 5,047,960 | 9/1991 | Sloan | 364/523 |
| 5,092,868 | 2/1992 | Pickens et al. | 395/155 |
| 5,179,652 | 1/1993 | Rozmainth et al. | 395/155 |
| 5,208,907 | 5/1993 | Shelton et al. | 395/149 |
| 5,293,615 | 3/1994 | Amada | 395/600 |
| 5,339,392 | 8/1994 | Risberg et al. | 395/161 |

FOREIGN PATENT DOCUMENTS

| | | |
|---|---|---|
| 0 211 151 | 2/1987 | European Pat. Off. . |
| 86105483.1 | 2/1987 | European Pat. Off. . |

OTHER PUBLICATIONS

Butterworth, M., *Forms Definition Methods*, 5th Annual Conference on Computers and Communication, Mar. 1986, pp. 708–712.

*dBASE IB for Developers, Programming with dBASE IV*, Ashton–Tate Corporation, 1988, 1990, pp. 3-9 to 3-12.
DeMaria, Rusel and Fontane, George, *Working with dBASE Mac*, 1988, pp. 94–134 and 155–183.
Duncan, Ray, *Building and Basic Structure of a Windows Help File*, PC Magazine, May 11, 1993, pp. 349–350 and 353–354.
Duncan, Ray, *Constructing Your Own Windows Help Files*, PC Magazine, Apr. 27, 1993, pp. 325–326 and 328–329.
Duncan, Ray, *Four Techniques to Enhance Your Windows Help Files*, PC Magazine, Jun. 15, 1993, pp. 359–361.
Duncan, Ray, *Implementing Macros In Your Help Files*, PC Magazine, Jun. 29, 1993, pp. 326–329.
Duncan, Ray, *Integrating a Windows Help File Into an Application*, PC Magazine, May 25, 1993, pp. 343–344, 348, 350 and 354.
Fersko–Weis, Henry, *3–D Reading With The Hypertext Edges*, PC Magazine, May 28, 1991, pp. 241–242, 244, 247 and 267.
Gehani, N., *High Level Form Definition in Office Information Systems*, The Computer Journal, vol. 26, No. 1, Feb. 1993, pp. 52–59.

(List continued on next page.)

Primary Examiner—Heather R. Herndon
Assistant Examiner—Sabrina Dickens
Attorney, Agent, or Firm—John A. Smart; David N. Slone

[57] ABSTRACT

Non-modal database system having methods for incremental maintenance of live views is desribed. The database system maintains a single-context workspace throughout an entire user session; here, the user creates a base document (database) for storing user-supplied information. In a typical session, the user takes "views" of the base document, for presenting the information according to a user-selected format and according to user-specified criteria (if desired). More particularly, the system maintains "live" views of the data so that all views of a particular base document (or documents) reflects at all times the state of the underlying data. By employing "incremental queries," the system of the present invention can at all times maintain the "liveness" of user-designed forms and reports, all without having to re-execute queries or re-paginate reports.

34 Claims, 56 Drawing Sheets

OTHER PUBLICATIONS

Knuth, Donald E., *The Art of Computer Programming*, Addison–Wesley Publishing Co., Inc., 1973, pp. 451–480.

*Language Reference, Appendix E: Structure of a Database (.dbf) File*, Ashton–Tate Corporation, 1988, 1990, pp. E–1 to E–4.

*Microsoft Visual Basic Version 3.0 Programmer's Guide, Chapter 2: Your First Visual Basic Application*, Microsoft Corp., 1993, pp. 15–30.

Mischel, Jim, *A Guide To Windows Help*, PC Techniques, Feb/Mar. 1993, pp. 14–31.

Miyao et al., *Visualized and Modeless Programming Environment for Form Manipulation Language*, 1989, pp. 99–104.

*Paradox 3.5 Handbook; Third Edition*, Oct. 1991, Bantam Books, pp. 1–4, 77–111 and 817–841.

Pezold, C., *Dynamic Data Exchange (DDE)—Chapter 17, Programming Windows, Second Edition*, Microsoft Press, 1990, pp. 809–840.

*Reflux User's Guide, Chapter 1: Creating and Modifying a Database*, Borland International, Inc., 1984, 1989, pp. 7–36.

Shu, Nan C., *Visual Programming*, 1988, pp. 16–31, 142–147, 150–151, 202–209, 222–229, 234–237, and 264–283.

Smith, David N., *Visual Programming in the Interface Construction Set*, 1988, pp. 109–120.

*TM/1 Relational Spreadsheet Release 3.0*, Sinper Corp., Warrenton, NJ, 1987, pp. 1–1 through 8–7.

Townsend, C., *Mastering dBASE IV Programming, Chapter 20: Using Memo Fields*, Sybex, Inc., 1989, pp. 331–342.

NON-MODAL DATABASE SYSTEM WITH METHODS FOR INCREMENTAL MAINTENANCE OF LIVE REPORTS

RELATED APPLICATIONS

The present application is related to co-pending application Ser. No. 08/379,226, filed on Jan. 27, 1995 and now pending.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to end-user data processing systems, such as a PC Database Management System (PC DBMS).

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand.

In 1970, Dr. E. F. Codd invented the "relational model", a prescription for how a DBMS should operate. The relational model provides a foundation for representing and manipulating data, that is, a way of looking at data. The model includes three basic components: structure, integrity, and manipulation. Each will be briefly described.

The first of these, structure, is how data should be presented to users. A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Ideally, data in a relational system is perceived by users as tables and nothing but tables. This precludes the user from seeing explicit connections or links between tables, or having to traverse between tables on the basis of such links. It also precludes user-visible indexes on fields and, in fact, precludes users from seeing anything that smacks of the physical storage implementation. Thus, tables are a logical abstraction of what is physically stored.

The integrity aspect, on the other hand, dictates that every relation (i.e., table) should have a unique, primary key to identify table entries or rows. The integrity of the data for the user is of course crucial. If accuracy and consistency of the data cannot be achieved, then the data may not be relied upon for decision-making purposes.

Data manipulation, the last component, may be thought of as cut-and-paste operators for tables. Data manipulation is of course the purpose for which databases exist in the first place. The superiority of manipulating tables relationally (i.e., as a whole, or sets of rows) is substantial. Users can combine data in various tables logically by matching values in common columns, without having to specify any internal details or the order in which tables are accessed; this provides users with a conceptual view of the database that is removed from the hardware level. Non-relational DBMSs, in contrast, require complex programming skills that form an inherently unreliable means to interact with databases.

The general construction and operation of a database management system is known in the art. See e.g., Date, C., *An Introduction to Database Systems*, Volume I and II, Addison Wesley, 1990; the disclosures of which are hereby incorporated by reference.

Today, relational systems are everywhere—commonly seen operating in corporate, government, academic settings, and other shared environments. A typical installation will employ one of the popular UNIX-based RDBMS running on a minicomputer. By submitting queries to the DBMS from a remote terminal (e.g., using a SQL "query editor"), users are often able to handle many of their own data processing needs directly. Thus, relational technology is not only just another way to build a database system, but it also offers a set of underlying principles that provide very direct practical benefits to the user.

The strong theoretical underpinnings of relational systems which account for their superior design over prior non-relational systems have also created some unexpected problems. With the ever-increasing trend towards "down-sizing," more and more data processing tasks are being moved off mainframes and minicomputers and onto desktop PCs, often operating in a Local Area Network (LAN). Although relational systems are easier for database-savvy users to use (e.g., for querying), they are by no means easy for untrained users. And with the movement of data processing chores to desktop PCs, ordinary PC users are nevertheless often faced with the responsibility of designing and implementing a database system, one having the reliability and integrity typically associated with a relational system.

Consider the following issues attendant to setting up a relational database management system (RDBMS). Tables in a relational system are not just any tables but are, instead, special "disciplined" tables. Relational systems require, for instance, that tables not store duplicates (so that each row may be uniquely identified by one or more column values). Thus, relations or "R-tables" are subject to particular constraints, such as "first normal form." As another example, to preserve simplicity and take advantage of relational operations, database tables should not contain "repeating groups"—that is, multi-valued columns. Such multi-valued columns remove table resemblance to relations and thus prevent tables from taking advantage of the latter's mathematical properties. Instead, relational tables should contain only single-value cells or "atomic" data values. Thus while relational tables are simple and flexible in theory, they nevertheless entail rigorous constraints which must be obeyed to implement them in practice.

While trained database administrators have the expertise to tackle such issues, ordinary PC users for the most part have received no formal data processing education. They cannot be expected to be familiar with such seemingly esoteric concepts as "joins," "one-to-many relations," "foreign keys," or any of the other myriad of issues which must be considered when applying the relational approach to database management.

All told, relational database products have over time become more and more advanced. And technical advances have been largely in the area of adding advanced features, thus making these products more and more complicated. In essence, advances in the art have resulted in these products becoming more-advanced developer tools which are increasingly difficult for ordinary end-users to use. At the same time, there exists a large market of users who are not database developers yet have problems which cannot be solved using low-end, flat-file database programs (e.g., Approach® and FilePro®).

The previously-described relational model in particular poses a problem with lowering the learning curve for users. Although the relational model undoubtedly simplifies numerous design considerations, the model is not particularly easy to grasp by ordinary users. Users typically start out with an intuition about what they want as a general database design. Then, however, users must go through a tedious process of figuring out what the underlying tables are that comprise the application, determining key fields and linking them, and making sure that database normalization rules are not violated.

What users really want is not to deal with a set of disciplined tables but, instead, the ultimate forms and reports that users have envisioned in their minds. Moreover, the forms and reports desired by users often contain nested structures (e.g., multi-table reports), yet users do not want to be concerned with the nested structures themselves, such as how to link a Customer table to an Orders table. And, in fact, forms and reports often have several levels of nesting and summary information.

If a user employs the relational approach to build applications, he or she is faced with tearing the problem apart—doing normalizations and figuring out a set of tables—and then resynthesizing his or her intuition, for producing queries, designing multi-table forms and reports, and the like. For reports, for example, users are forced to use a very complicated abstraction called "bands." Bands in a report generator are supposed to represent, in some sense, the nested structure of the desired report. But the approach is artificial: the user cannot instantly see what he or she is getting (i.e., it is not "live" or WYSIWYG—"what you see is what you get"). Expectedly, users often have a difficult time obtaining satisfactory results with banded report writers.

What is needed is a new approach for a user to develop an application. In particular, the user should not be required to understand or to even know about low level details, such as normalizing a database, linking tables via foreign keys, defining key fields, and the like. Since a user already has in his or her mind a good idea what the desired forms and reports should look like, such a system should provide an intuitive, visual paradigm for creating the application. In this manner, the user may focus on objects which are very visual in nature and easy to understand at the top level, thereby providing a better match with the user's understanding of what he or she is doing. The present invention fulfills this and other needs.

SUMMARY OF THE INVENTION

The relational model to database design, commonly employed by present day end-user database systems, is not easy for ordinary users to grasp. For instance, ordinary users cannot be expected to be familiar with advance database concepts, such as "joins," "indexes," "one-to-many relations," and the like. The present invention recognizes that users should not be required to understand (or even know about) low-level details, such as indexes, keys, and the like. The present invention recognizes that, since users already have a good idea what forms and reports they would like, a database system can provide an intuitive, visual paradigm for creating database applications. In particular, such a system leverages the user's knowledge of how he or she wishes data to be maintained and presented (e.g., in forms and reports).

The present invention, which may be implemented on a general-purpose digital computer, comprises a non-modal database system having methods for incremental maintenance of live views. In an exemplary embodiment, the database system provides a user interface having a central work surface or canvas, which is employed throughout the entire user session for displaying and manipulating system objects. In particular, the interface eschews the notion of different "modes" or subsystems of operation. Instead, the system maintains a single-context user interface, where all user activities are undertaken.

Four top-level document types are supported in the worksurface: Cards (forms), Tables, Pages (reports), and Towers (vertically-stacked cards). In system operation, the user proceeds by creating a document object, such as a Tower view. The user proceeds to populate the document with data fields, such as placing last name and first name fields on the document. For this purpose, text, numeric, date, and calculated field types are provided by the system. As the system is non-modal, however, the user may at any time enter actual data, such as entering a particular last name.

The action of placing a field on a form, such as a text field, accomplishes three things: the user creates structure, creates layout, and adds real data—all without having to enter various subsystems (as required by prior art systems). The system of the present invention, therefore, does away with separate modes for form creation and data entry. Instead, the user is presented with a uniform data structure—a unification of forms and reports—which he or she may modify as desired at any time (e.g., for changing layout and/or data content).

The system of the present invention provides "live" views of the central document; a live view may be thought of as an incremental query, which at all times reflects the true state of data in underlying tables. The notion of an incremental query is that if a new record is added to the system, or an old record is deleted, or an existing record is modified, the system, rather than re-doing or re-processing the query in order to produce a new answer, is able to do just enough work to reflect the modification. A "View" itself is a view or window on the data of the base document. If desired, the user can confine a View to include only a particular selection of data (e.g., records only meeting a certain user-specified condition) from the underlying document. In a preferred embodiment, user-supplied criteria are entered using Annotation Bubbles. Specifically, the user employs an Annotation tool to select fields for defining a filter or selection condition (for the particular view).

In addition to simple views, the user can create "views of views," to any arbitrary level of nesting. In this fashion, a view can be further refined by taking a view of that view. This feature of the present invention affords an intuitive, yet powerful, approach to creating complex queries. Moreover, since all views and documents remain "live" the user can at any time make modifications on-the-fly, with his or her changes immediately effected by the system.

The system of the present invention also provides incremental maintenance of reports which, because they are paginated objects, can be quite complex. In prior art systems, the only way to determine the effect of record modification on pagination was to completely re-run the report. In the system of the present invention, in contrast, size information or "record geometries" is captured in the underlying table(s). Specifically, record geometries are stored in an accompanying B-tree which may then be used to render a particular page in a report (much in the same manner that index "keys" in a B-tree are used to locate quickly a particular record by search criteria).

Since the user can easily visualize the nested structure, the approach simply, more intuitive. Quite simply, there is no need for the user to reconstitute the nested structure using tools which are not properly suited for that task, such as using query-by-example (QBE) to create an aggregate. With this approach, the system of the present invention allows users without database training or knowledge to easily create queries having nested structures, such as aggregates. And since all documents and views remain "live" at all times, the user can add additional data (e.g., adding new Orders to the Shostak customer record) at any time.

The end user is not burdened with understanding technical concepts, such as having to open a table relative to a particular index. In the system of the present invention, those technical concepts are simply not surfaced to the end user.

DETAILED DESCRIPTION OF A PREFERRED EMBODIMENT

The following description will focus on the presently preferred embodiment of the present invention, operative in the Microsoft® Windows environment, which is an event-based system operating on an Intel-compatible computer system. The general operation of an event-based system, such as Windows, is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

The present invention is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments operative in Microsoft Windows is for purposes of illustration and not limitation.

General Architecture

Figure 1:
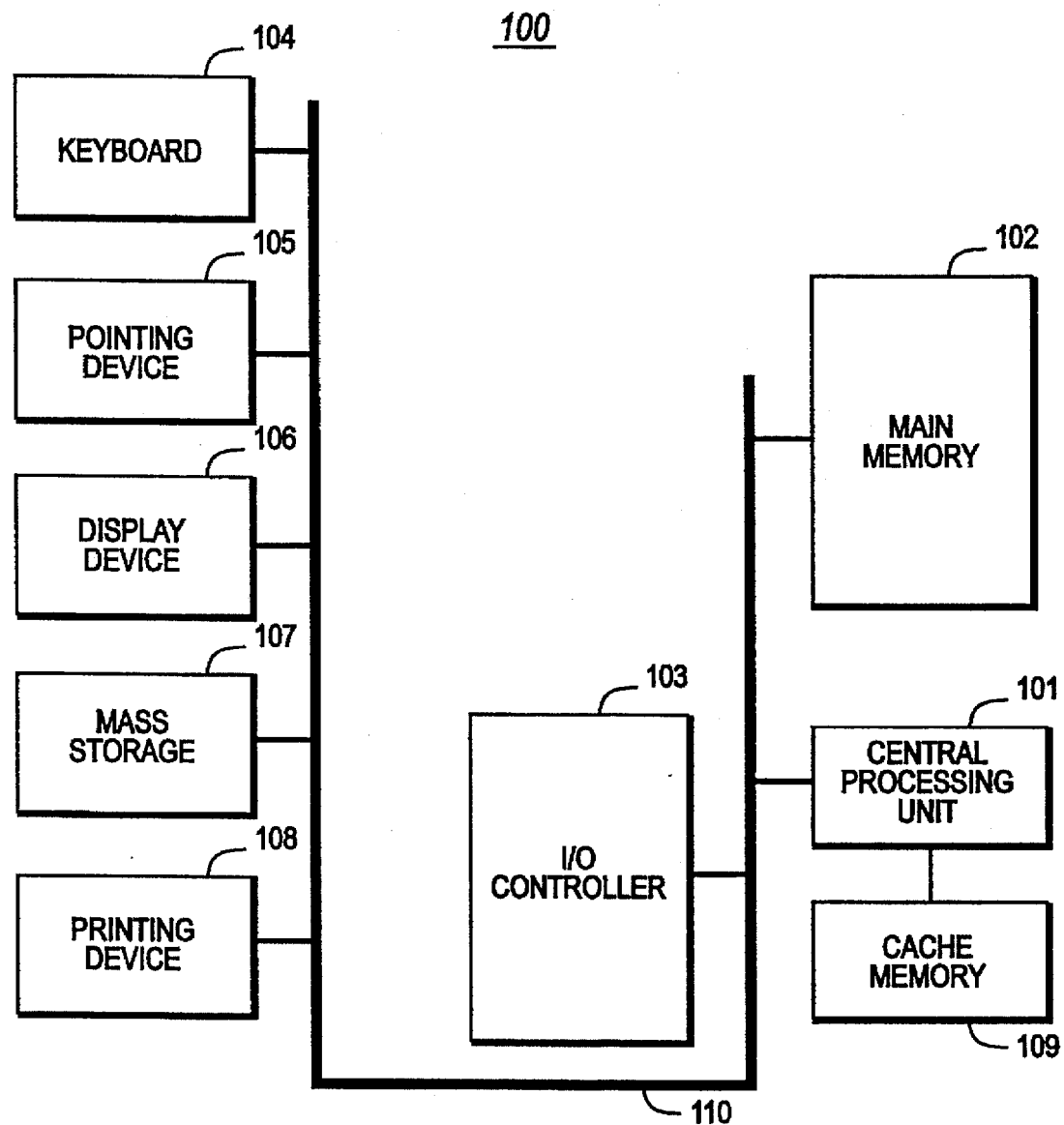
FIG. 1 is a block diagram illustrating a computer system in which the present invention may be implemented.

The present invention may be embodied on a computer system such as the system 100 of FIG. 1, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown. In a preferred embodiment, the computer system 100 includes an IBM-compatible personal computer, which is available from several vendors (including IBM of Armonk, N.Y.).

Figure 2:
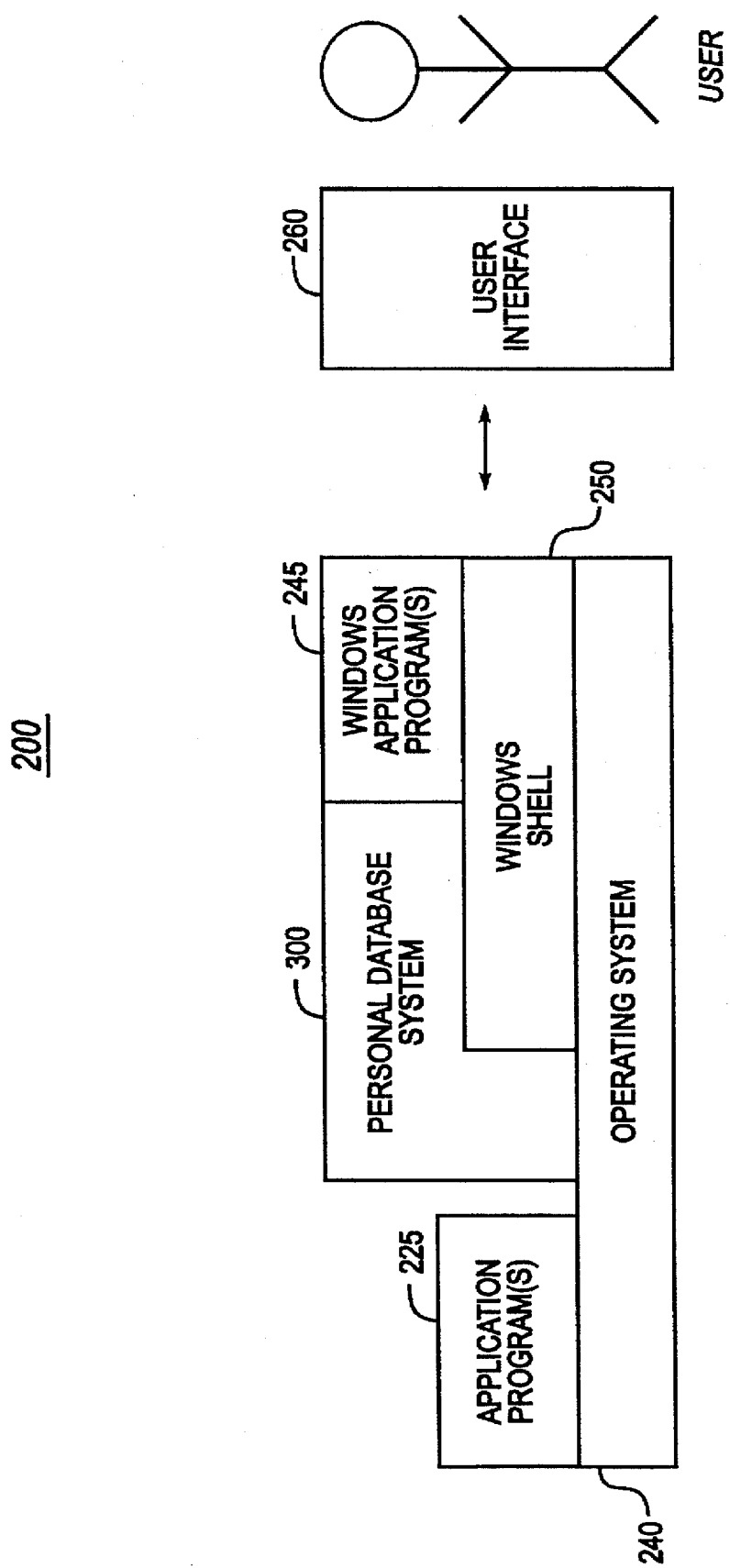
FIG. 2 is a block diagram illustrating a software subsystem for controlling the operation of the system of FIG. 1, the software subsystem including a personal database system of the present invention.

Illustrated in FIG. 2, a computer software system 200 is provided for directing the operation of the computer system 100. Software system 200, which is stored in system memory 102 and on disk memory 107, includes a kernel or operating system (OS) 240 and a windows shell 250. One or more application programs, such as application software 225 or windows application software 245, may be "loaded" (i.e., transferred from storage 107 into memory 102) for execution by the system 100.

System 200 includes a user interface (UI) 260, preferably a graphical user interface (GUI), for receiving user commands and data. These inputs, in turn, may be acted upon by the system 100 in accordance with instructions from operating module 240, Windows 250, and/or application modules 225, 245. The UI 260 also serves to display the results of an operation, whereupon the user may supply additional inputs or terminate the session. Although shown conceptually as a separate module, the UI is typically provided by windows shell 250, operating under OS 240. In a preferred embodiment, OS 240 is MS-DOS and windows 250 is Microsoft® Windows; both are available from Microsoft Corporation of Redmond, Wash.

System 200 also includes a Personal Database System 300 of the present invention, as shown. The detailed operation and construction of the system 300 will now be described.

Non-modal Database System

A. General Design Considerations

In a software product that non-programmers are able to master, a user tends to deal with a single data structure during his or her session with the product. In an electronic spreadsheet product, for instance, the user basically deals with just a set of spreadsheet cells. Similarly, in a word processor, a user basically deals with a document—a single kind of data structure—during his or her session with the product.

With conventional database products, in contrast, a user must contend with a lot of different subsystems, depending on what phase of this complicated process of synthesizing an application he or she is at. A user would, for instance, start out with creating one or more database tables using a "table create" mode. There, the user would name the fields and field types for the various tables. Once done with that, the user would then have to learn how to use a query subsystem, such as "Query-by-Example" (QBE) to specify how the tables are linked together. After learning that abstraction, the user would then have to learn another subsystem to figure out how to do reports.

Even after all that is done, the user has not yet finished. Typically, some amount of scripting is required to get the various components of the application to work. After some data entry, for instance, it may be necessary to execute a script for regenerating a set of reports. In sum, conventional database systems are built around multiple subsystems, each of which requires the user to learn about new kinds of interactions and objects (in addition to understanding the paradigm as a whole).

The present invention unifies the notion of a form, a report, and a query so that the user need only deal with a single kind of document or object throughout his or her session with the product. This central data object is referred to herein as a database document.

B. Preferred Interface

1. Modeless user interface

Figure 3A:
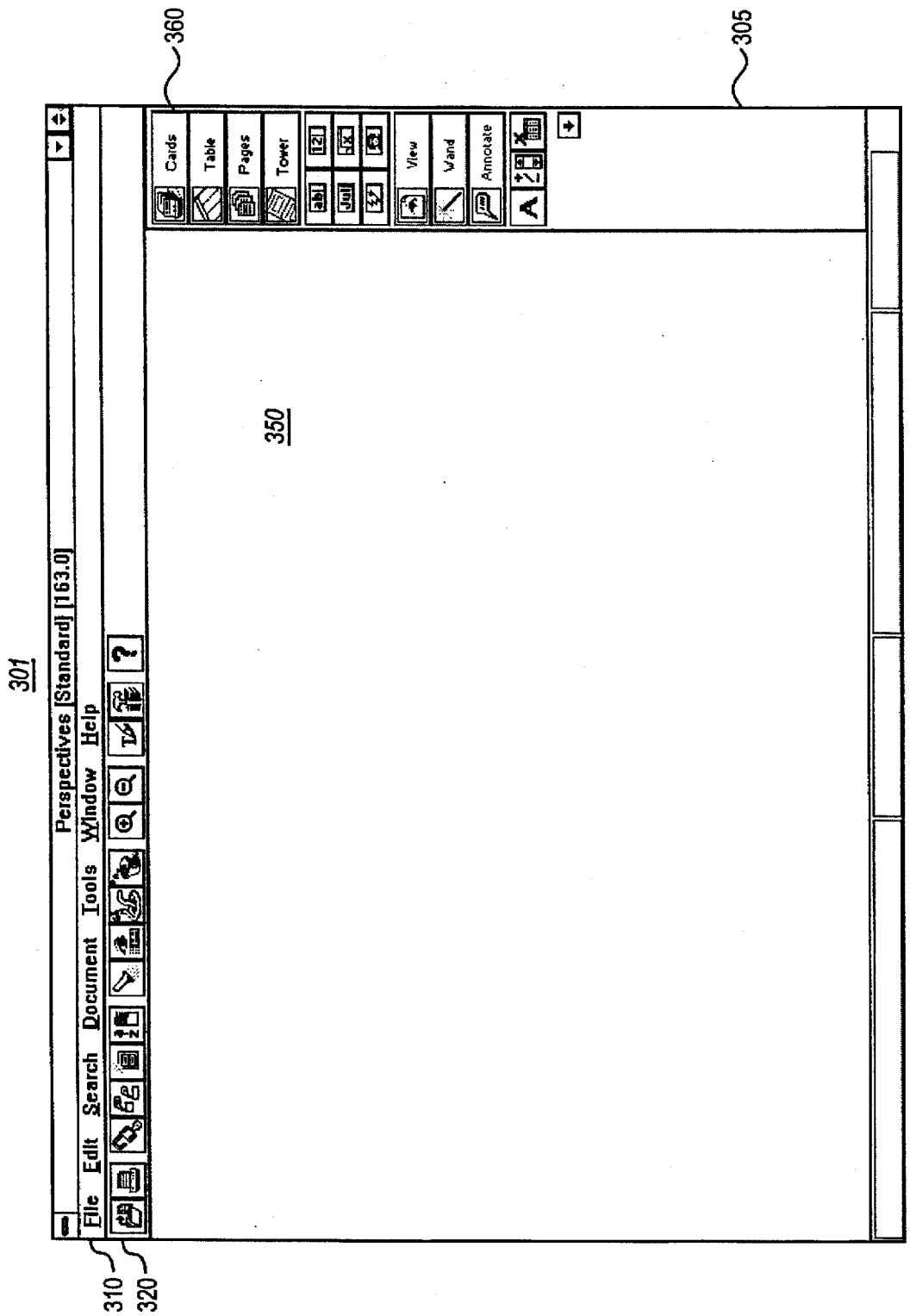
FIG. 3A is a bitmap screenshot illustrating a preferred interface for the personal database system of FIG. 2.

As illustrated in FIG. 3A, the database system 300 of the present invention includes a preferred user interface 301. The interface 301 comprises a main window having a Menu bar 310, Toolbar 320 and Tool Palette 360. The Menu bar 310 includes user-selectable menu choices for invoking operations of the system. The interface 301 also includes a work surface or canvas 350, which is employed for all displaying and manipulating data objects.

Figure 3B:
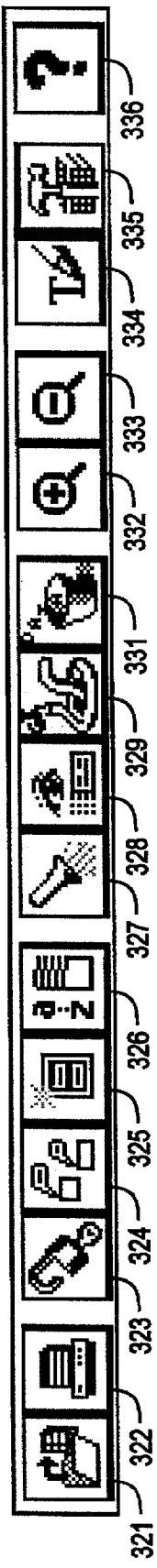
FIGS. 3B–C are bitmap screenshots illustrating detailed views of a toolbar and a tool palette from the preferred interface of FIG. 3A.

Shown in further detail in FIG. 3B, Toolbar 320 includes an array of screen buttons for one-click access to system commands. Open Document tool 321 opens a document (from a storage device). Print tool 322 sends user-selected documents to a printer, for generating a printed report. Design Lock tool 323 serves as a toggle for locking and unlocking a design. Annotate tool 324 is also a toggle; it toggles the display of Annotation Bubbles (described below) on and off. Style tool 325 allows the user to apply predefined styles (e.g., predefined color and shading schemes). Sort tool 326 invokes a Sort dialog, thus allowing the user to specify a new sort order. Search tool 327 allows the user to search for a specific record, according to user-supplied criteria. View tool 328 creates a new "view" (described below) of the currently selected document. Hose tool 329 flows data from one document to another. Empty tool 331 empties all data from a user-selected document. Zoom and Unzoom tools 332, 333 zoom in and zoom out the current view, respectively. Text Style tool 334 invokes a sub-toolbar having options for changing the font of a selected text object. Toolbox tool 335 is a toggle which displays or hides the Tool Palette 360. Finally, the toolbar 320 terminates with a Help tool 336, for providing context-sensitive help.

Figure 3C:
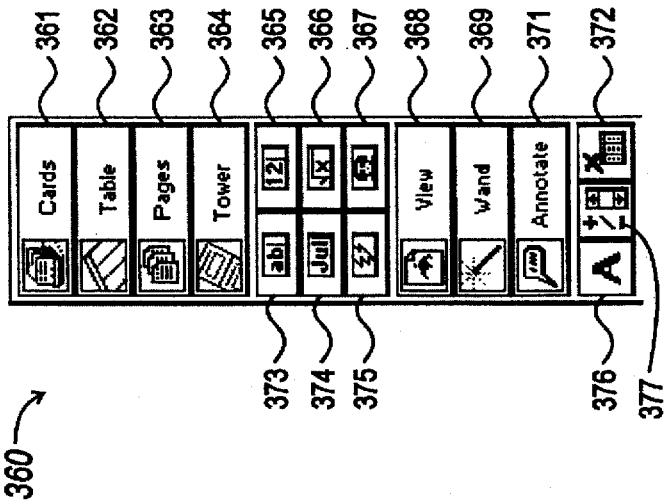

Shown in further detail in FIG. 3C, Tool Palette 360 comprises tools which directly create or manipulate documents of different types. Cards or Form tool 361 creates a card-oriented object in a document. Table tool 362 creates a table object in a document. Pages or Report tool 363 creates a report-formatted document. Tower tool 364 creates a vertical card stack, a "Tower," view of data. Text Field tool 373 is used to draw a text field on a document. Similarly, Numerical Field tool 365 is used to create a numeric field, and Date Field tool 374 is used to create a date field. Calculate Field tool 366 creates a "calculated field"—a field which derives its values based on the values stored in other fields. OLE Field tool 375 accommodates Microsoft Windows OLE (Object Linking and Embedding) objects. Bitmap tool 367 allows the user to place bitmaps in a document.

View tool 368, when invoked, creates a new "view" of a user-selected document. Magic Wand tool 369 allows the user to specify a new format (e.g., columnar layout) for a user-selected object. Annotate tool 371 is used to create an annotation (described below) for an object. Literal Text tool 376 places literal text on a document and is used, for instance, to create headings and subheadings. Scrollbar Toggle tool 377 toggles the display of scrollbars on and off. Finally, Delete Object 372 allows the user to remove selected objects.

In the system of the present invention, there are four top-level document types: Cards (forms), Tables, Pages (Reports), and Towers. A Card or form is an alternate presentation or view of a table's data. A multi-table form, for instance, can display data from several tables at once. For example, a user can create a form that displays one record at a time, displays multiple records at a time, displays only certain fields of a table, displays design features (e.g., lines, boxes, graphic images, shading, or special color), or the like.

Forms can link together different tables, so that information stored in separate tables appears to the user to come from one place. Thus, forms are editing tools which let the user display and edit data in his or her tables.

Pages or reports, on the other hand, are printing tools. They allow the user to format and print his or her data. A user can, for example, use pages to create form letters, mailing labels, invoices, and the like. Thus, while tables are the objects that users will use the most in the system, users will often want to display information in a format which is not tabular.

Thus an "application" in the system comprises a set of "documents" which may be viewed as forms or reports. Each document can be named by the user (e.g., "Customer Orders"). Collectively, the set documents represent a "project." The project itself preferably receives a name which serves as a file name for storing the project to a storage device.

As will be evident throughout the various examples which follow, the present invention eschews the notion of subsystems or modes and, instead, maintains the workspace 350 throughout the entire user session. Thus at all times, the user is presented with a single workspace and a succinct collection of tools with which to work.

2. Layout creation

Figure 4A:
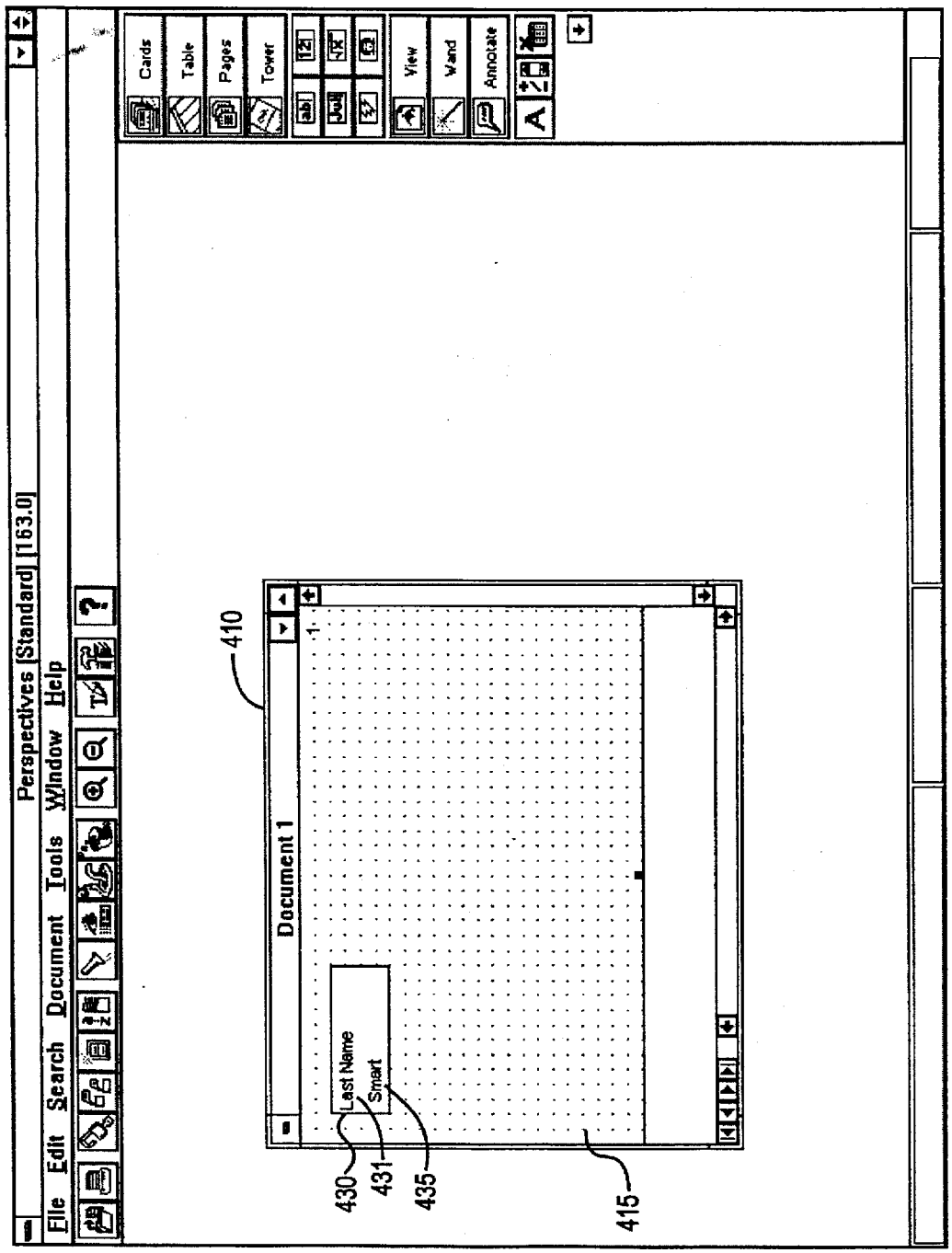
FIGS. 4A–C are bitmap screenshots illustrating operation of the system for creating a simple database application, such as an order entry system.

Operation of the system will now be illustrated by way of example. Consider, for instance, creation of an order entry system. Using the system of the present invention, the user would proceed as follows. Upon selecting the Tower Button (364), the system creates a document object 410 having a Tower view 415, as shown in FIG. 4A. Next, the user proceeds to populate the document with data fields. For an order entry system, for instance, the user may wish to track the customer's name. Accordingly, the user would select one of the field tools from the text, numeric, date, and calculated field types. For the example at hand, the user selects text field type (373) and then "draws" a text field (e.g., using conventional GUI technique). In response, the system displays a rectangular box at 430, for indicating the field. The user may immediately proceed to provide a name for the field, such as "Lastname" 431, as shown. Moreover, the user may immediately proceed to enter actual data, such as the last name of "Smart" at 435, as shown. The action of placing the text field on the form accomplishes three things: the user has created structure, created layout, and added real data.

Figure 4B:
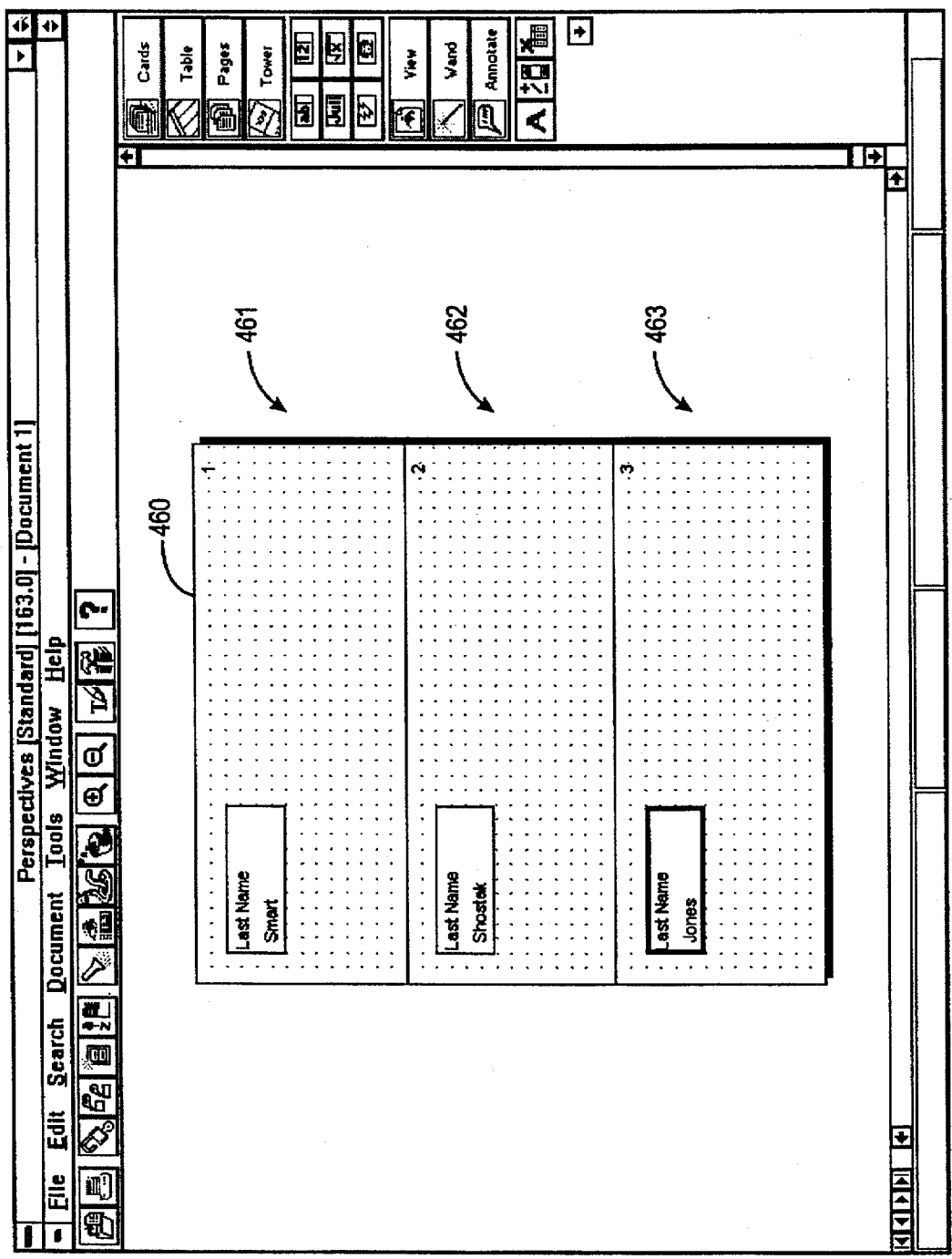

Since the system of the present invention remains modeless throughout the user session, the user may at any time add data to the document. Thus in going from the form view 410 of FIG. 4A to the form view 460 in FIG. 4B, the user simply enters new names "Shostak" and "Jones". Since a Tower view has been previously selected by the user, the system displays new records corresponding to the just-entered last names, namely record 2 (shown at 462) and record 3 (shown at 463). Thus as shown at this point in the example, the system has done away with separate modes for form creation and data entry. Instead, the user is presented with a uniform data structure which he or she may modify as desired (e.g., for changing layout and/or data content).

The reader should particularly note that, unlike conventional systems where a user is forced to enter a "create" subsystem for creating fields on a form, the system of the present invention allows the user to create structure on-the-fly, through direct interaction with the underlying data source. As demonstrated above, this step may be intermixed with data entry, if desired. Although the user can invoke various visual cues of the system, such as the resizing grid shown in the figure, these cues may be toggled on or off at any time during operation of the system. In other words, since the system operates without any notion of modality, visual queues are available at any time and are not associated with a particular "mode" of the system.

Figure 4C:
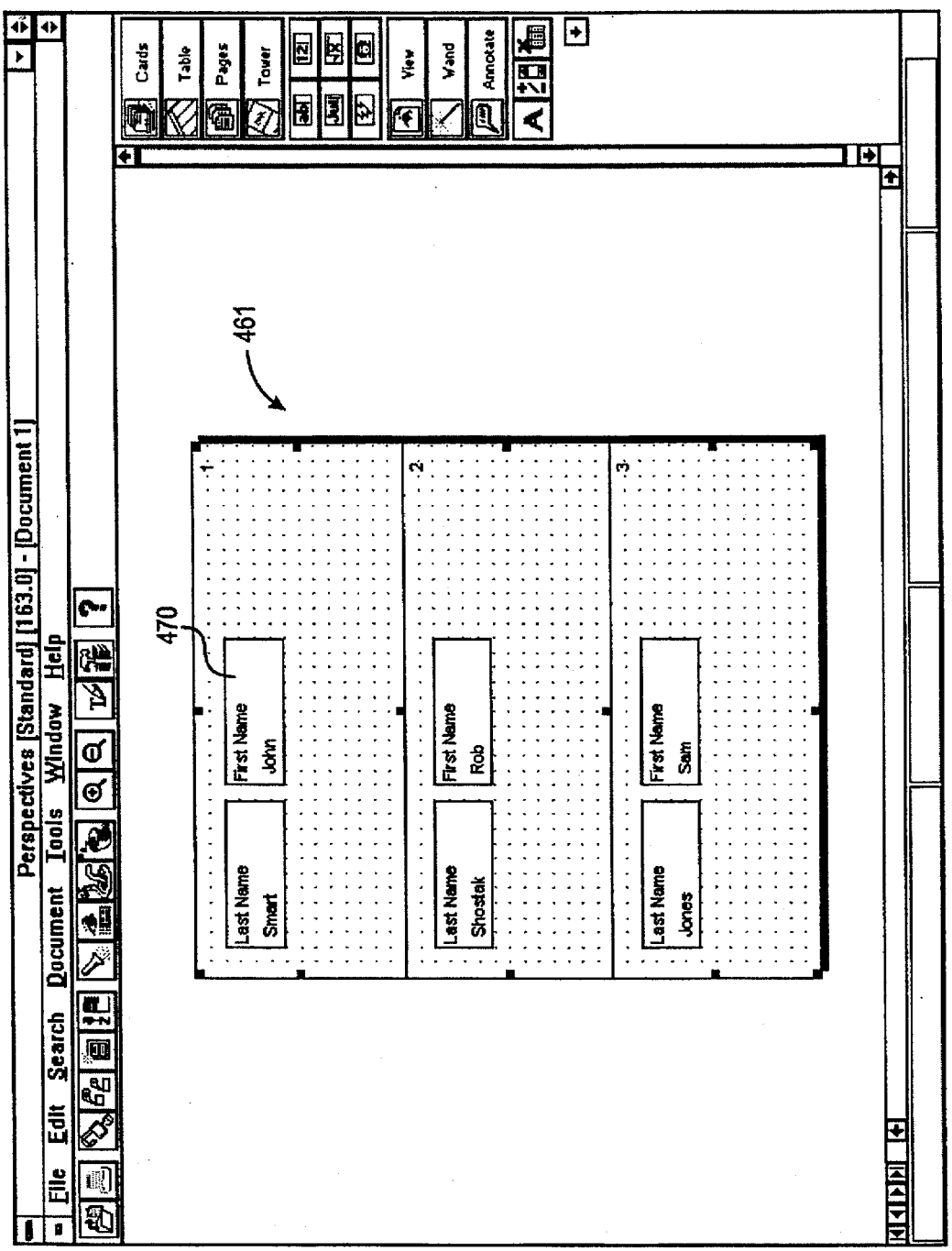

Continuing with the example, FIG. 4C illustrates placement of a second field, "First Name" field 470. This field is created in a manner similar to that described for "Last Name" field 430. Specifically, the user selects Text field tool (373) and draws field 470 on the record 461; as shown, the user names the field "First Name". Immediately, the First Name field appears in other records of the Tower view (i.e., record number 2 and record number 3). At any time throughout the process, the user can enter data into the First Name field, such as "John" shown at field 470.

As previously mentioned, the example at hand is an order entry system, that is, one which shows one or more orders for a given customer. In a conventional system, such as a relational database system, a user would first create a Customer table, next create an Orders table, and then link the two tables together using a foreign key (e.g., via customer ID). In the system of the present invention, in contrast, there are no such steps. Instead, the user simply creates a table as a sub-document directly on the central data object.

Figure 5A:
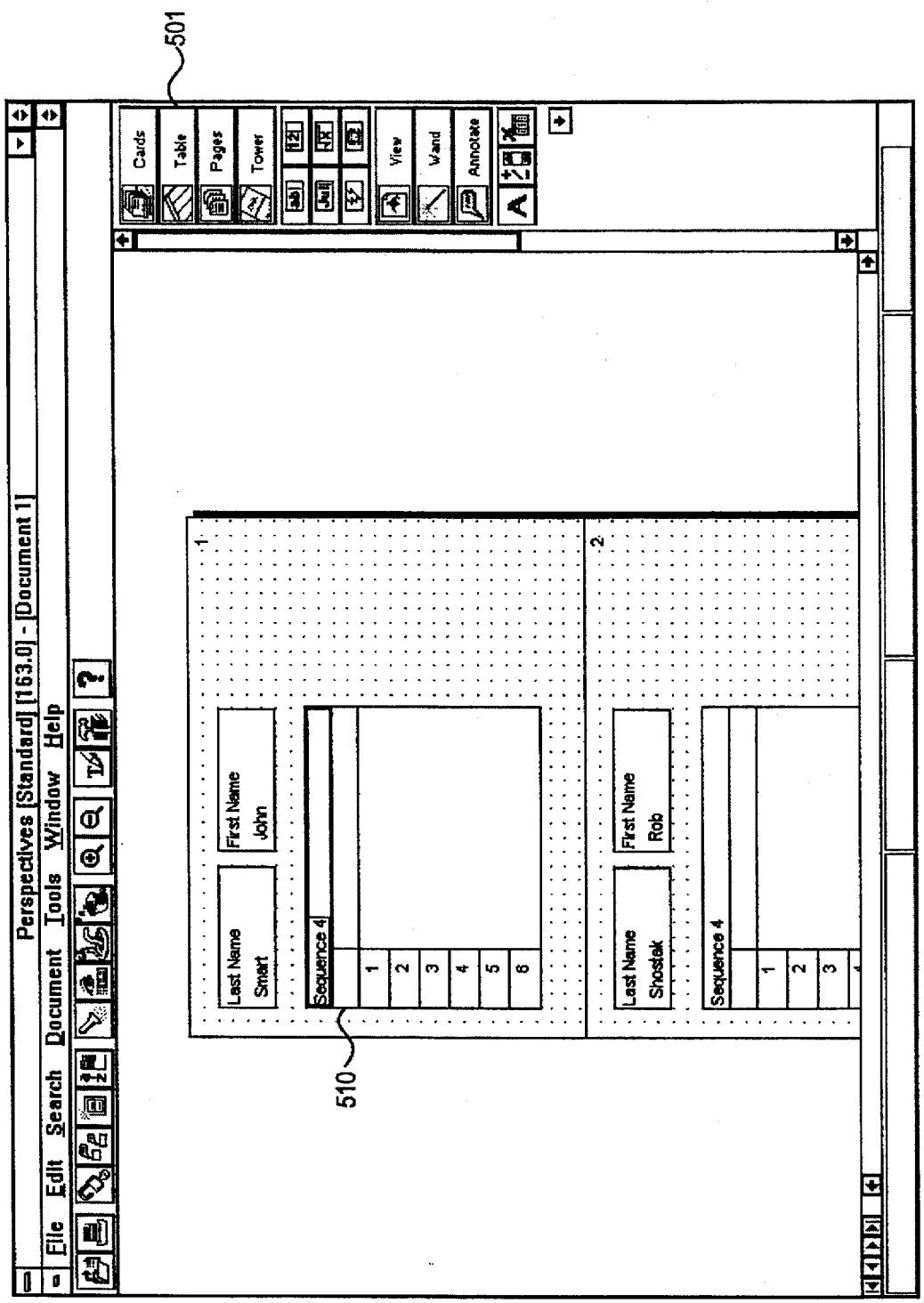
FIGS. 5A–C are bitmap screenshots illustrating creation of a table object for the order entry sample application of FIGS. 4A–C.
Figure 5B:
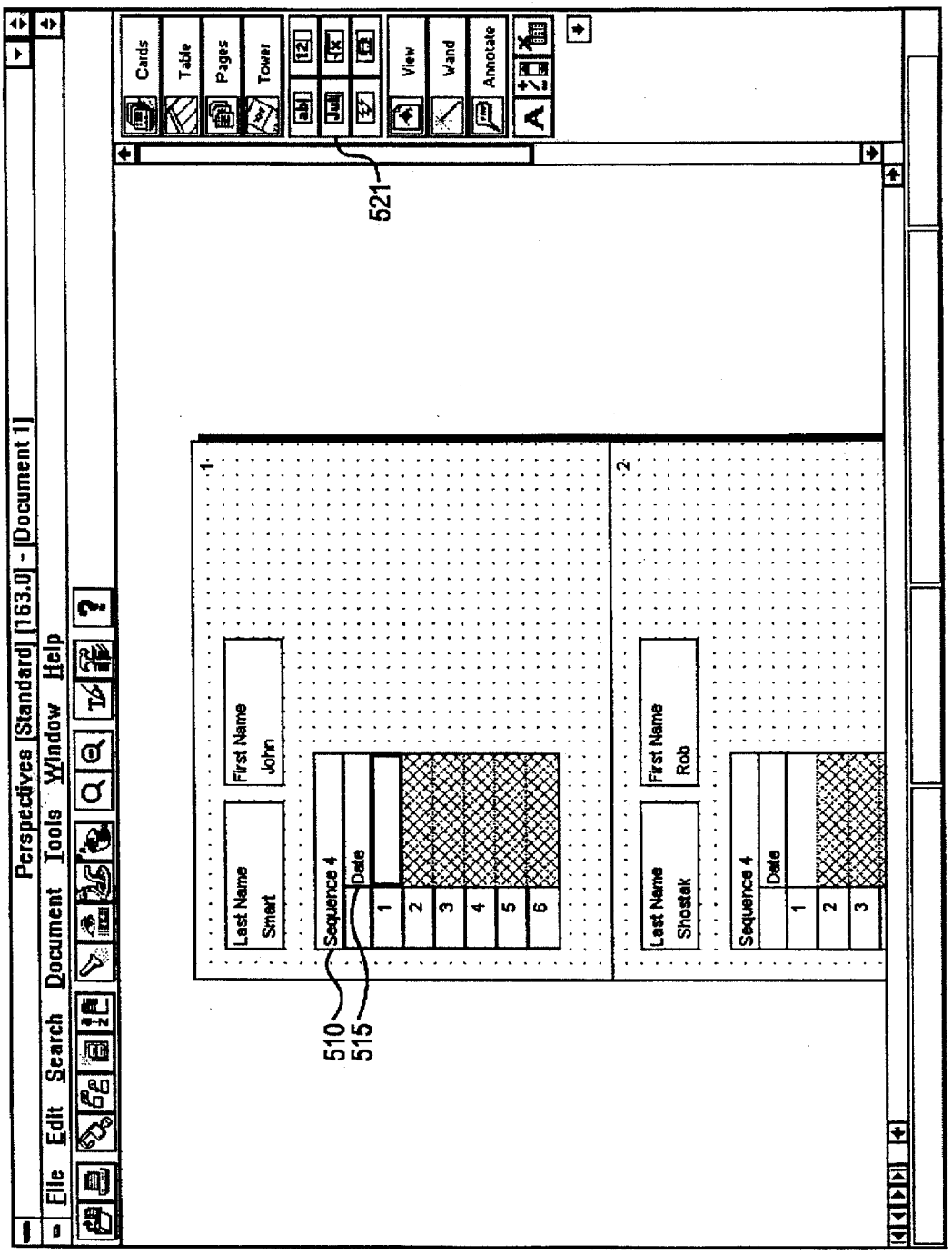
Figure 5C:
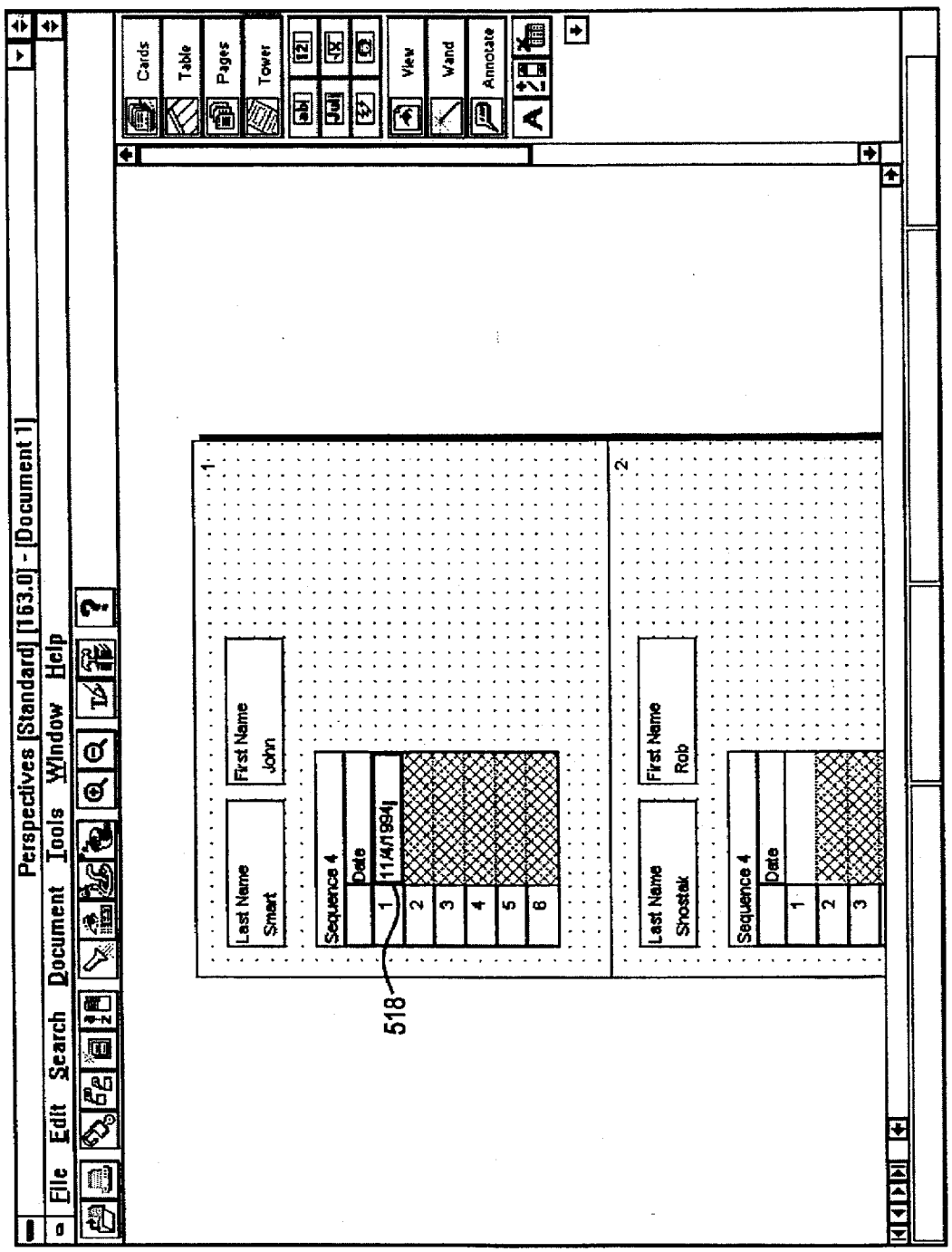

Continuing with user creation of the sample order entry application, the user selects the Table tool, shown at 501 in FIG. 5A, and then draws the table object 510 as a subdocument, as shown. Now, the user can populate the table with fields, in a manner similar to that previously shown. Thus the user can select the Date field tool, shown at 521 in FIG. 5B, and then place that field in the table 510, at field location 515. Upon placing the field, the user can provide a descriptive name, such as "Date" Since there is no modality in the system, the user can immediately begin entering data in the Date field, such as Date entry 518 shown in FIG. 5C. Again, this demonstrates that the system does not have separate modality for structure, creation, data entry, and layout. Instead, the user continues to operate on a single data object at all times.

Figure 6A:
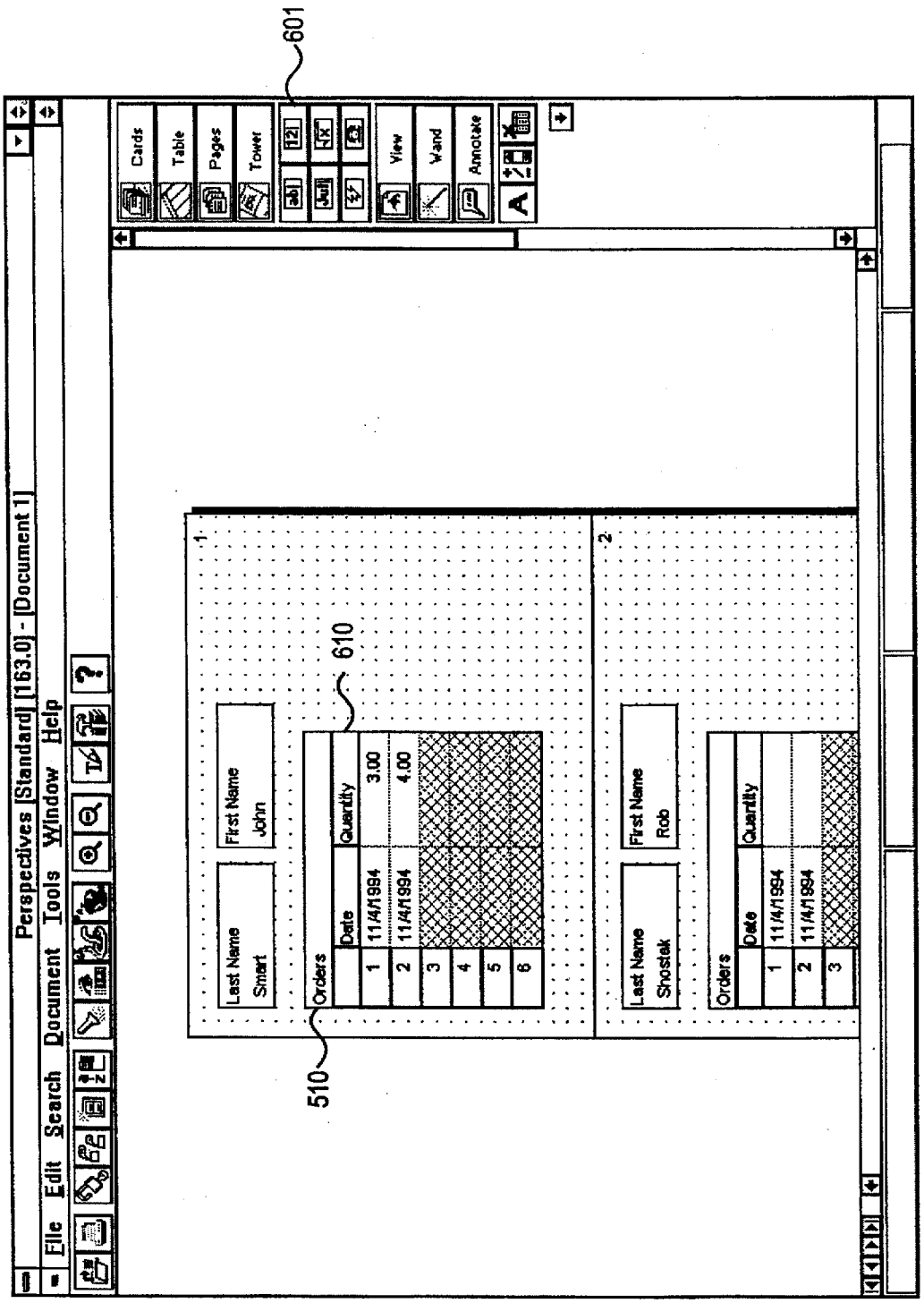
FIGS. 6A–B are bitmap screenshots illustrating placement of fields by the user in the table object of FIGS. 5A–C.
Figure 6B:
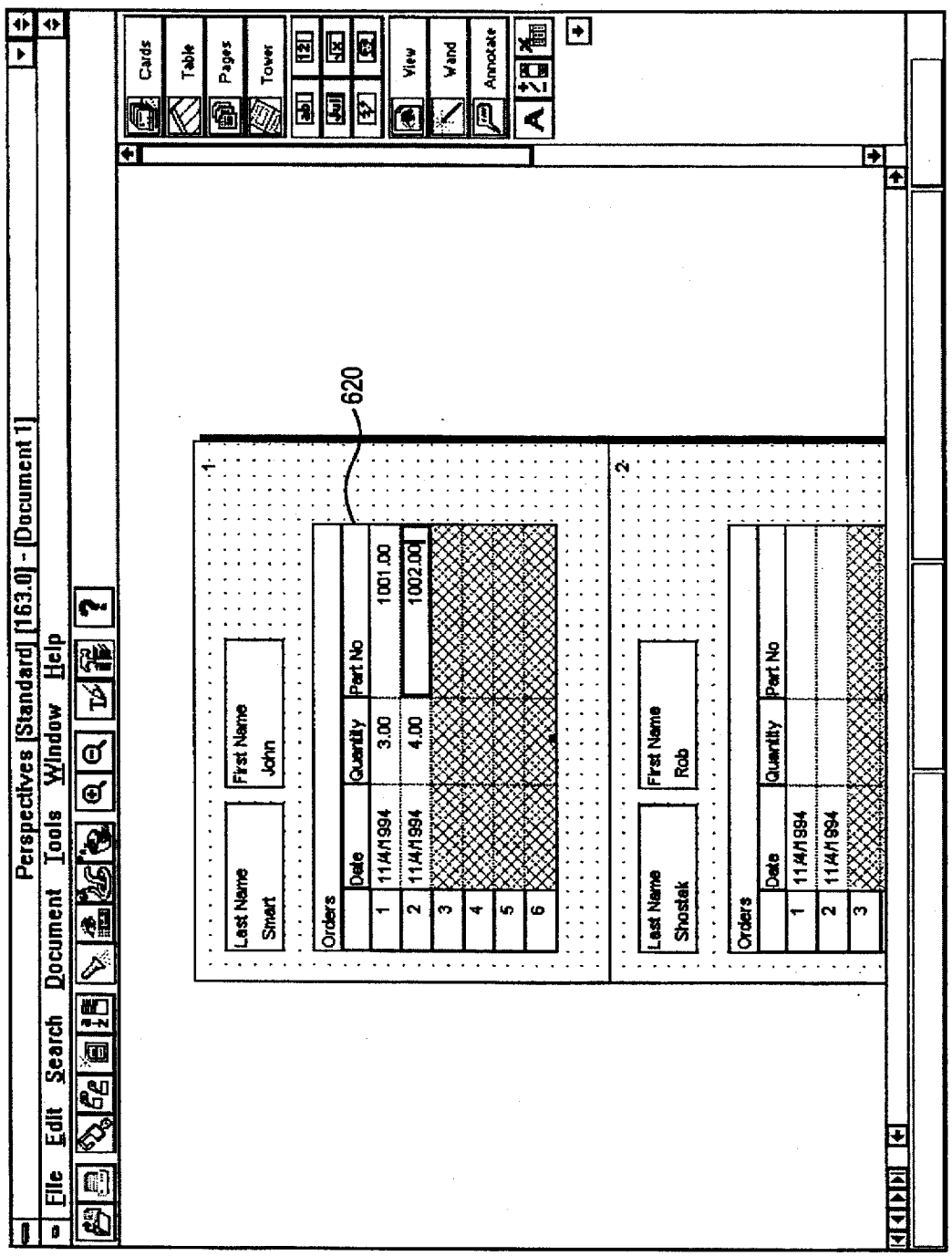

Continuing with the example, the user can easily add other fields to the Orders table, as is illustrated by FIGS. 6A–B. In FIG. 6A, for instance, the user adds "Quantity" field 610 by selecting Numeric field tool (shown at 601), clicking on table 510, and entering "Quantity" as the field name. As also shown, the user can provide a descriptive name (e.g., "Orders") for the table 510, by selecting the table (e.g., right-clicking on it) and entering the new name. As before, the other records are immediately updated to reflect the changes. Moreover, at any time throughout the operation, the user can enter data in the "Quantity" field (or any other fields), such as shown.

In a similar manner, the user adds a "Part No" field 620, as shown in FIG. 6B. Again, the user can enter his or her own data in the fields, at any time throughout the session. Also, the user can at any time change properties, such as re-sizing the fields, changing text alignment (e.g., left, center, or right), or the like.

3. Calculated fields

Figure 7A:
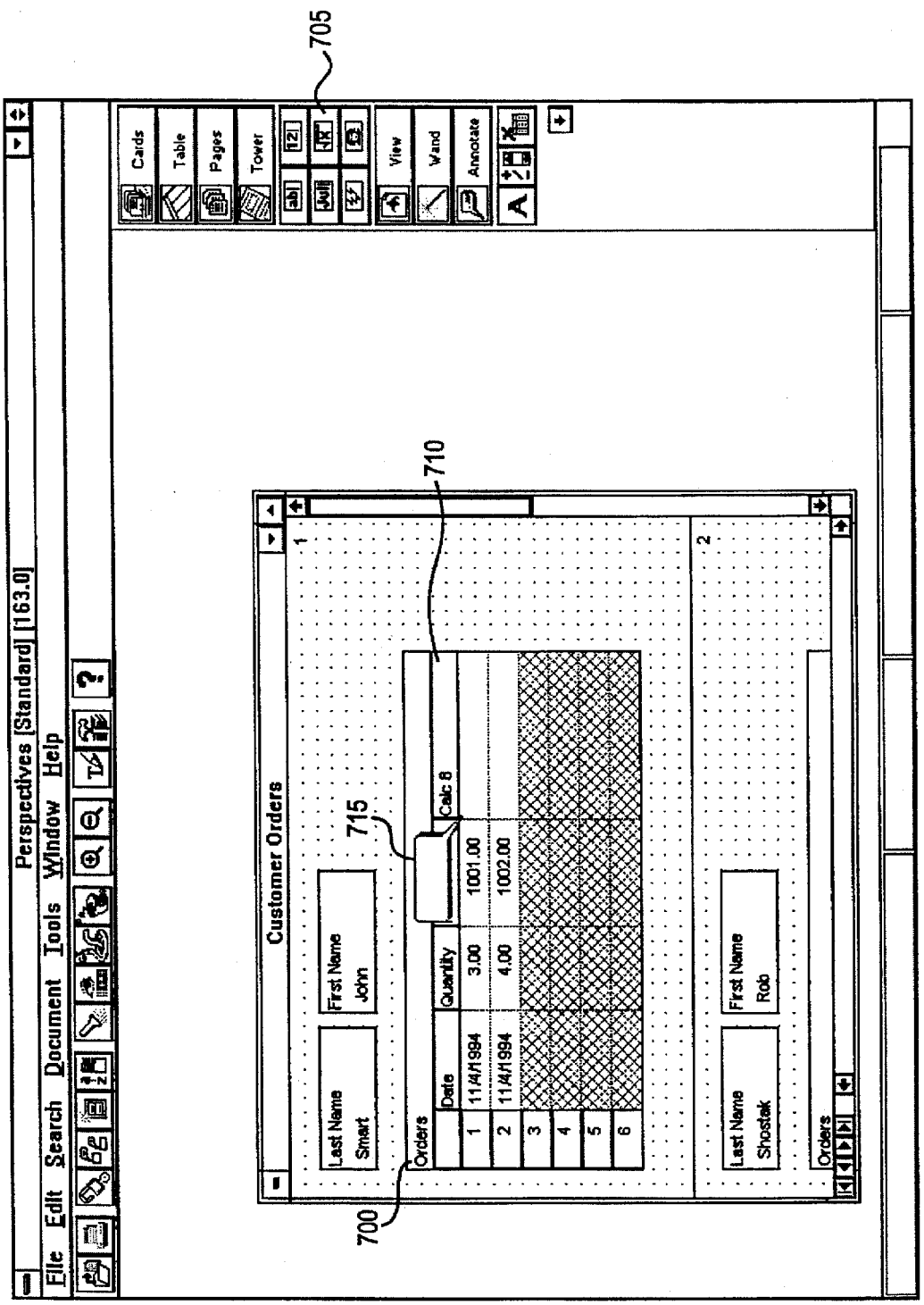
FIGS. 7A–C are bitmap screenshots illustrating user creation of a "calculated field," by using "Annotation Bubbles" of the present invention.

FIG. 7A illustrates the use of "calculated fields." A calculated field is one which derives its value from some calculation performed on another field or fields of the record. To place a calculated field in the document, the user selects the calculated field tool (i.e., button 705) and drags towards the desired destination for the field. For the Orders table, shown at 700 in FIG. 7A, the user has created a calculated field by dragging to field position 710.

Figure 7B:
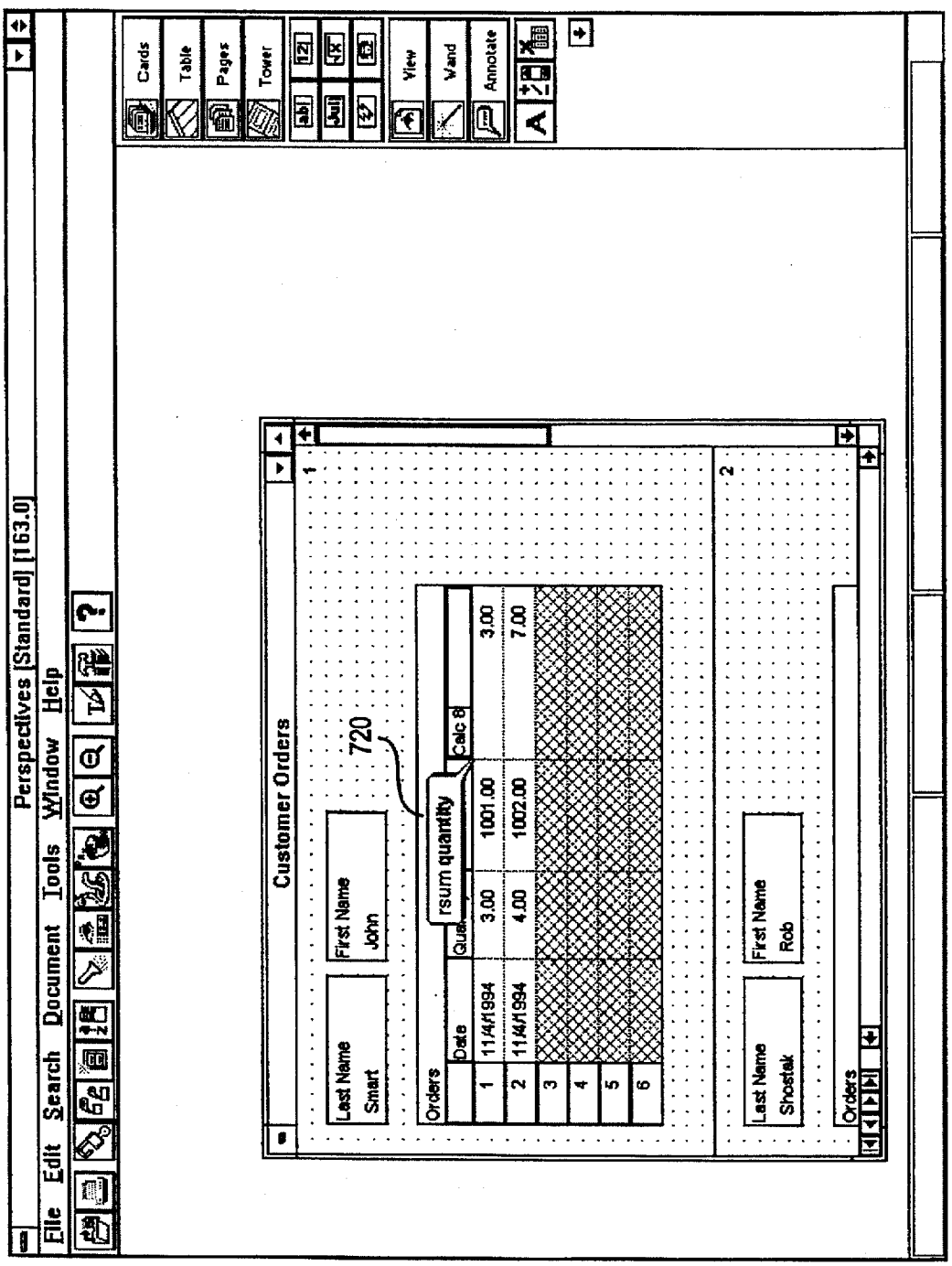
Figure 7C:
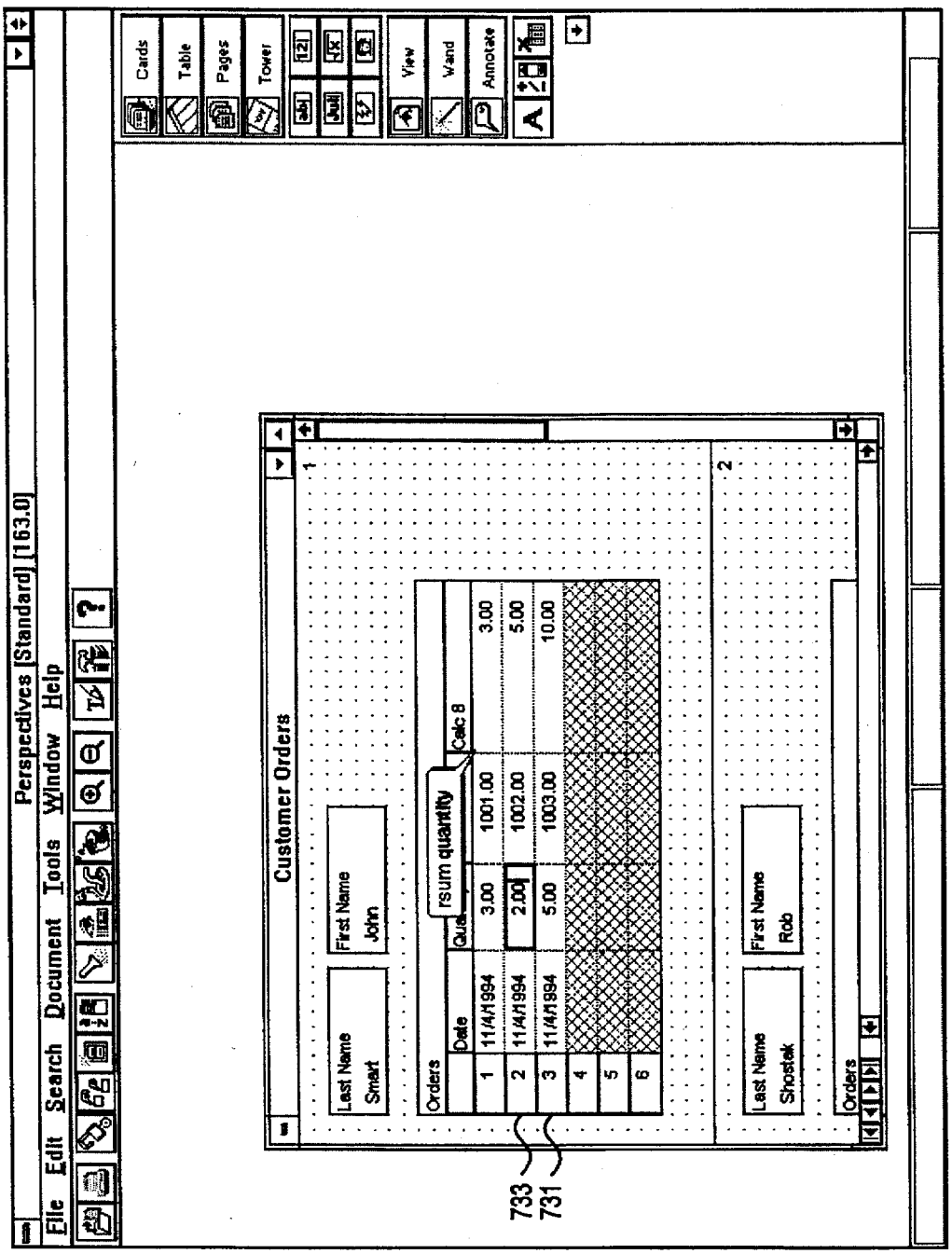

The system responds immediately by displaying an Annotation Bubble 715. Here, the user enters an expression which defines which type of calculation is desired for the calculated field. As shown in FIG. 7B, for example, the user can enter the calculation: Running Sum of the Quantity field. As shown at 720, the system includes a collection of pre-defined functions, such as RSUM for calculating a Running Sum. Also shown, the system automatically recognizes the entry of "Quantity" as an identifier for an existing field; in response, the system highlights the identifier (e.g., bold font) to indicate this to the user. Upon completion of the entry, the field displays appropriate values for the Running Sum of Quantity. As shown at FIG. 7C, the user at any time can add or modify data input, such as adding record 731 or modifying record 733. Thus as shown by this example, the Running Sum is maintained live at all times in this document or form, regardless of changes made to the underlying data. In other systems, in contrast, a Running Sum is not available in a document or form but instead must be programmed, such as part of a report.

Although the Annotation Bubble is maintained in FIG. 7C, the system provides a user-selectable option for toggling annotations on and off, as desired. Thus, the user can view as much or as little annotation information, as desired. In a manner similar to that described for other fields, the user can easily rename the calculated field to a more descriptive name, such as "Running Quantity."

4. Views

The semantics of the system are predicated on the notion of "live" views of the central document. A live view may be thought of as an incremental query. Consider how a user performs a query using a conventional system. In a conventional system, the user has some data, performs the query, and gets an Answer table. Although some products support a "dynaset," which provides a "live" answer set, such an answer table is only live in the sense that the user can edit the records in the answer table and those edits are reflected back in the underlying table(s). If new records are added to the underlying table (i.e., the table from which the query was derived), however, then the dynaset does not change to reflect that. In other words, the "live" answer table is not really live since it does not reflect at all times the current state of the data. Specifically, prior art systems have failed to provide incremental maintenance of queries. The present invention, in contrast, provides a "live" view which at all times reflects the state of the data in underlying tables.

The notion of "views," as taught by the present invention, will now be illustrated with reference to FIGS. 8A–J. A user gains a new view of a document by selecting the View tool, shown at 801, and selecting a desired object. Alternatively, the user selects the View Quick Button, shown at 803, whereupon the system provides a new view of the object currently having focus. For the example at hand, the user requests a new view of the "Customer Orders" document. In response to this request, the system displays a new view 810, which is initially titled "View 1."

A "View" is a view or window on the data of the original document; here, the "Customer Orders" document, which is still shown at 820. An important distinction exists with Views, however. Specifically, the user can confine a View to include only a particular selection of data (e.g., records only meeting a certain condition) from the underlying document.

Continuing with the present example, suppose the user is only interested in records having dates occurring after Jan. 1, 1994. The user can easily modify View 1 to show only records meeting this condition, as follows. The user selects the Annotate Tool, shown at 830 in FIG. 8B, and drags over towards the Date field of View 1, shown at 833. In response to this user action, the system displays Annotation Bubble 835 over the Date field of View 1. Recall that the Annotation Tool was used above for creating a calculated field. Here, the Annotation Tool is used to click on a field for defining a filter or selection condition (for the view).

Figure 8A:
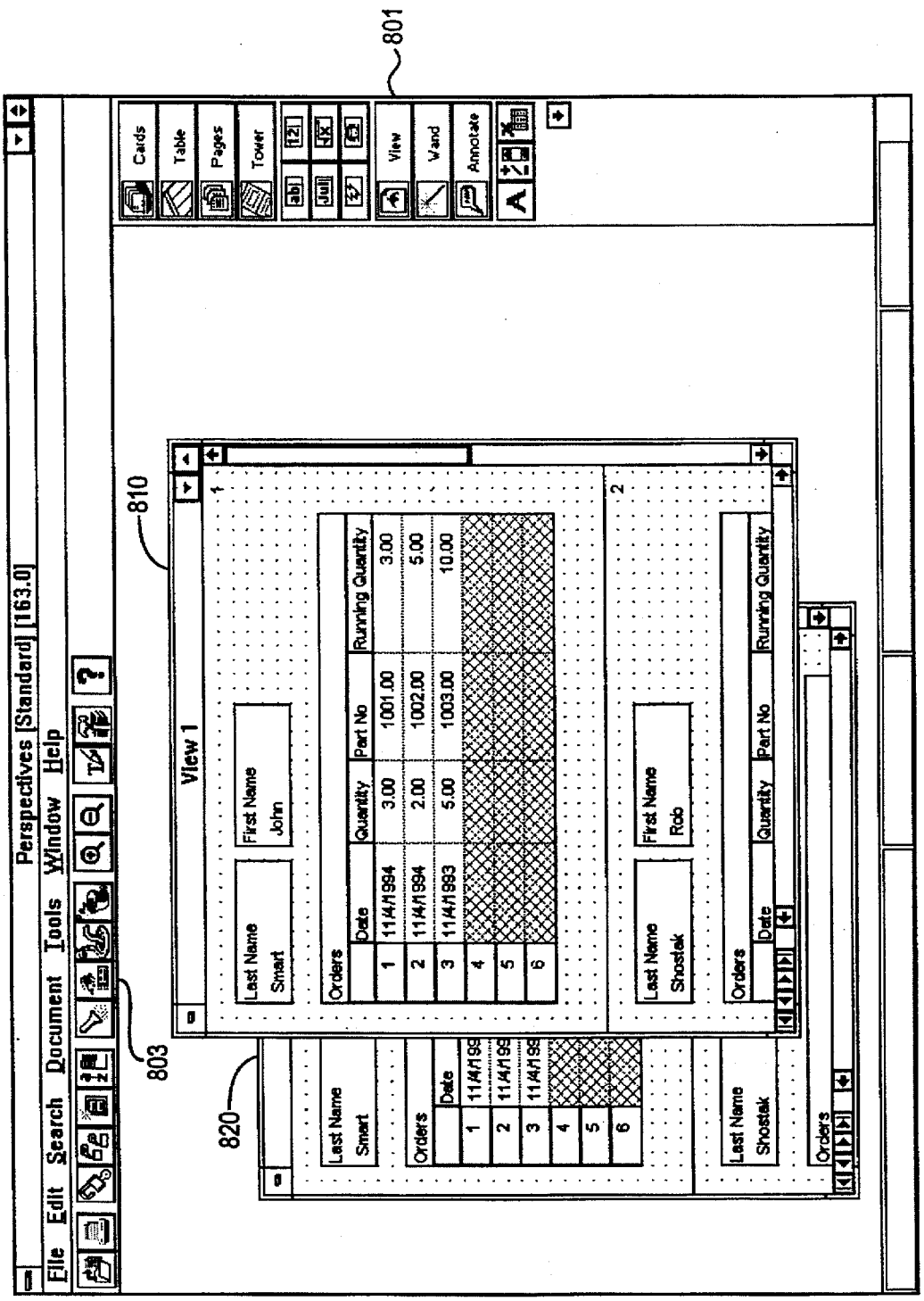
FIGS. 8A–J are bitmap screenshots illustrating "views" in the system of the present invention.
Figure 8B:
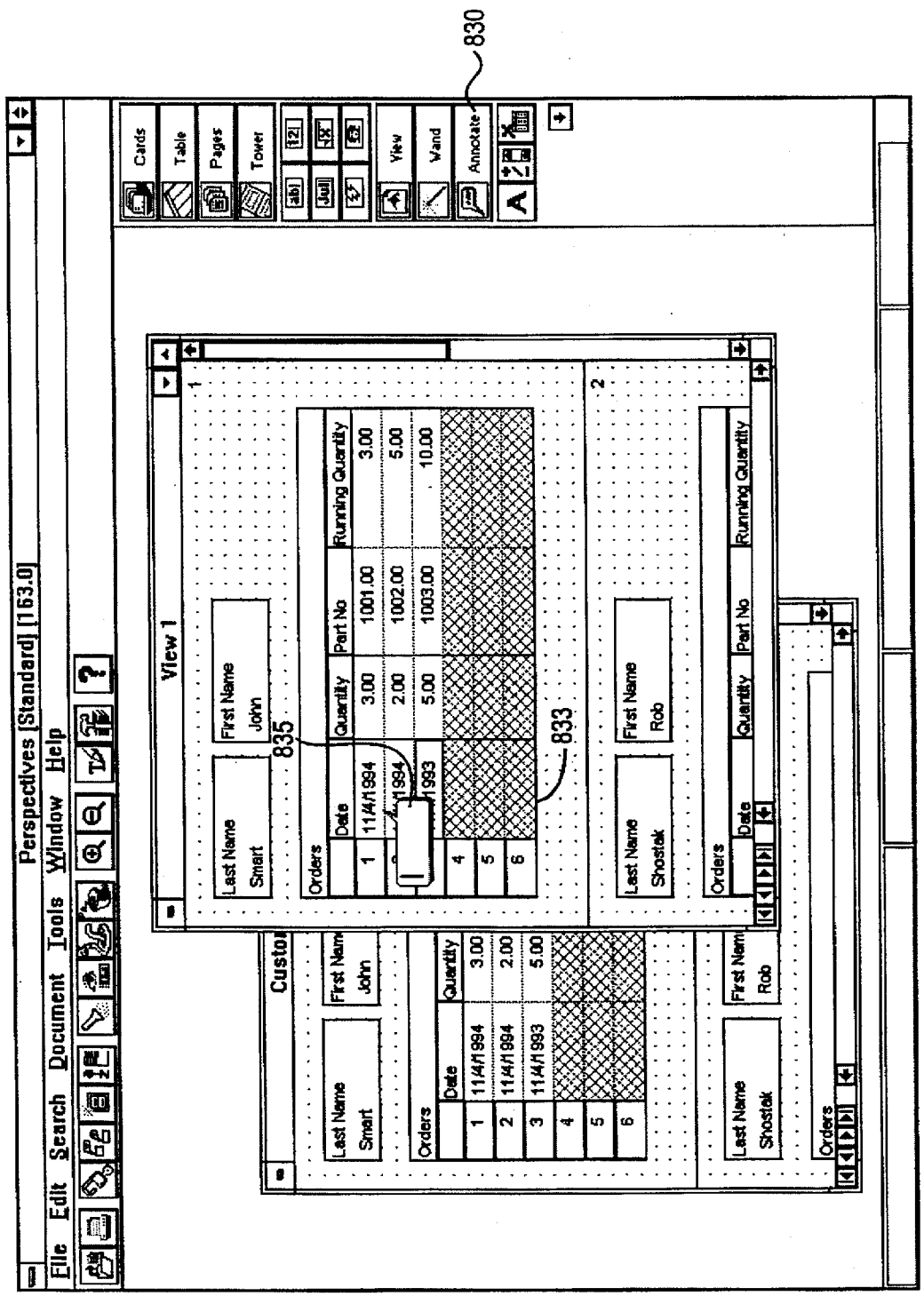
Figure 8C:
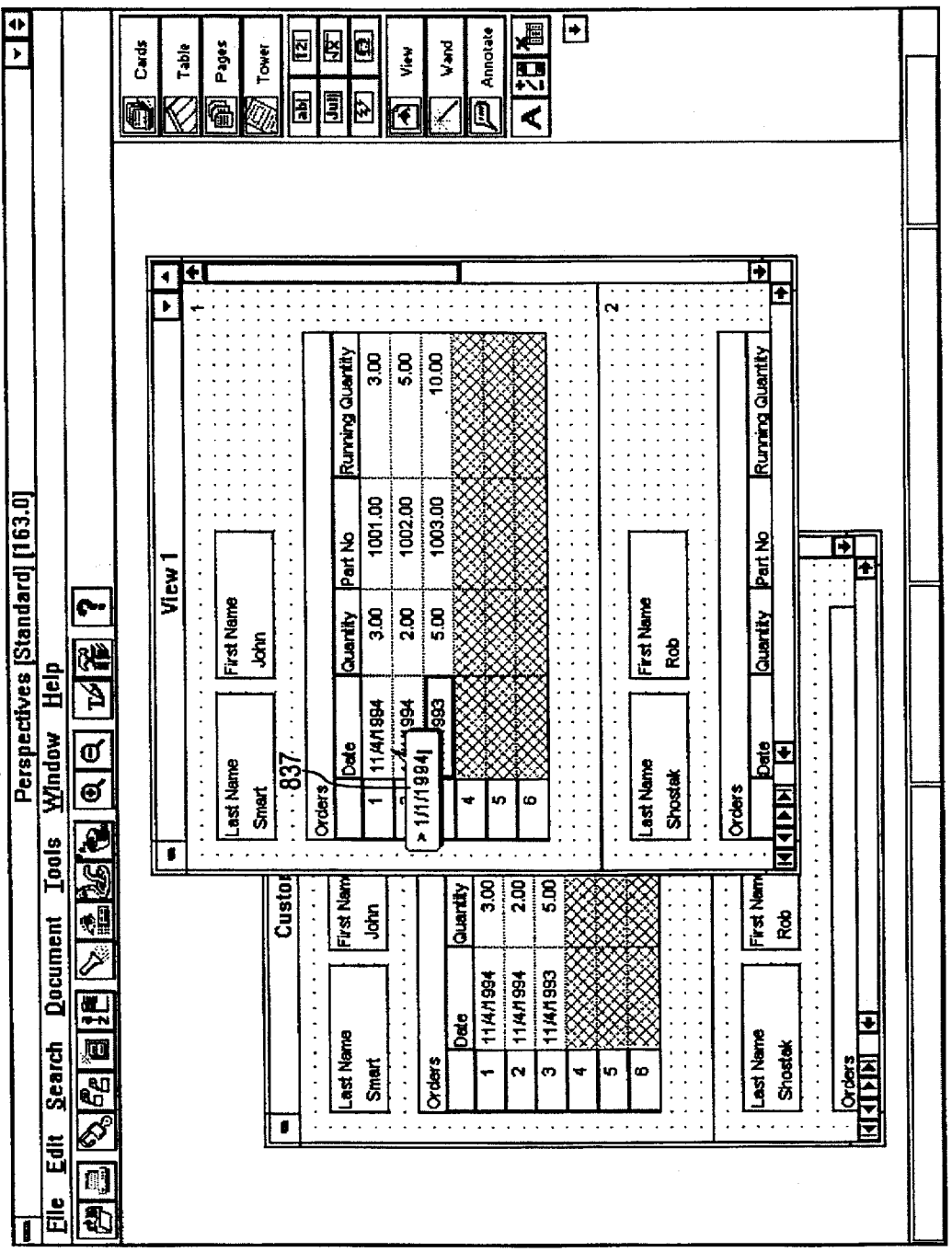
Figure 8D:
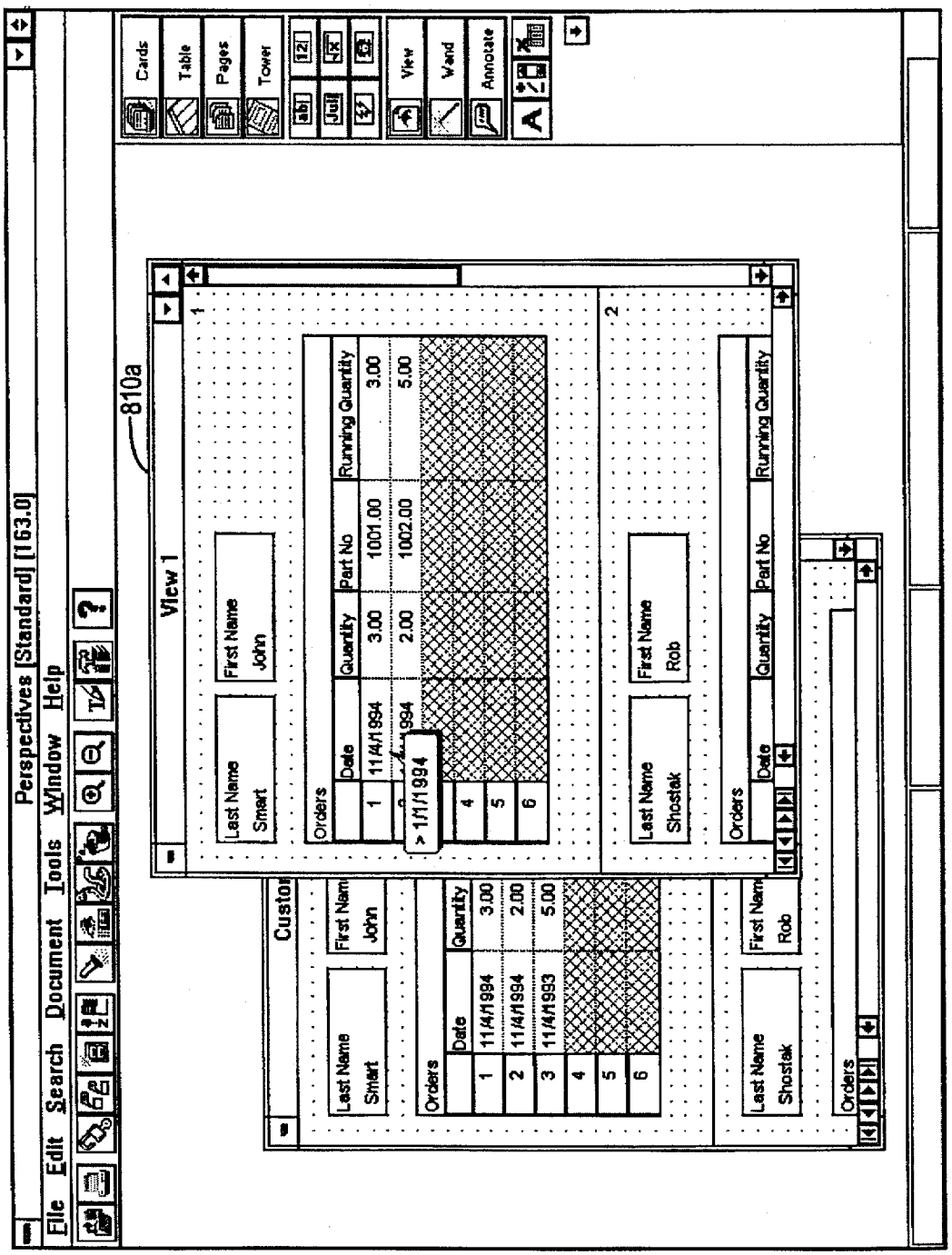
Figure 8E:
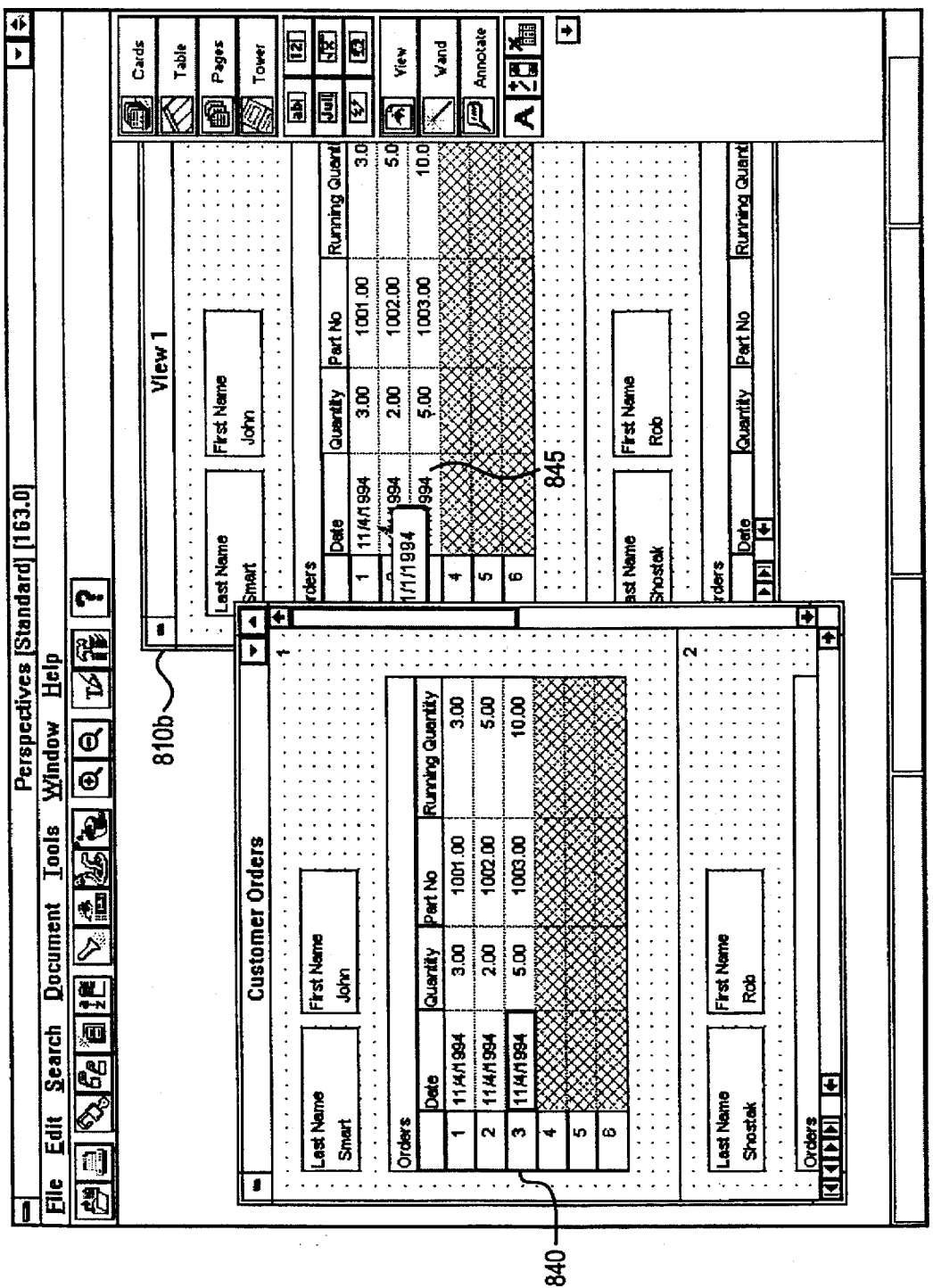

Continuing with the selection of records having a date after Jan. 1, 1994, the user simply enters "greater than 1/1/1994" into the Annotation Bubble (which has active focus at this point), as shown at 837 in FIG. 8C. The user may enter any other arbitrary date expression, such as "TODAY-30." Upon the user completing his or her entry into the Annotation Bubble (e.g., by pressing the "Return" key), the system applies the user-specified filter to View 1, as shown at 810a in FIG. 8D. Thus at this point, the user has been able to easily restrict the View to only orders which are relevant for his or her task at hand. As before, the Annotation Bubble continues to be displayed by default in a preferred embodiment; the user may, however, easily toggle display of the Annotation Bubble on and off using the Annotation speed button of the Tool bar.

The reader should particularly note that this View (View 1), as well as any other view which the user may create, is always "live." If, for instance, one of the records of the original document is changed, such as changing the date of the third record (shown at 840 in FIG. 8E) from a 1993 date to a 1994 date, all views are immediately updated to reflect the change. Specifically for View 1, the third record (shown at 845) now appears in the view, as it now meets the user-specified filter conditions. In contrast to prior art systems, the system of the present invention demonstrates at this point that there is no re-execution or scripting that the user must undertake in order to complete the application. Thus once the user creates his or her documents, he or she has provided all information necessary for driving the application. As data are entered, all views—forms and reports—are updated automatically.

Figure 8F:
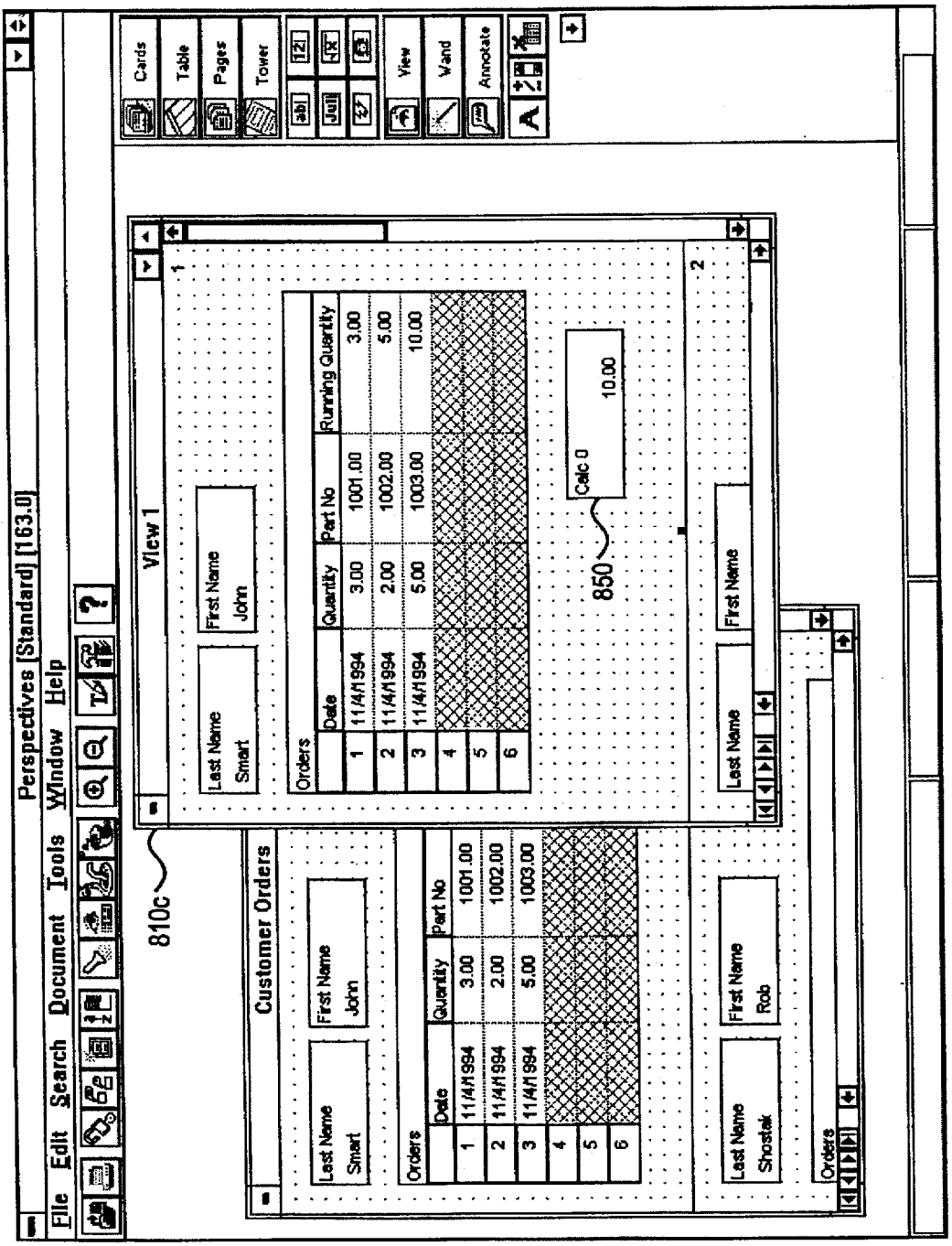

Advancing this concept still further, the present invention allows the user to add fields to a View, yet still maintain a live view. In FIG. 8F, for instance, the user has added a Calculated field 850, which provides a sum of the Quantity field (here, 3.00+2.00+5.00=10.00). As soon as the user completes entry of the calculated field 850, the field immediately displays its appropriate value, 10.00, as it is at all times live.

Figure 8G:
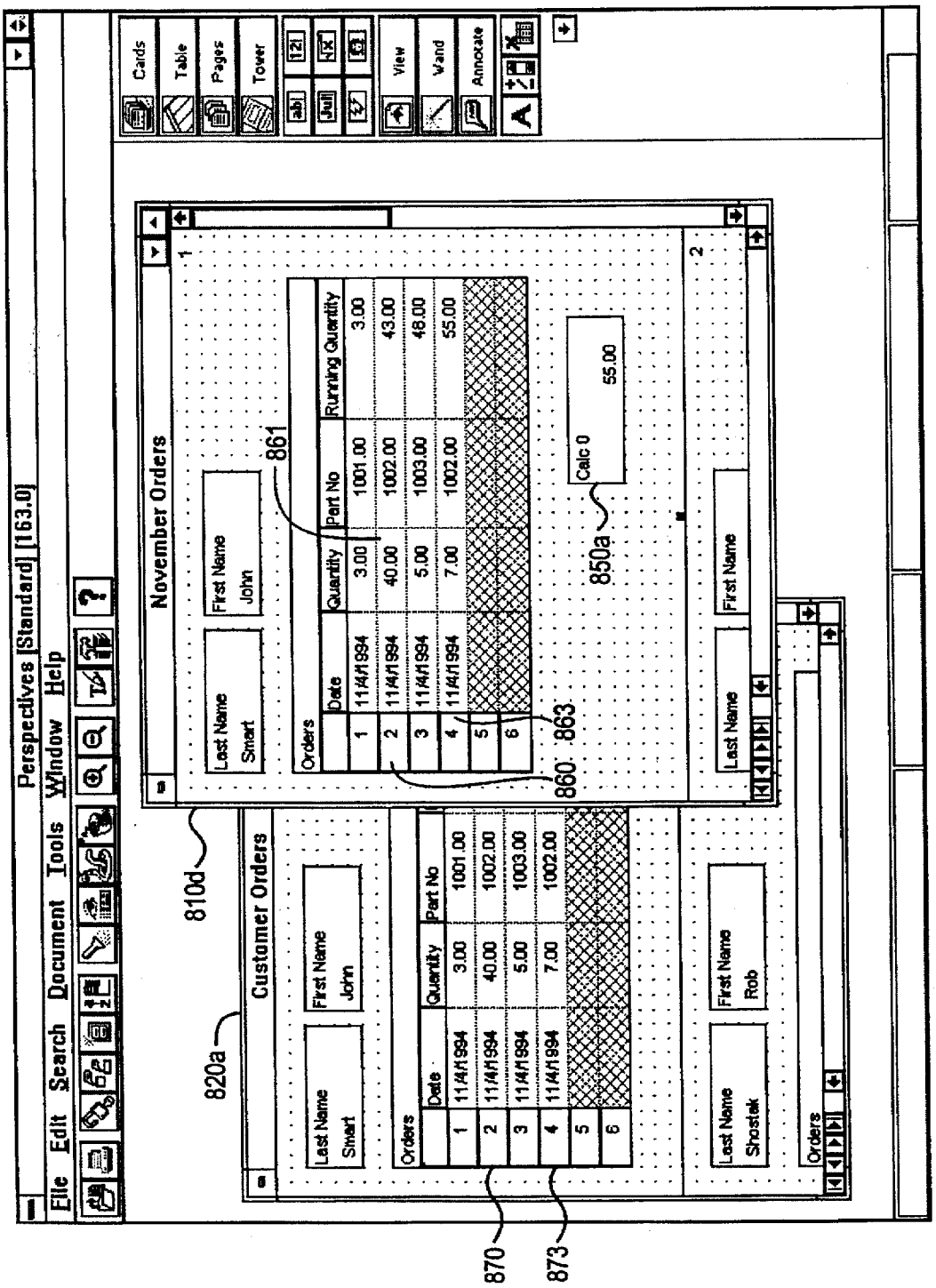
Figure 8H:
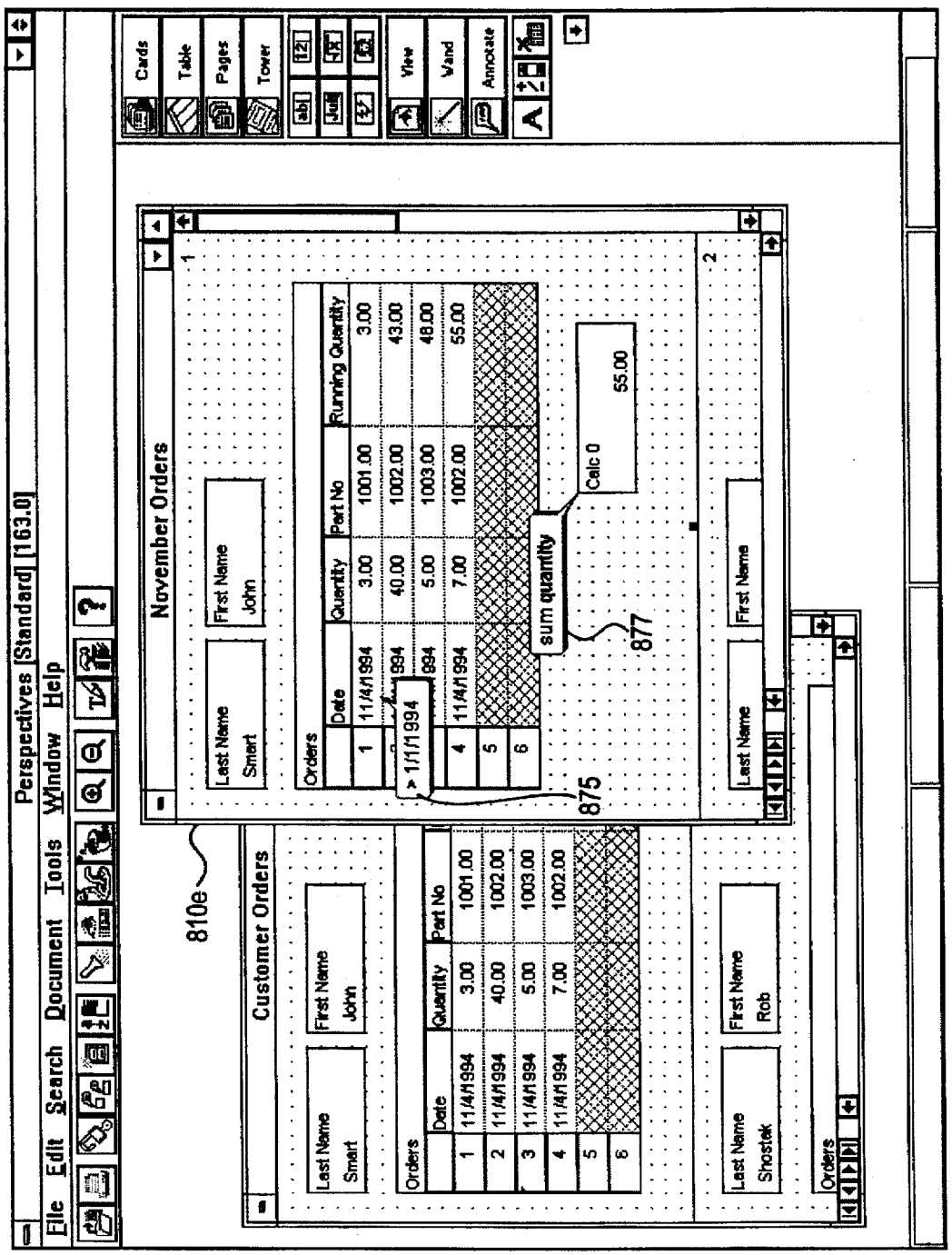

To illustrate this operation still further, consider additions and modifications made to records of the View, as shown in FIG. 8G. There, the second record (shown at 860) has its Quantity field (shown at 861) changed from a value of 2 to a value of 40. Also, a new record, the fourth record (shown at 863), is added to the View. As shown by FIG. 8G, all objects are immediately updated to reflect these changes. Specifically, the calculated field (shown at 850a) is updated to reflect the changes. Moreover, the Customer Orders document itself (shown at 820a) is updated to reflect these changes, namely by displaying a modified second record (shown at 870) and a new fourth record (shown at 873). Also shown, the user can rename the View 1 view to something more descriptive, such as "November Orders," as shown. All told, the "live" view of the present invention provides an incrementally-maintained query of the data. As shown in FIG. 8H, the user can selectively toggle annotations back on, such as the date annotation (shown at 75) and the Calculated field annotation (shown at 877), for indicating the conditions controlling the View.

Figure 8I:
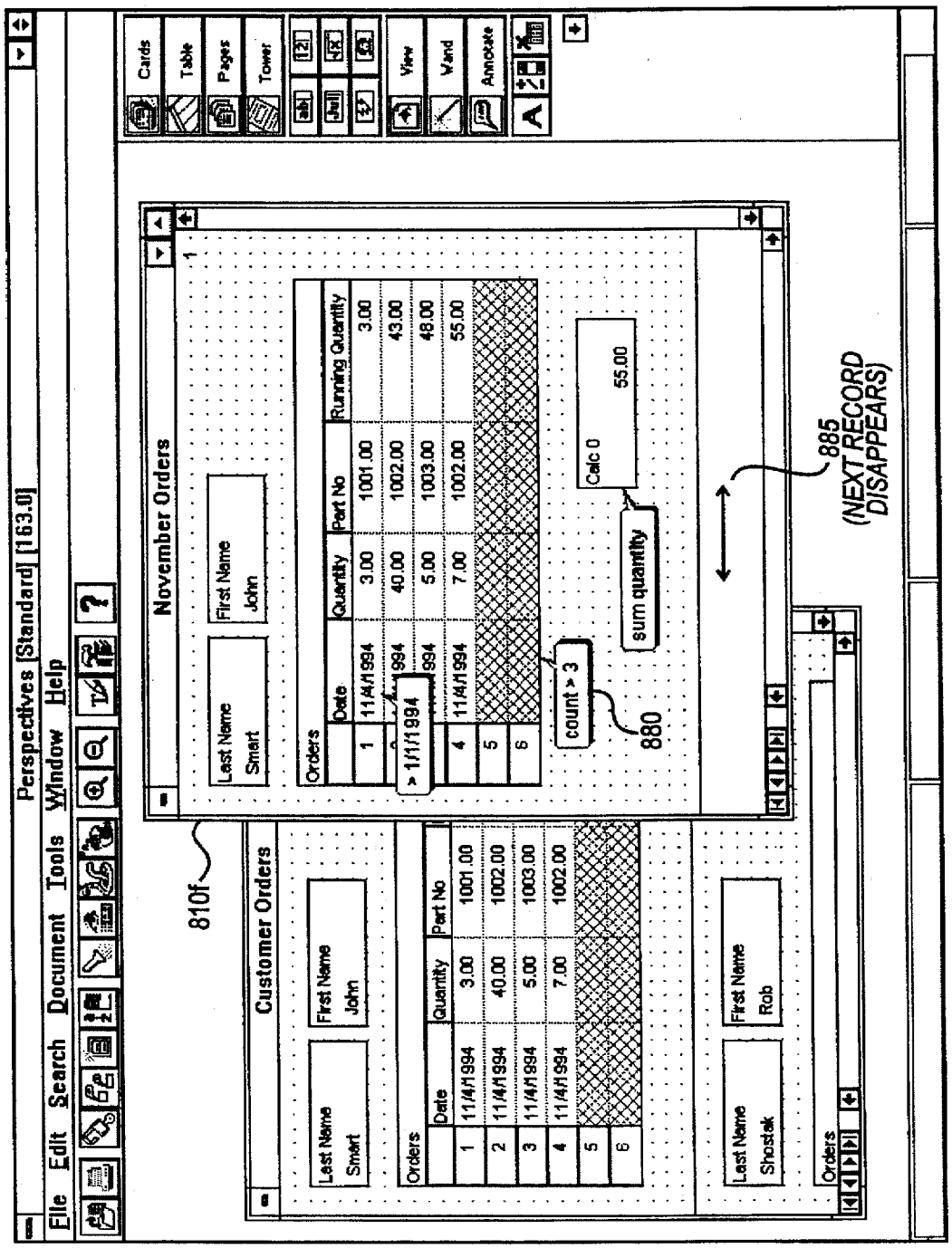

A condition can be placed on the entire Orders table, as shown at 810f in FIG. 8I. There, the condition of count greater 3 (count>3) is placed on the Orders table, via Annotation Bubble 880. Immediately, the View is updated to reflect this new condition. In particular, although the record for Smart (i.e., Record 1) continues to be displayed, the record for Shostak is dropped from the view, as shown at 885, since the Shostak record fails to meet the condition of count greater than 3.

Consider, in contrast, the task of performing queries involving aggregates with a conventional database system. There, the approach the user must follow for achieving the same result is far from intuitive, particularly as a result of scoping rules. With the system of the present invention, the user achieves the result by annotating the data directly in context (i.e., right in place). Since the user can easily visualize the nested structure, the approach is far more intuitive. Quite simply, there is no need for the user to reconstitute the nested structure using tools which are not properly suited for that task, such as using Query-By-Example (QBE) to create an aggregate. With the incremental-query approach, the system of the present invention allows users without database training or knowledge to easily create queries having nested structures, such as aggregates. And since all documents and views remain "live" at all times, the user can add additional data (e.g., adding new Orders to the Shostak customer record) at any time.

Figure 8J:
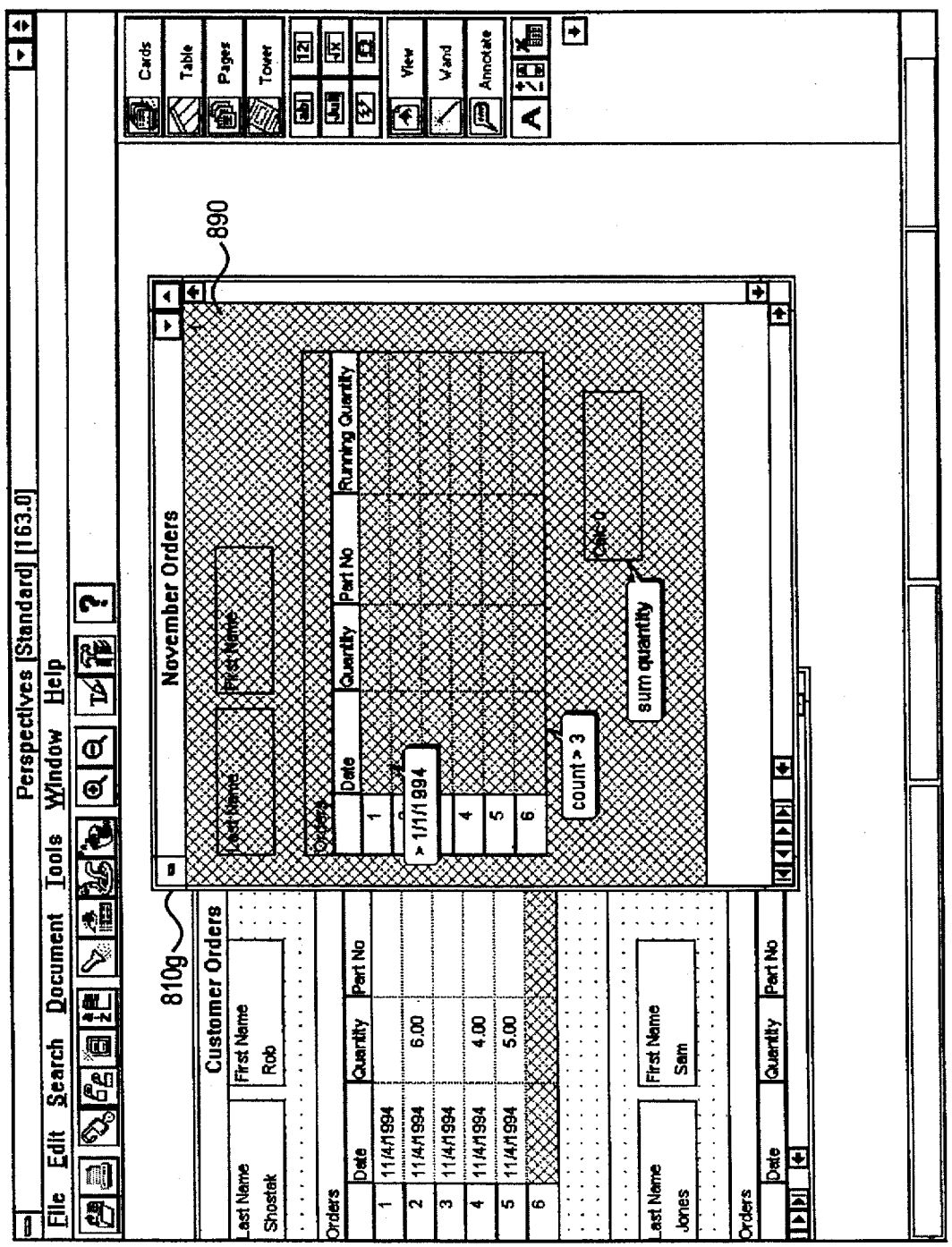

As shown in FIG. 8J, a view or document can be selectively disabled at any time by the user. The "November Orders" view, shown at 810g, has been disabled temporarily by the user; accordingly, the view displays highlight or feedback 890, for indicating its disabled state. The system does not incrementally maintain the display of a view or document while it is disabled. However, the state of its data is maintained. In this manner, the user can easily create several documents and/or views, yet disable those which are not required for the immediate task at hand. System resources are conserved, since the system does not expend any resources maintaining those objects which have been disabled.

5. View of a view

In addition to views, the system of the present invention allows users to create "views of views," to any arbitrary level of nesting. Thus the notion of a view is very powerful: a view can be further refined by taking a view of a view.

Figure 9A:
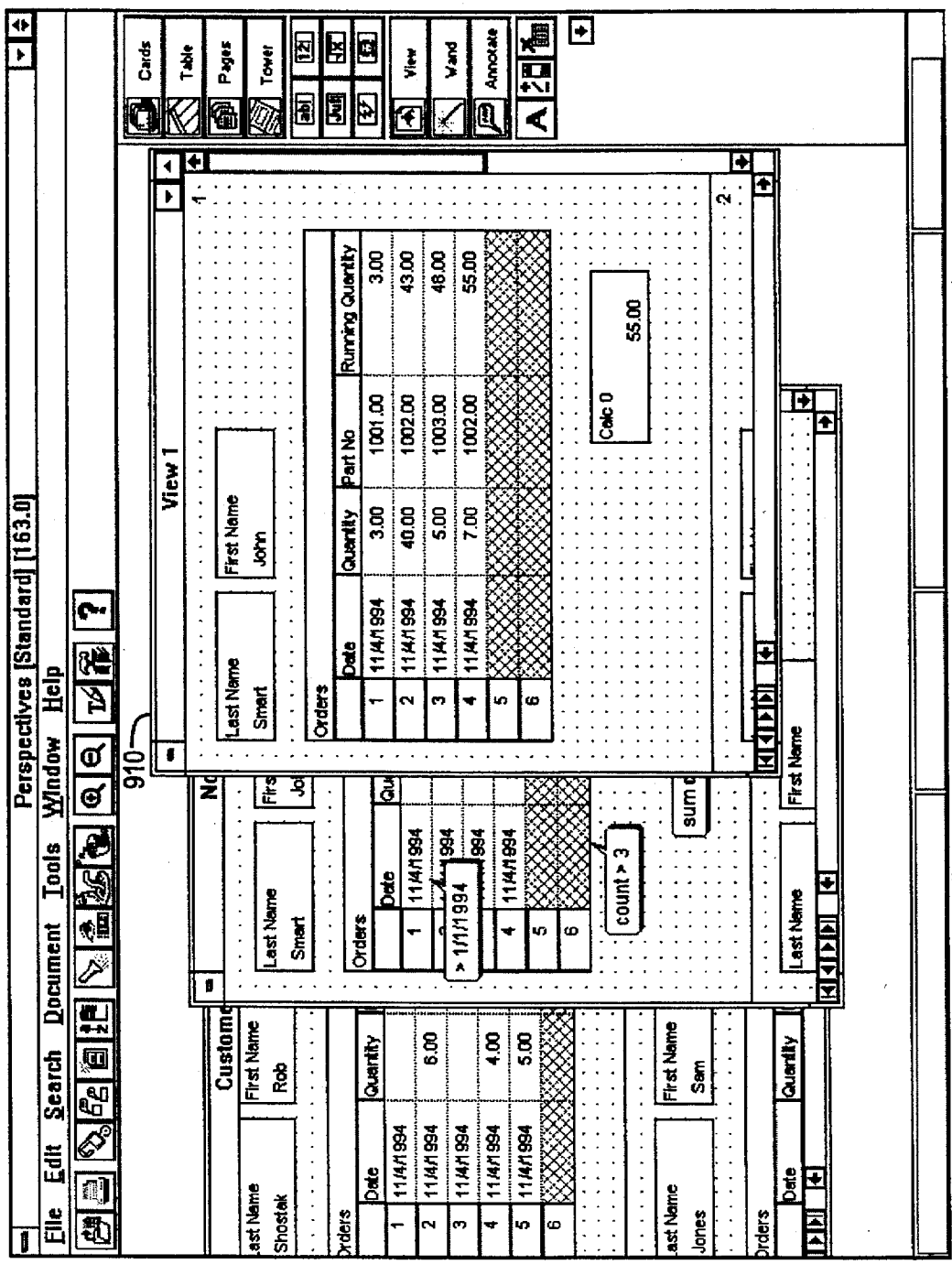
FIGS. 9A–B are bitmap screenshots illustrating user creation of a "view of a view" in the system of the present invention.
Figure 9B:
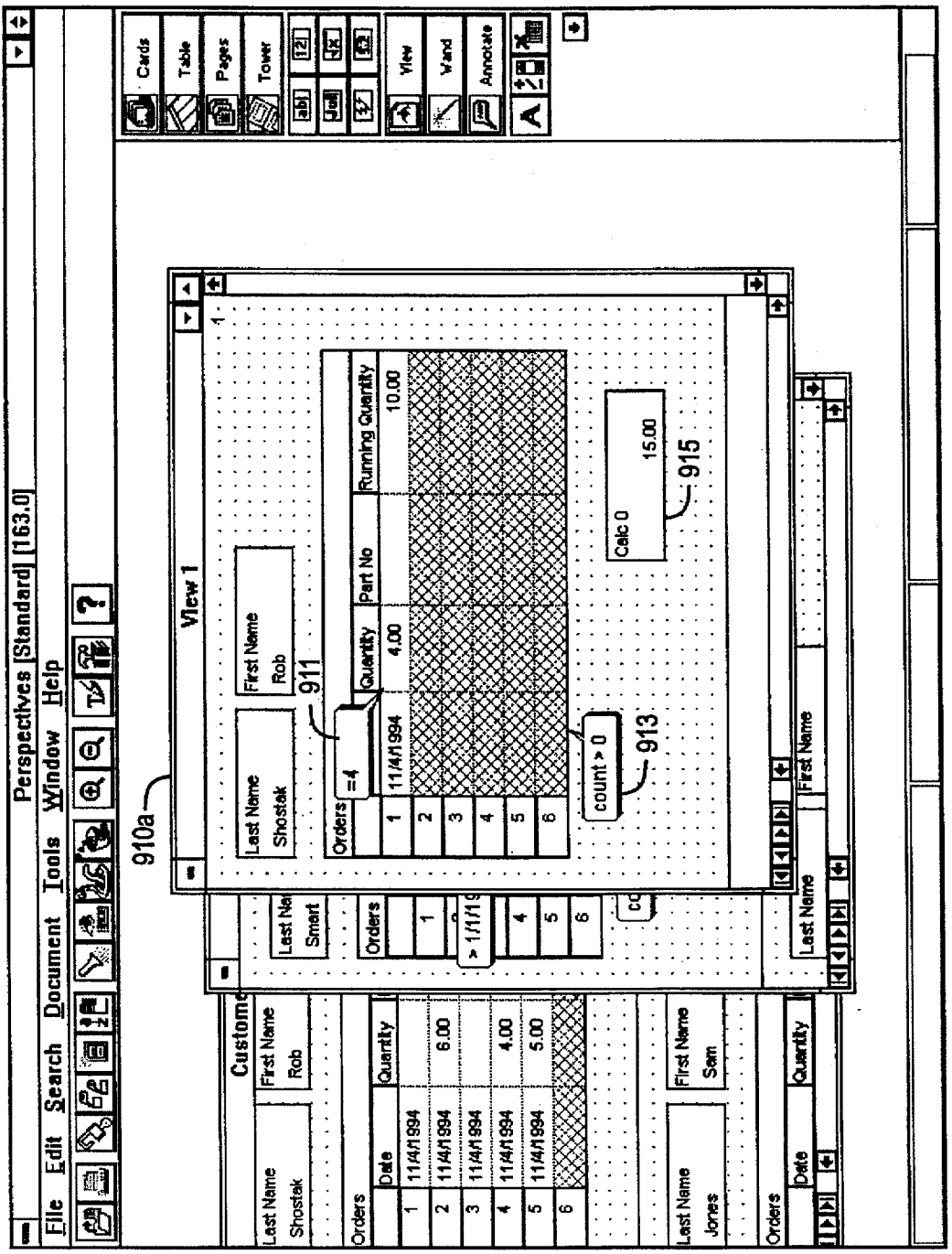

FIGS. 9A–B illustrate the process of creating a view of a view. Continuing with the working example, suppose the user desires to view only certain records of the "November Orders" view. Accordingly, the user creates a new view of the "November Orders" view. This is accomplished by using the View tool and selecting the "November Orders" view, or by clicking on the view speed button (while the "November Orders" view has focus) for requesting a new view of the currently-selected object. In response to this user action, the system displays a new view 910, which receives the default name of "View 1."

With a view of a view, the user can proceed to annotate it as desired, for further refining the displayed data. FIG. 9B illustrates such a refinement. There, the user has modified View 1, shown at 910a, by adding an Annotation Bubble 911, which specifies the condition of Quantity equal 4 (Quantity=4). Moreover at this point, the user desires that the system not show records for customers who do not have Orders equal to 4. Accordingly, the user can add an additional Annotation Bubble 913, which specifies the condition of count greater than 0 (i.e., the user must have at least some orders for the record to be displayed). As illustrated by the foregoing example, the present invention's approach of providing successive views affords an intuitive, yet powerful, approach to creating complex queries. Moreover, since all views and documents remain "live," the user can at any time make modifications on-the-fly (e.g., deleting the calculated field shown at 915), with his or her changes immediately effected by the system.

6. Magic Wand

Figure 10A:
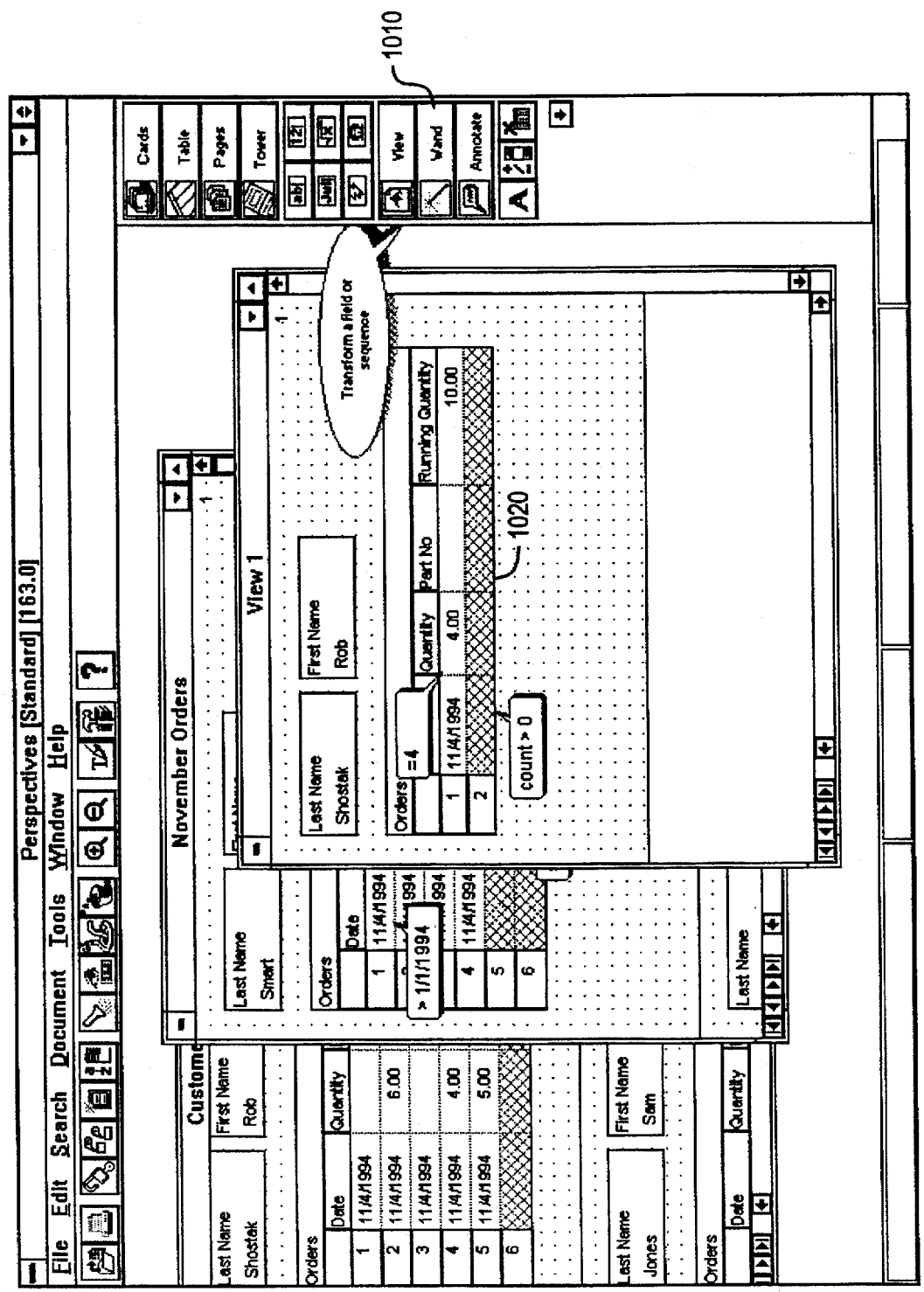
FIGS. 10A–C are bitmap screenshots illustrating use and operation of the "Magic Wand" tool in the system of the present invention, for transforming a document style to a different style.
Figure 10B:
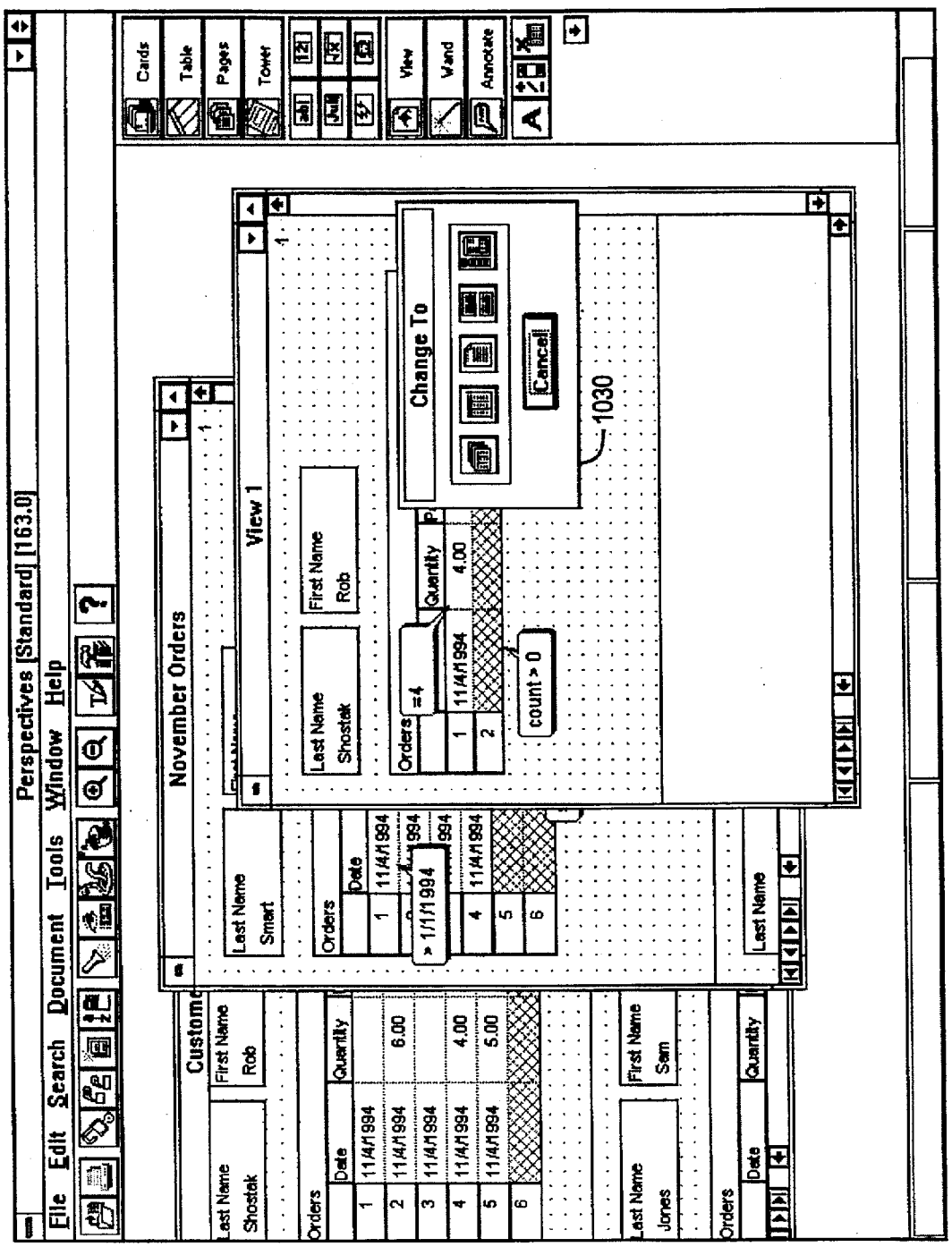
Figure 10C:
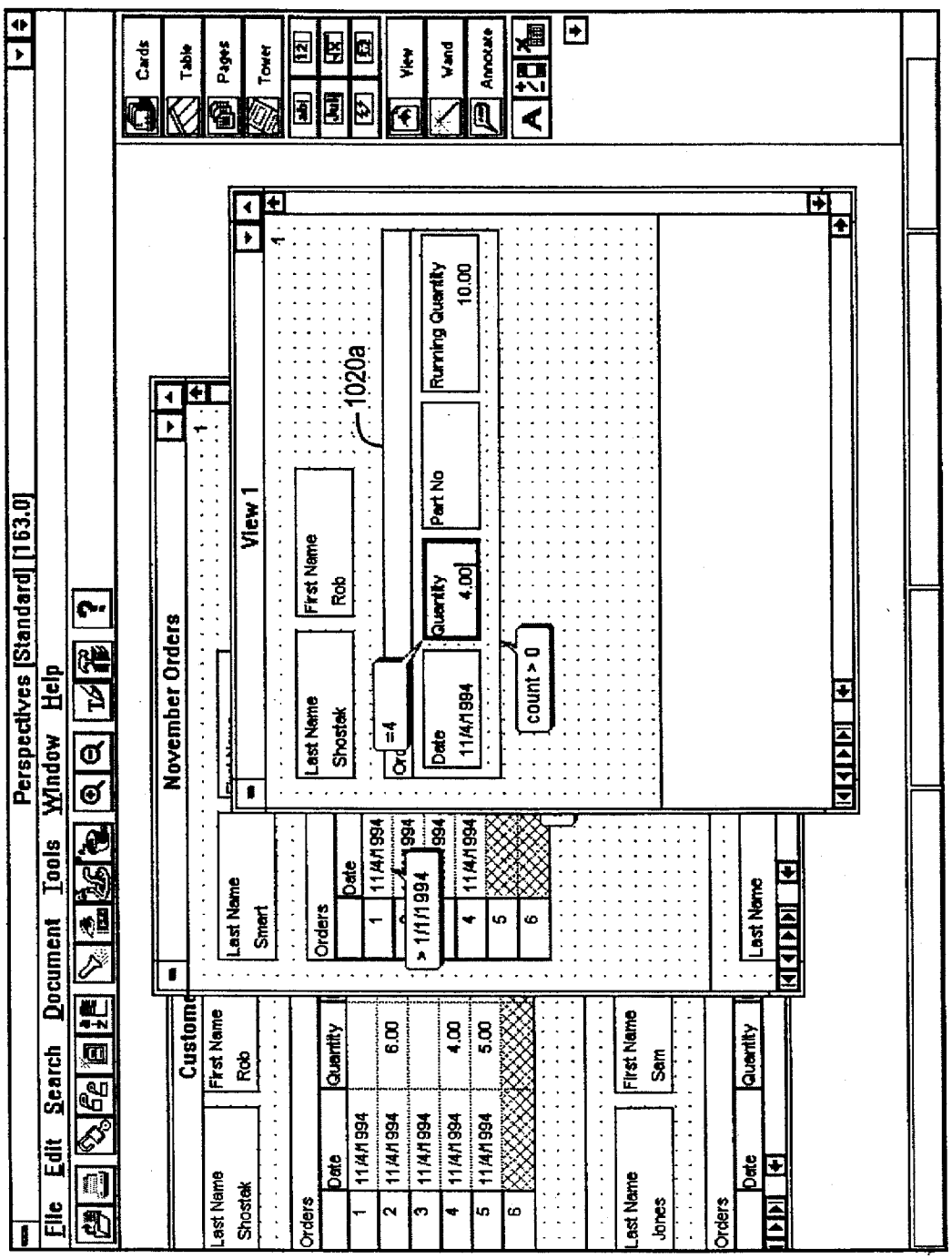

With reference to FIGS. 10A–C, operation of the Magic Wand tool will now be described. The Magic Wand tool 1010, shown in FIG. 10A (with accompanying bubble help), allows the user to transform a document style or subdocument style to a different style. Suppose, for instance, that the user did not like the tabular style for the Orders table, as shown at 1020. To change the style, the user simply clicks on the Magic Wand 1010, drags over to the Orders table 1020, and releases (the mouse button). In response, the system displays a "Change To" dialog 1030, as shown in FIG. 10B. The dialog 1030 displays a selection of different display types (e.g., "Tower"), from which the user may select (e.g., by clicking on a desired one). FIG. 10C shows the result of selecting a vertical stack for the Orders table (i.e., the records are vertically stacked on top of one another). The Orders table now expresses a new style, as shown at 1020a.

The approach of the present invention of the user directly building a nested structure is particularly advantageous. The user need not create another table and then link it back into a master table to create a nested structure (e.g., creating an Orders table and then linking it back into a Customer's table, via a foreign key relationship). In the system of the present invention, as shown by the example above, the Orders table is "owned" by the surrounding document, so that there is no need for the user to define explicit referential integrity to be imposed on it. Integrity is instead maintained through this ownership hierarchy, which the user can modify to suit his or her needs. If the user deletes the Shostak record at the top level, for instance, then all Shostak records in the views also go away, since they are "owned" by the top-level record.

In prior art systems, in contrast, when the user creates a separate table, such as an Orders table apart from an existing Customers table, the possibility exists that the user could create an Orders record which is orphaned, that is did not belong to any customer. In such systems, great pains are taken to prevent this, such as by adding elaborate referential integrity constraints. In the system of the present invention, however, such constraints are wholly unnecessary, because the sub-table (such as the Orders table) is owned by the record—it forms part of the document.

7. Pages (Reports)

Figure 11A:
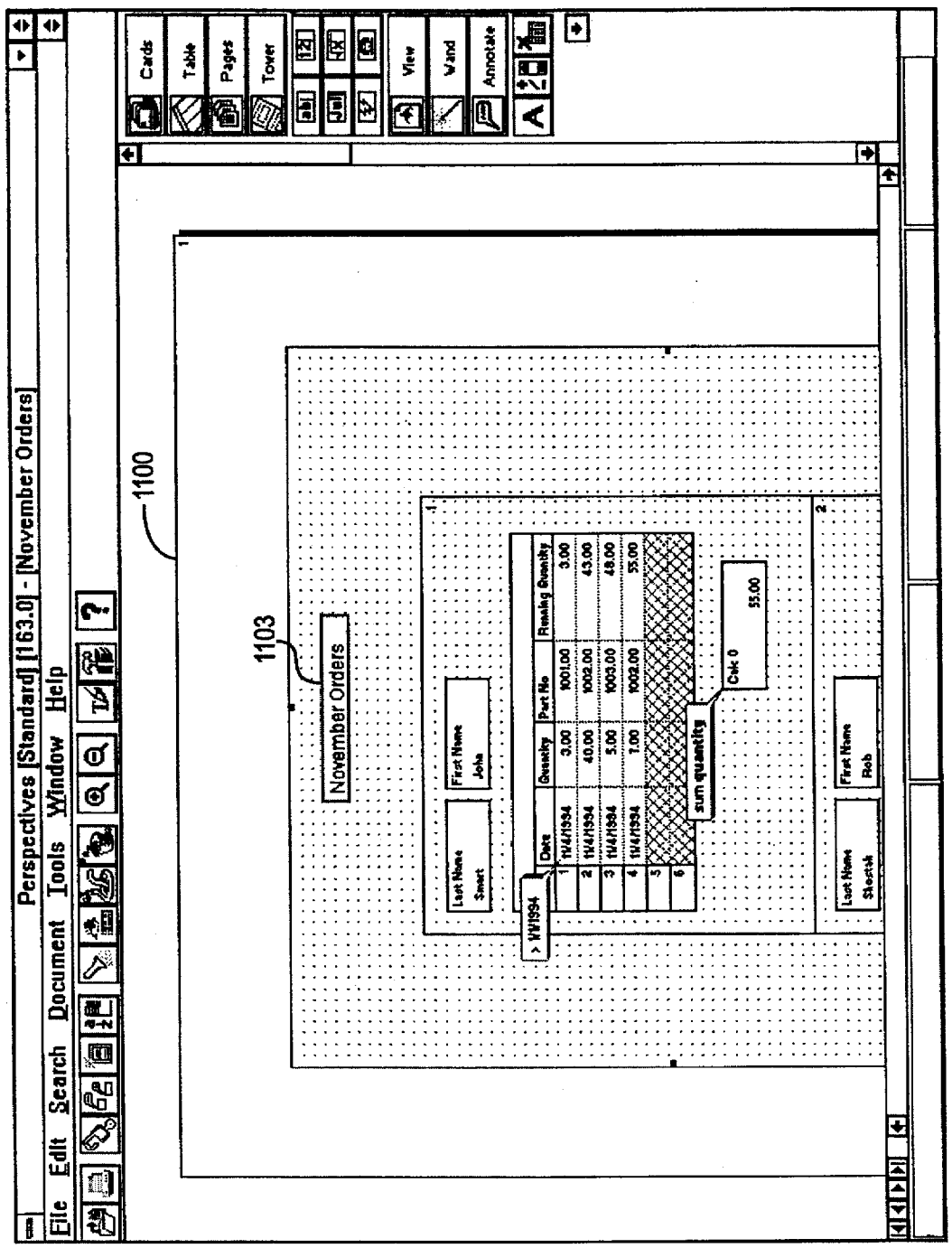
FIGS. 11A–F are bitmap screenshots illustrating creation of a report ("Pages") in the system of the present invention.

Using a traditional system, a user would have to invoke a report generator—a separate subsystem—to create a report. In the system of the present invention, however, a report is just another style of the document (like Tower or Table). Using the Magic Wand tool, the user can instantly convert the document of the present example into a report or "Pages." The result of this operation is illustrated in FIG. 11A, which shows a report or Pages perspective 1100 of the document. The user can use the magnify and de-magnify speed tools of the Tool bar to zoom in or out, respectively. As with other perspectives, all objects are present and are "live."

The user can further customize this particular perspective, such as by adding text 1103 (e.g., "November Orders"). Using property inspection/setting technique, the user can modify properties of objects, such as the font of text 1103, by simply clicking on the object and specifying a new value for the property. All changes by the user are effected immediately.

Of particular interest is the fact that, like other objects in the system, the report is always "live." Thus, the user can interact directly with elements of the report, such as adding or modifying data, and his or her changes will be reflected immediately. Moreover, changes occurring elsewhere, such as addition of a new record in a top-level document, will be immediately reflected in the live report.

Figure 11B:
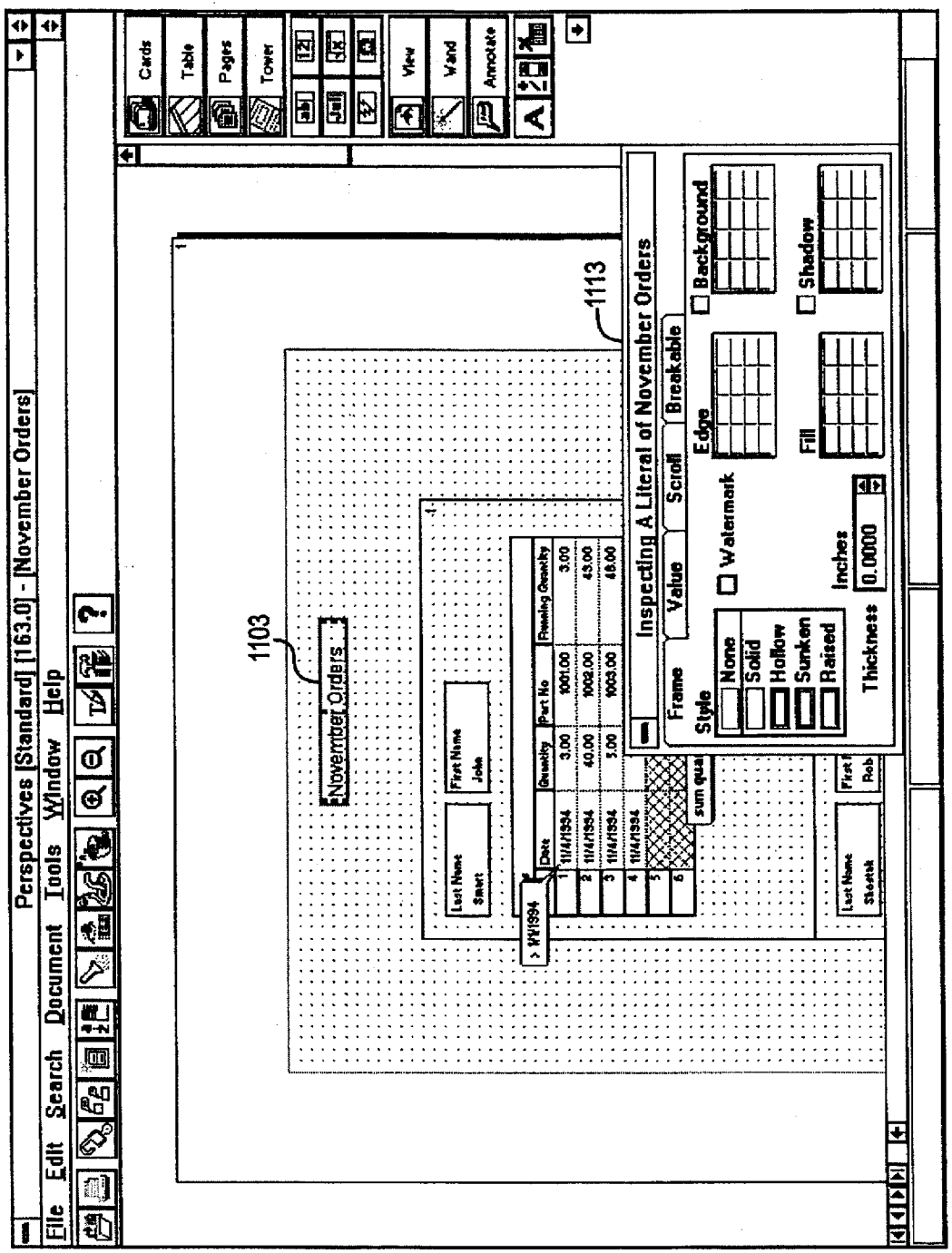

FIG. 11B illustrates property inspection of the text object or title 1103. Upon the user right-clicking on that object, the system displays inspector dialog 1113. The dialog 1113 is a tabbed dialog having properties specific for the selected object (here, a text object). In this manner, the user can easily effect changes to properties of the object and then have the system immediately apply those changes to the object.

Figure 11C:
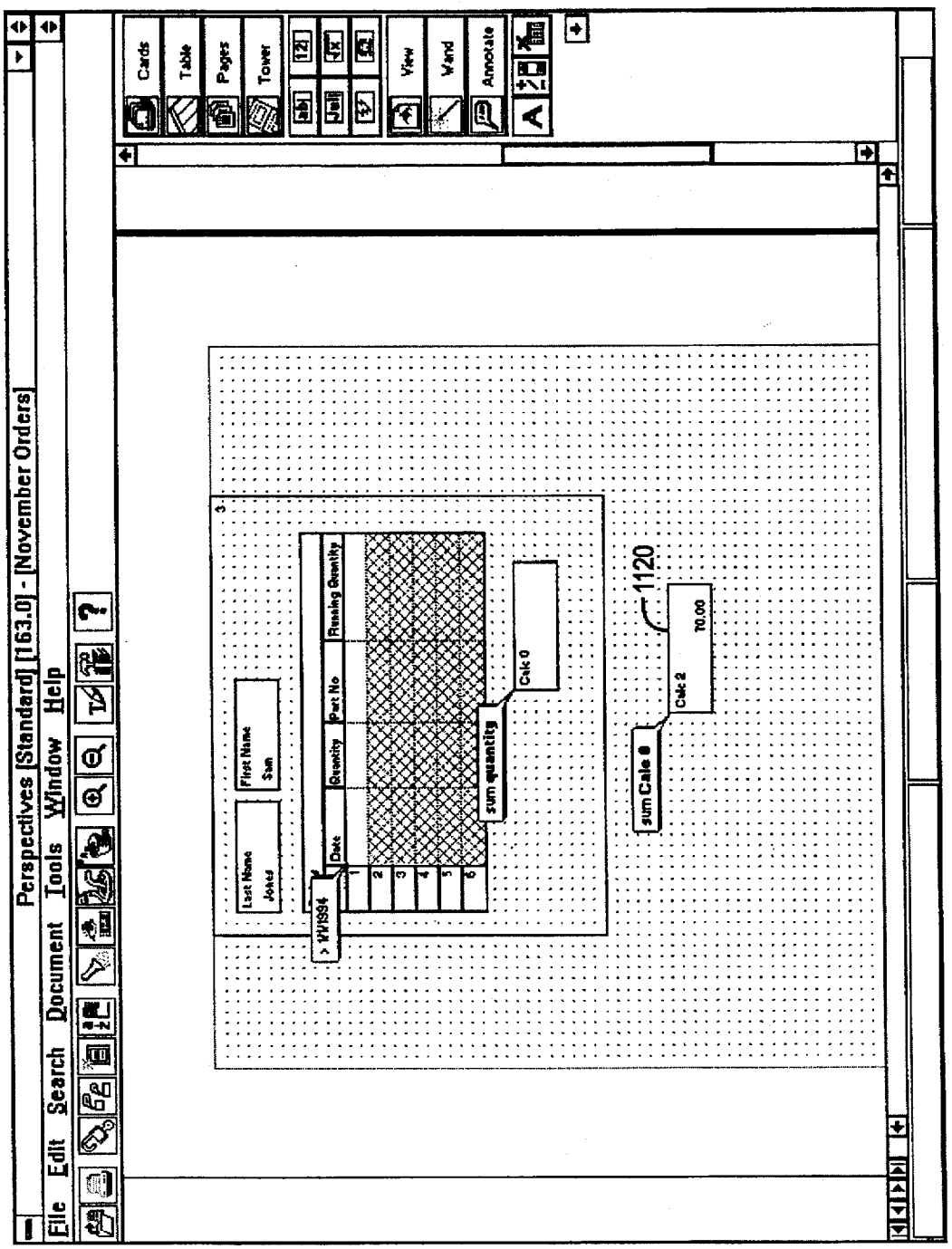

FIG. 11C demonstrates the live nature of the report. For the present example, three records have been entered, that is, "Smart," "Shostak," and "Jones." In FIG. 11C, the user has scrolled down to the Jones record of the live report. Since a report in the system of the present invention is just another style of a form, the user can continue to interact with his or her data in the report at any time.

As shown by FIG. 11C, the user can scroll down to any record in the report, such as the last record (i.e., the Jones record for the example at hand). There, the user can continue to add other objects, such as the calculated field 1120, which serves as a "grand total" for all records (i.e., it sums the Calc zero field which, in turn, is a sum of each record's Orders Quantity). Again, since it is live, as soon as the field is entered by the user, it manifests its true value (here, 70.00).

Figure 11D:
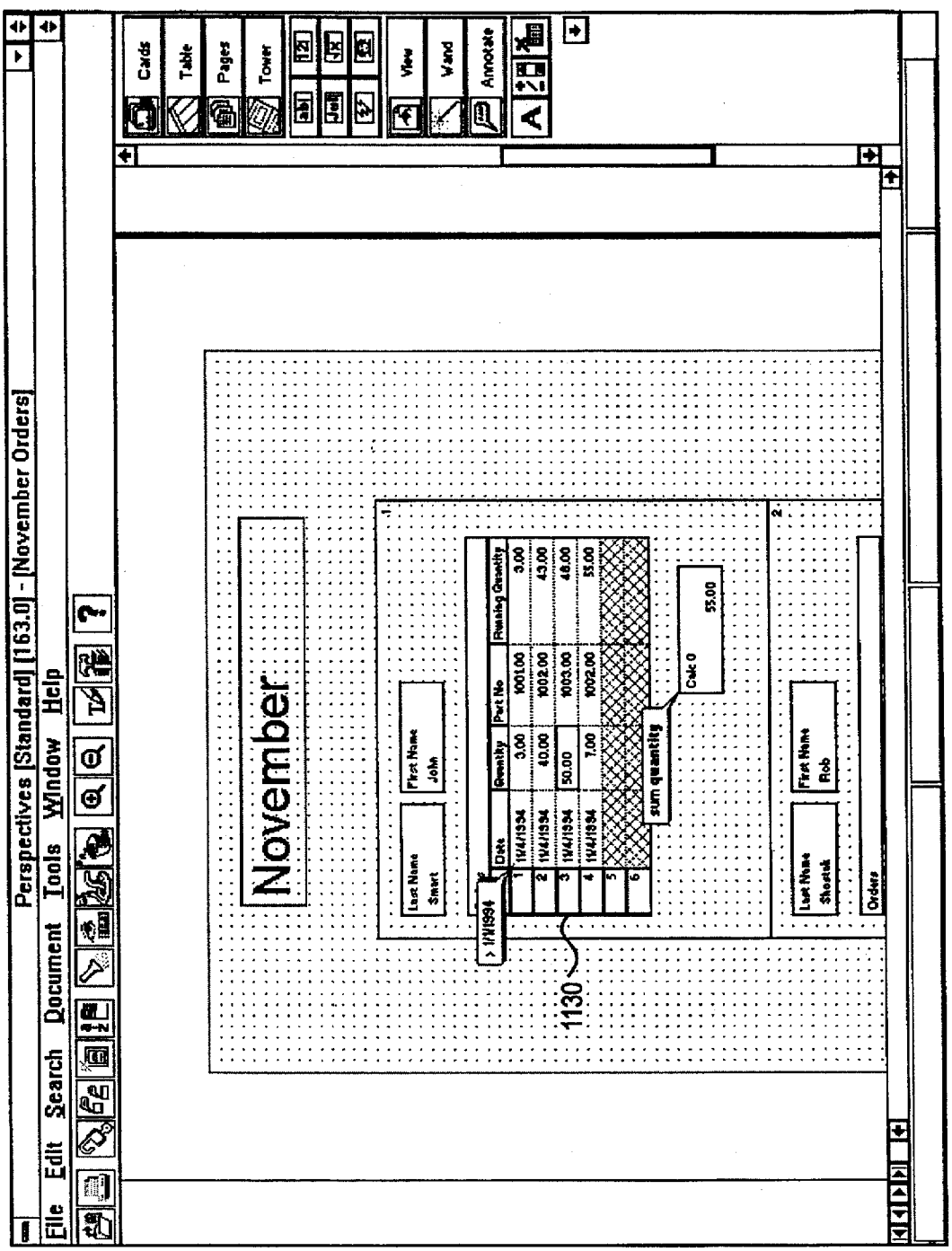
Figure 11E:
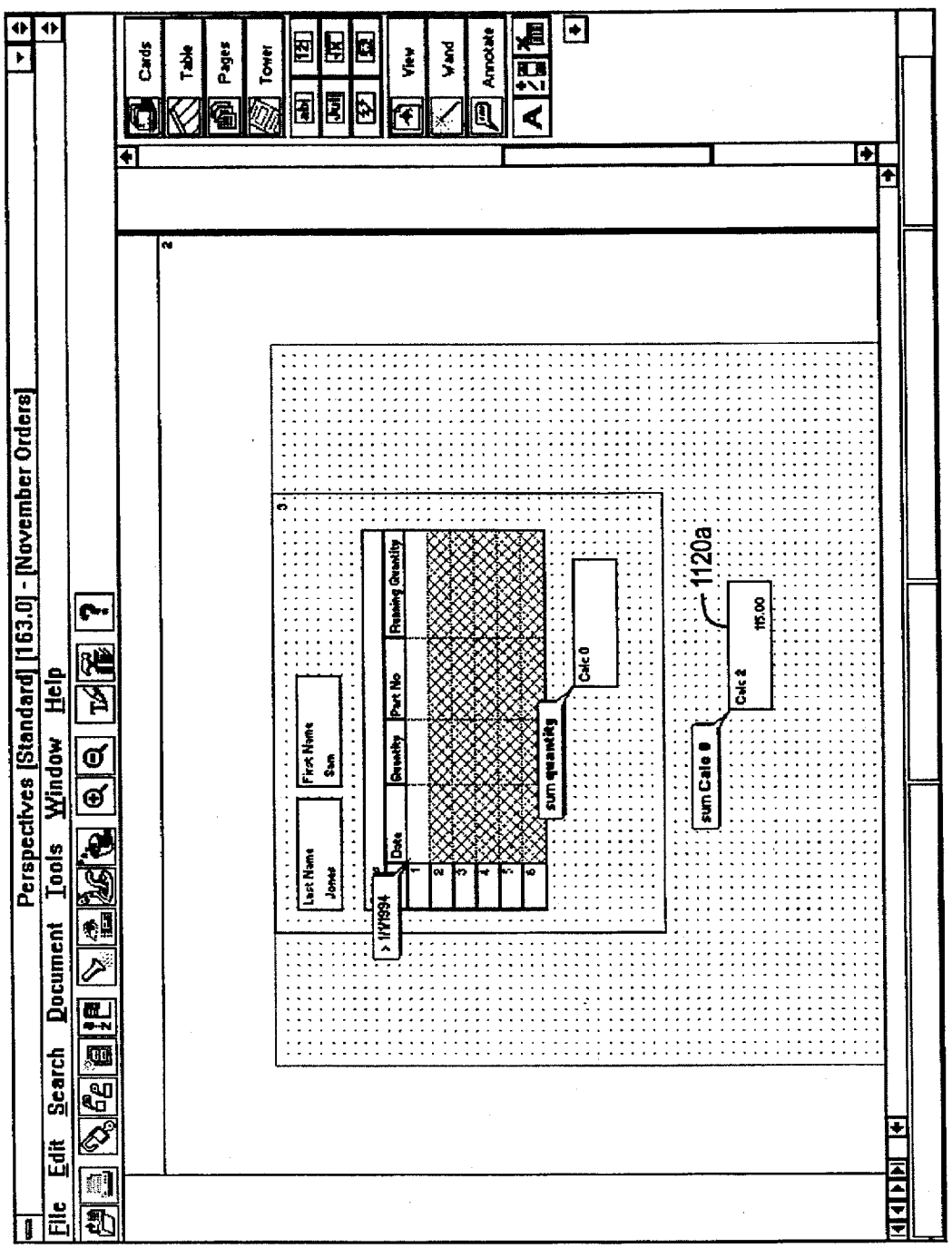

This live nature of the report is illustrated still further by FIGS. 11D–E. In FIG. 11D, the user has scrolled back up to the first record of the report (i.e., the Smart record). Here, the user modifies the third Orders record, shown at 1130. Specifically, the user enters a new value of 50.00 in the Quantity field (from its previous value of 5.00). FIG. 11D shows the state of the report just before the user posts the entry (i.e., before pressing the "Return" key). Upon the user entering the changed value, all fields in the report dependent on that value are immediately updated to reflect the change, including the "Grand Total" calculated field, now shown as 1120a in FIG. 11E.

Changes elsewhere in the report are immediately reflected to their respective dependencies. As this November Orders report is a view on the Customer Orders document, any changes made to data entered in a report are automatically and simultaneously reflected in the top-level document. In a corresponding manner, any changes made in the top-level document are reflected immediately in the report. As the user adds new records, either to the top-level document or to the report, the system automatically re-calculates and re-paginates the report on-the-fly. By maintaining the changes incrementally, the system of the present invention may reflect such changes instantaneously (i.e., without re-flowing the document). All the while, the end user is not burdened with understanding technical concepts, such as having to open a table relative to a particular index. In the system of the present invention, those technical concepts are simply not surfaced to the end user.

Figure 11F:
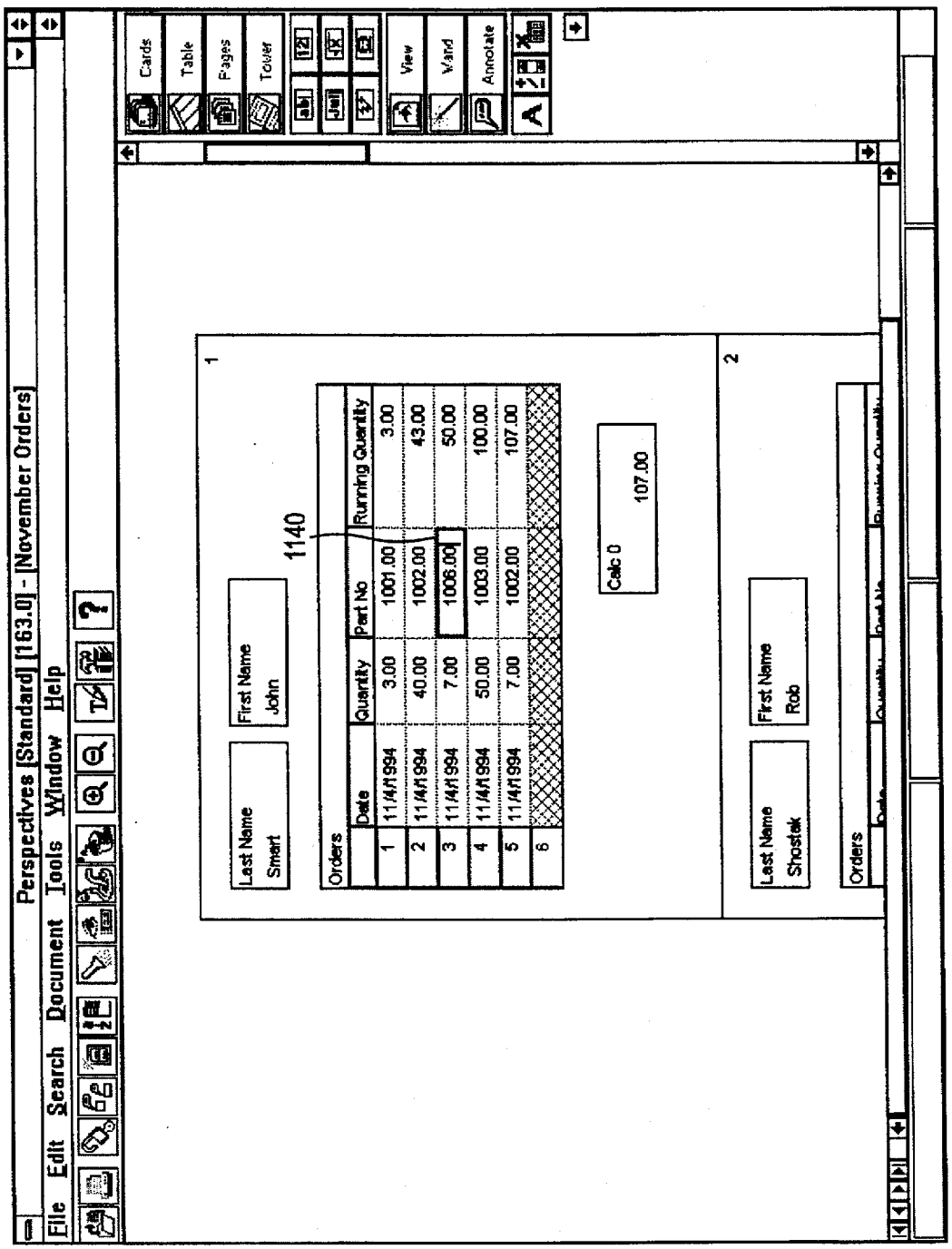

At any time, the user can have the system drop the design cues, as shown in FIG. 11F. Upon completing a design, the user can invoke a "design lock" command for "locking" the design of a document. As shown in FIG. 11F, for instance, the user has design locked the document, whereupon the system disables the design tools for that document (e.g., as indicated by the "graying out" or disabling of those tools). Thus FIG. 11F shows a completed report for the simple order entry application of the example. Since the report remains live, the user can edit his or her data in the report at any time, such as indicated by the data entry at 1140.

8. Advanced Features

The foregoing example has focused on a simple application which may be created using the tools of the present invention. For clarity of description, the above example has not addressed the more powerful features afforded by a real-time view model, as taught by the present invention. In particular, the model replaces the notion of joins and conventional queries. This is perhaps best illustrated by way of example.

Figure 12A:
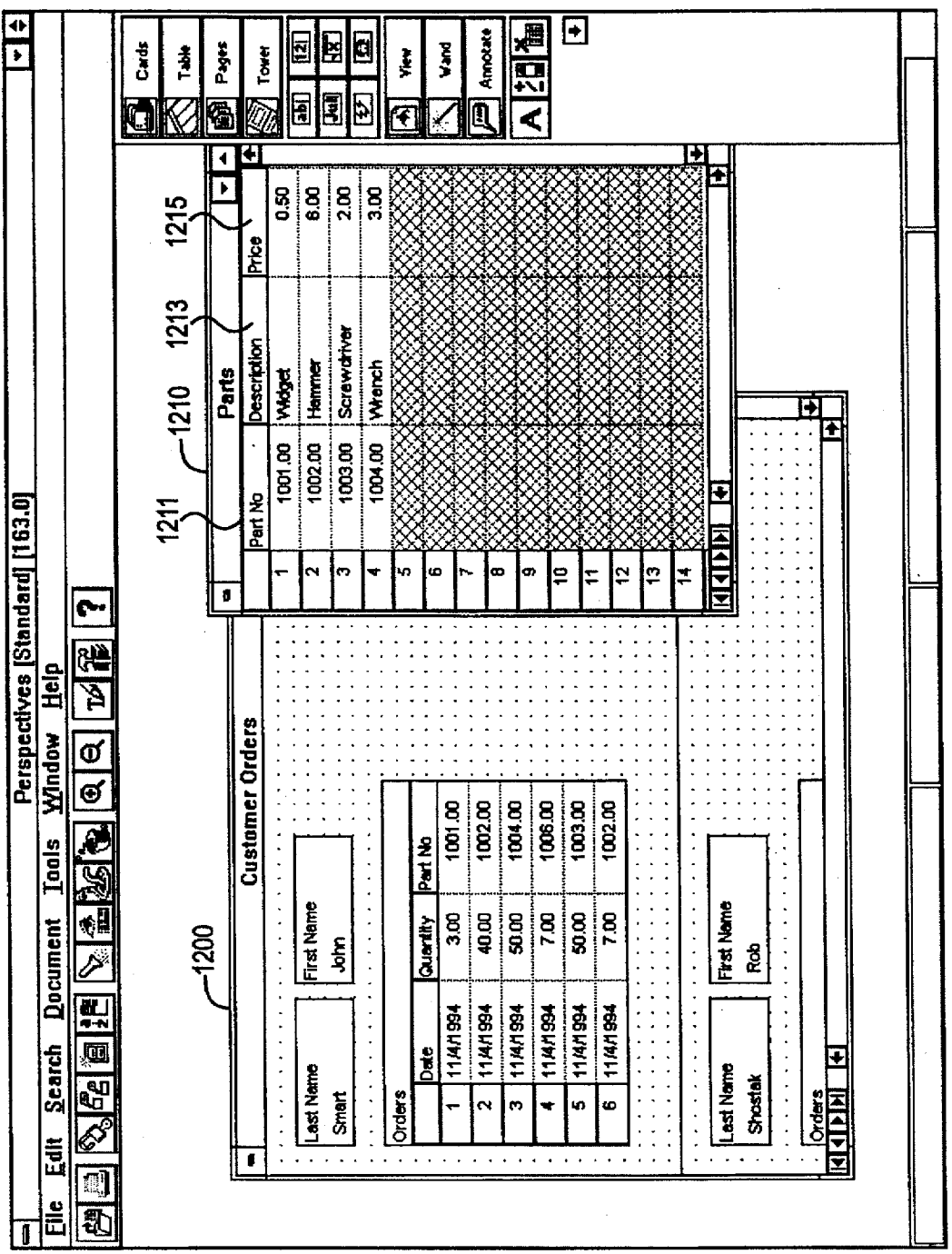
FIGS. 12A–D are bitmap screenshots illustrating advance features, including creating a "lookup" table.
Figure 12B:
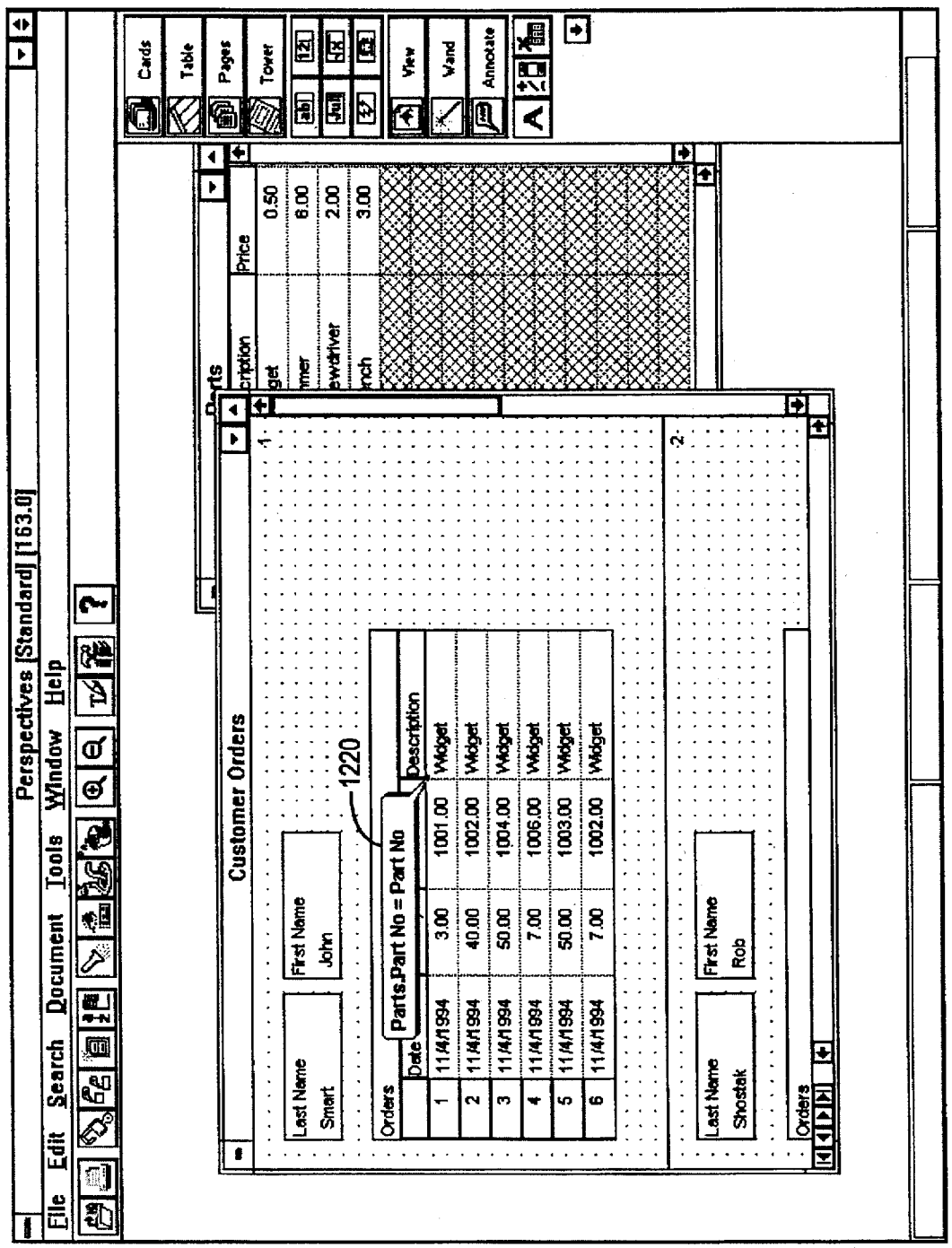

As shown in FIG. 12A, the user adds a new table to the project, Parts table 1210. The Parts table 1210 is a new document for the project. Recall that the user is building a set of perspectives (i.e., a set of forms and reports) which are all part of the project, and have a relationship to each other. The Parts table 1210, as shown, comprises a Part No field 1211, a Description field 1213, and a Price field 1215. The table as shown has data entered into it by the user. Now having created the Parts table, the user might want to bring up the description of the part. To accomplish this, the user clicks on the View tool and clicks on the Description field (1213), and then drags that over to the Orders table (at a position after the Part No field). As a result of this user action, the system automatically displays an Annotation 1220 at FIG. 12B which describes the linkage that is appropriate. For this example, the appropriate linkage (as is already automatically recognized by the system) is to have the Part No from the Orders table equal to the corresponding Part No in the Parts table. This is expressed in the Annotation Bubble 1220 (automatically by the system) as: Parts.Part No=Part No. Internally (i.e., not surfaced to the user), the system has automatically recognized the linkage between the two tables. For flexibility, the system allows the user to manually enter a linkage, thus overriding the one automatically provided by the system.

Since the linkage suggested automatically by the system is the one desired by the user for this example, the user can proceed to post the annotation (e.g., by simply pressing the "Enter" key). In response to this user action, the system displays the correct description for each corresponding Part No in the Orders table (shown at 1230), thus creating a look up for each Part No displayed in the Orders table. In essence, the user is creating the underlying structure dynamically. In prior art systems, in contrast, a user would have to create the data model using conventional and confusing means, such as having to define the Part No field as a key and then create a foreign key link between the Orders table and the Parts table.

Moreover, this system automatically maintains integrity by not allowing the user to delete the Parts table. In other words, the system will not allow the user to delete a table which, in turn, has a dependent document. Since this is maintained automatically by the system, the user need not concern himself or herself with defining, maintaining, or even understanding integrity constraints.

Figure 12C:
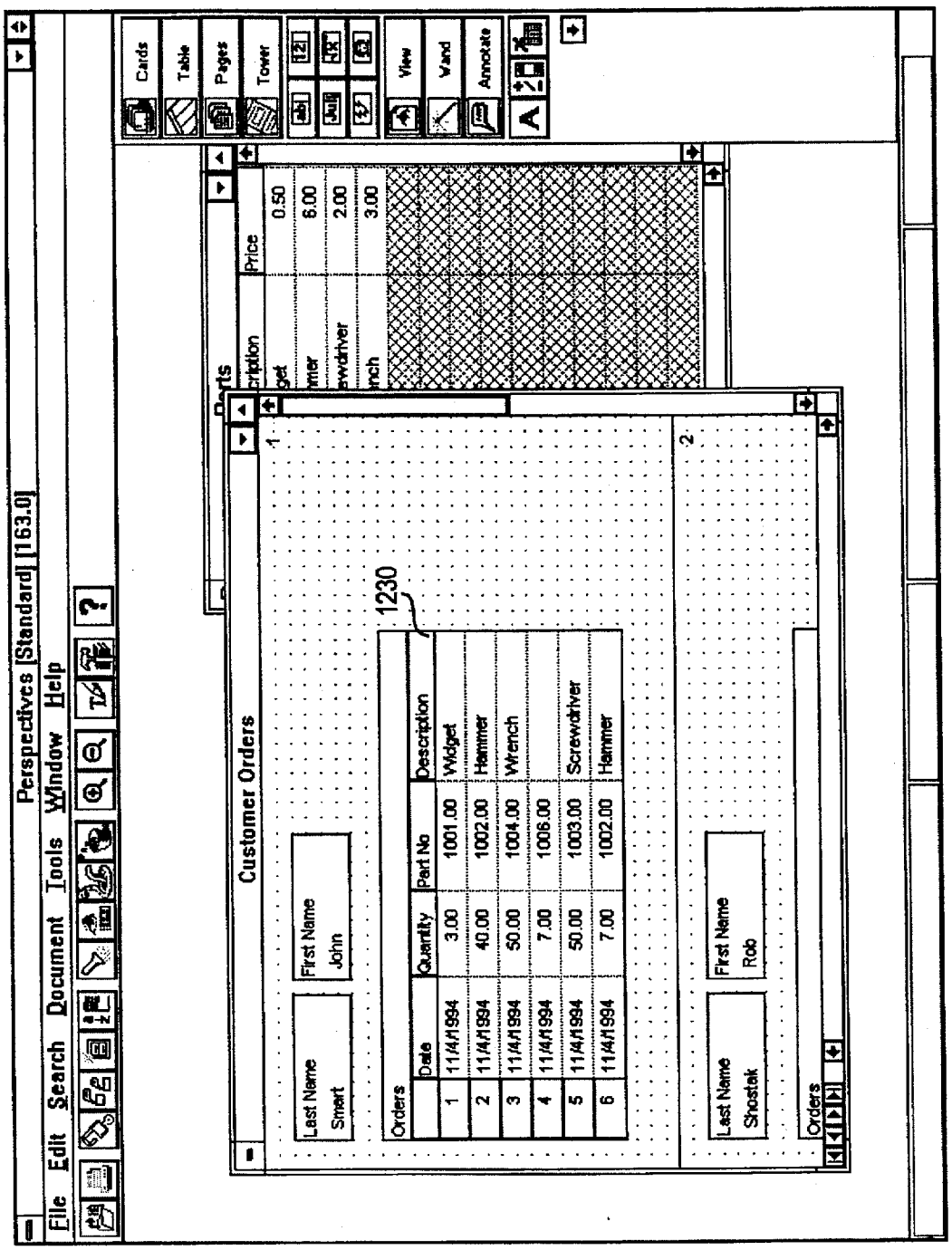
Figure 12D:
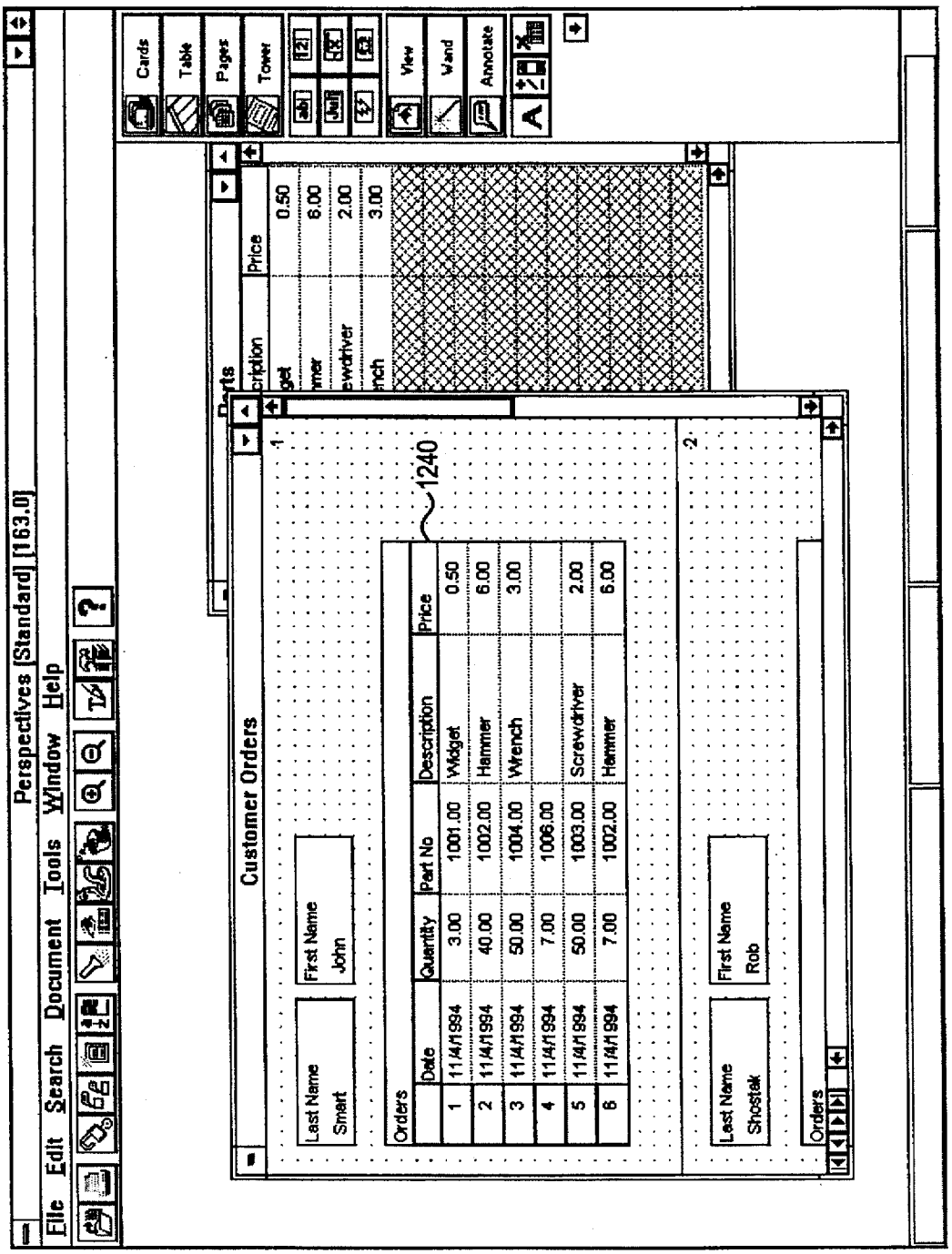

Continuing in a manner similar to that above, the user can easily add a price "look up" to the Orders table. Specifically, the user clicks on the View tool, clicks on the Price field in the Parts table, and then drags the cursor over to the Orders table, at a position after the Description field, shown at 1230 in FIG. 12C. As before, the system displays an Annotation Bubble (not shown) suggesting the correct linkage, here Price=Parts.Price. Accepting this default, the user posts the annotation by pressing the "Enter" key. In response to the user's action, the system now displays the Orders table with a price "look up," as shown at 1240 in FIG. 12D.

The integrity automatically maintained by the system may be stated in general terms. The system prevents the user from deleting any structure which is needed in some way by the system, such as by an annotation, by an expression, or the like.

An advantage of this approach is that the user is not dealing with a low-level structure, such as defining key fields for various tables. Instead, the user is dealing with the level of the nested structure which corresponds with the user's own intuition about how the data should be arranged.

Figure 13A:
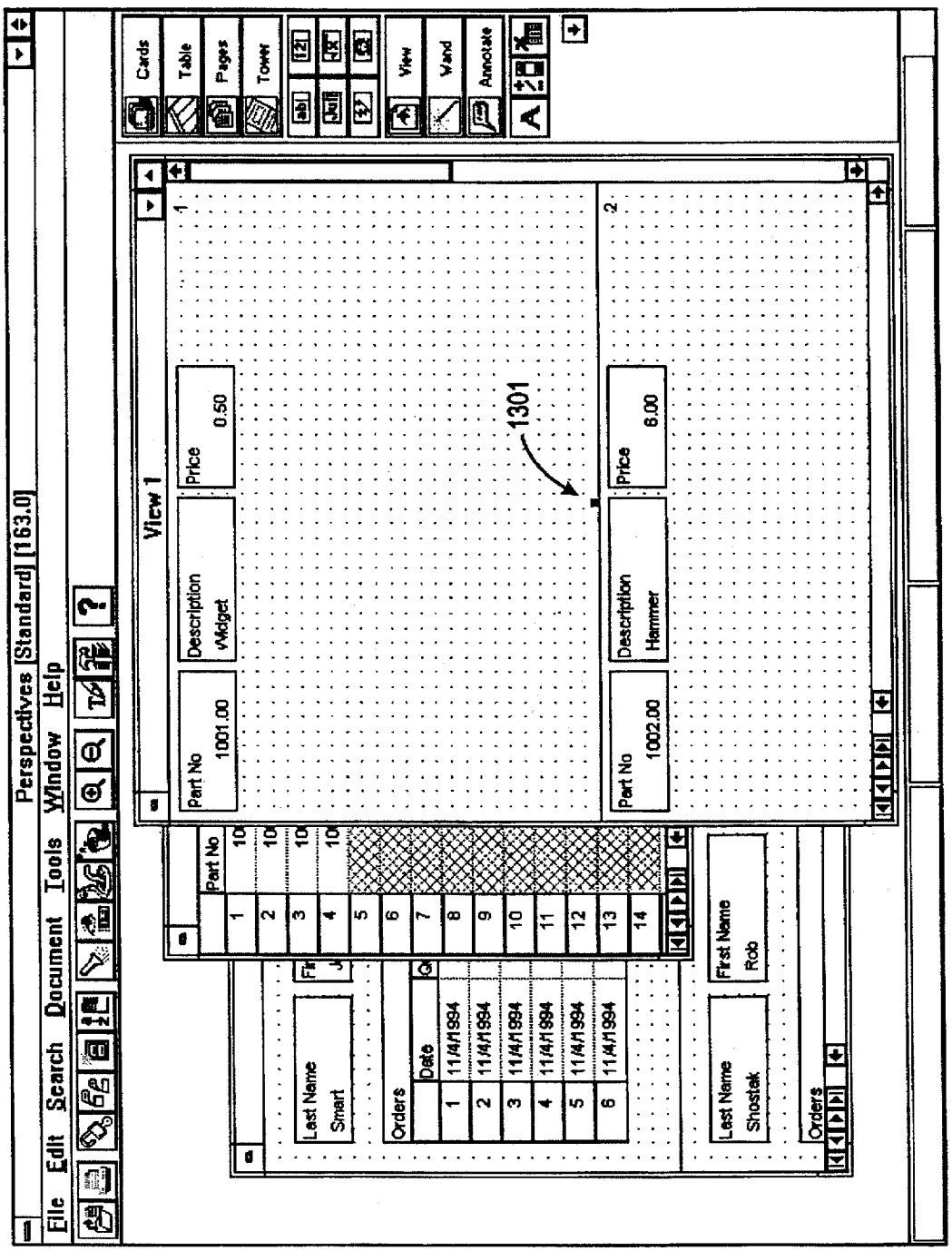
FIGS. 13A–B are bitmap screenshots illustrating user creation of a "join."
Figure 13B:
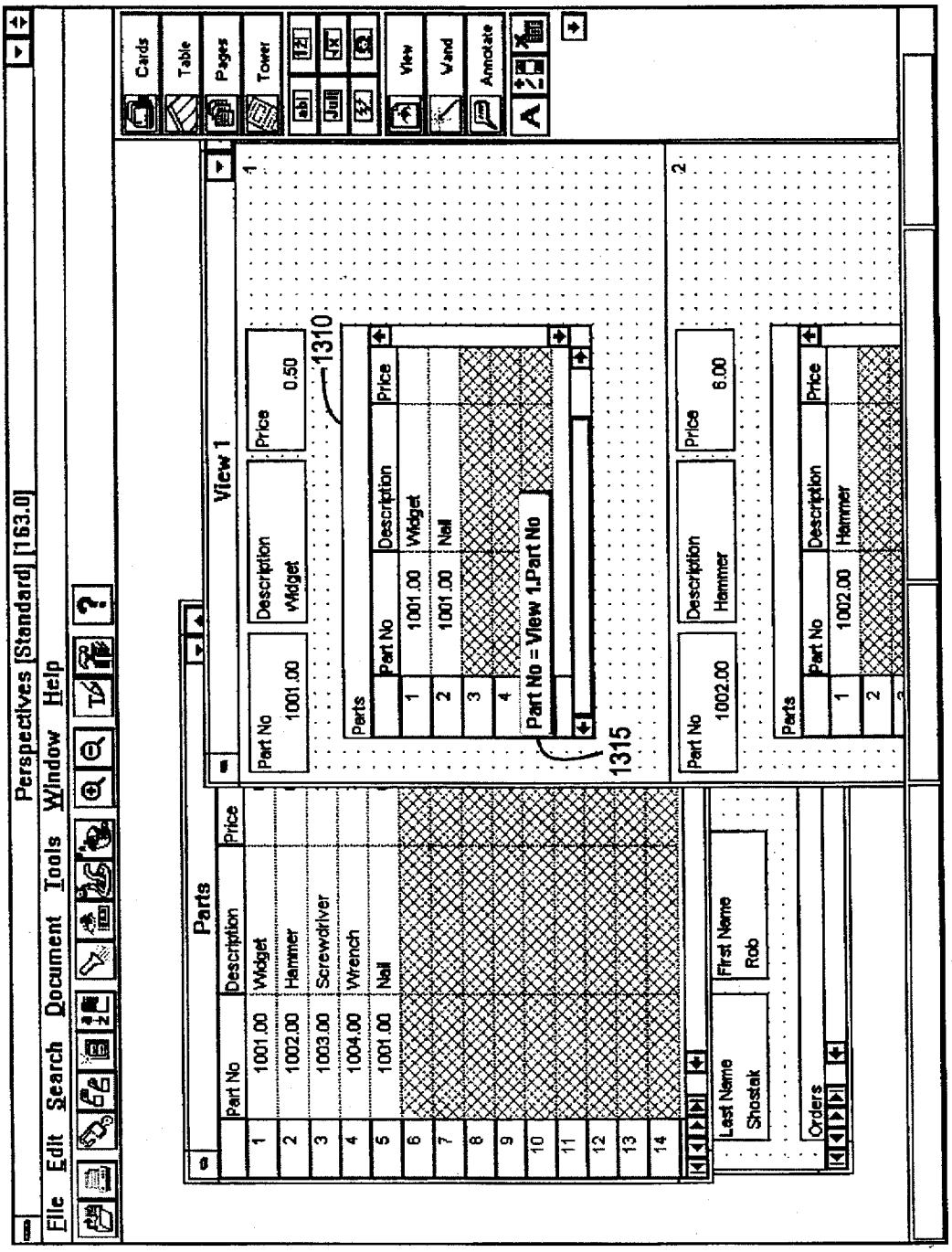

The notion of a "view," as taught by the present invention, gives the effect of a join (in conventional systems). This is illustrated by FIGS. 13A–B. In FIG. 13A, the user has taken a view of the Parts table (using the View tool) and converted that into a Tower style (using the Magic Wand tool). The user opens up some room in the record by dragging down on the resizing rectangle 1301, with the screen cursor. In FIG. 13B, the user takes a view of that table again but instead of marking it out at the top level to create a new view, the user embeds it in the records of View 1, as shown at 1310. Once again, the system displays an Annotation Bubble, as shown at 1315; the system suggests the default linkage of Part No=View 1. Part No. When the user posts the annotation, the system performs an outer join, thus giving all records for this Part No.

9. Property Inspection

Figure 14A:
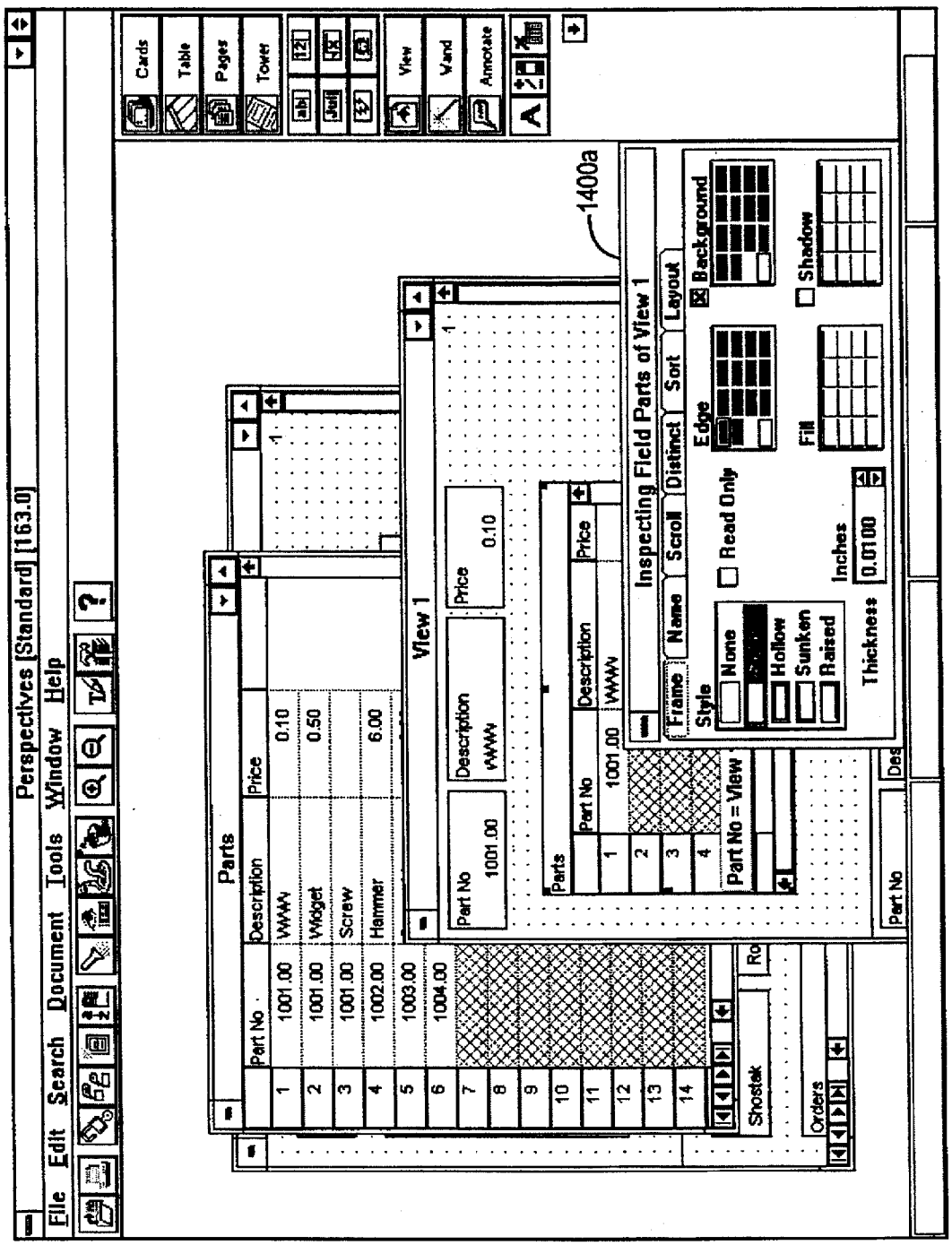
FIGS. 14A–F are bitmap screenshots illustrating steps for inspecting and setting properties of objects in the system.
Figure 14B:
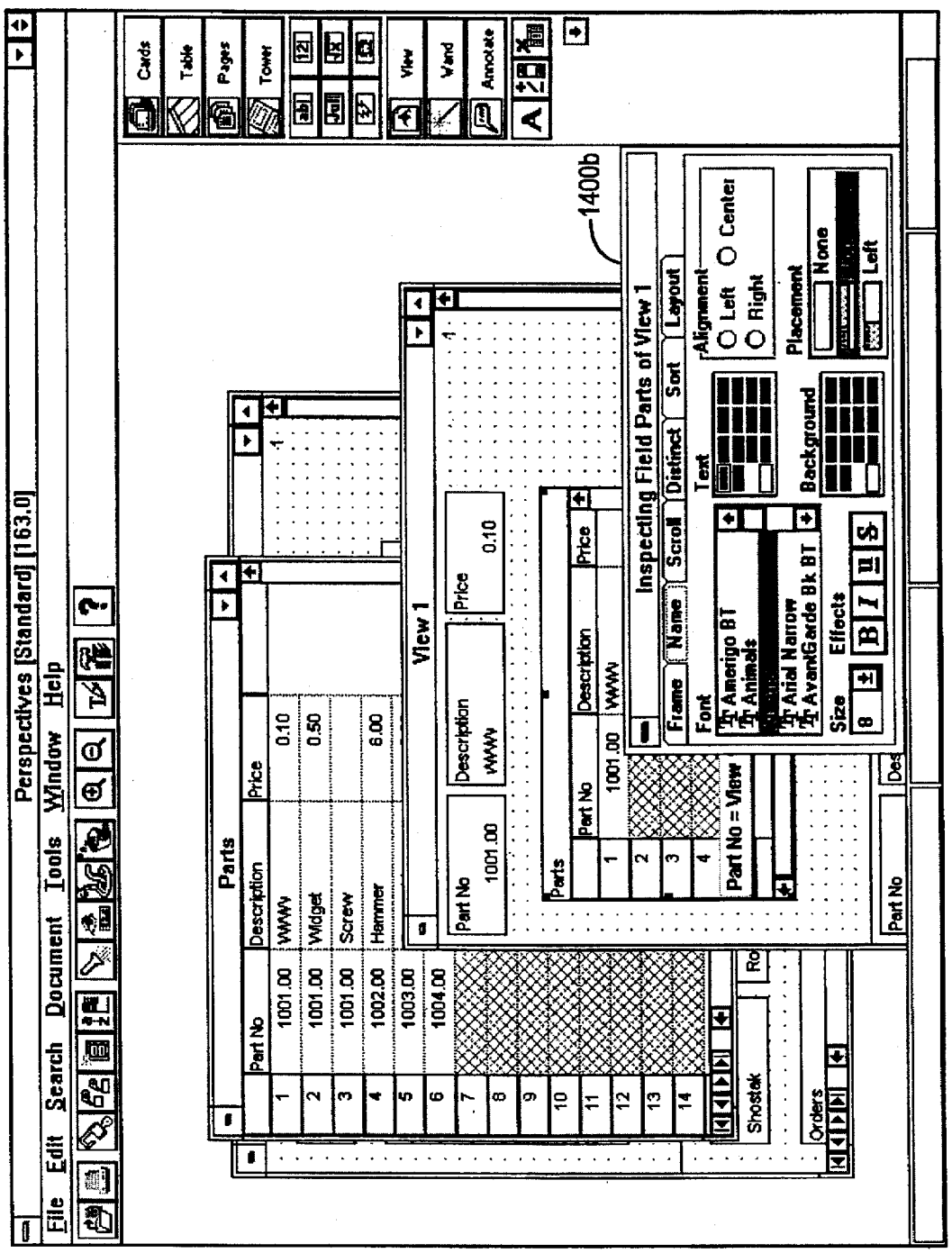
Figure 14C:
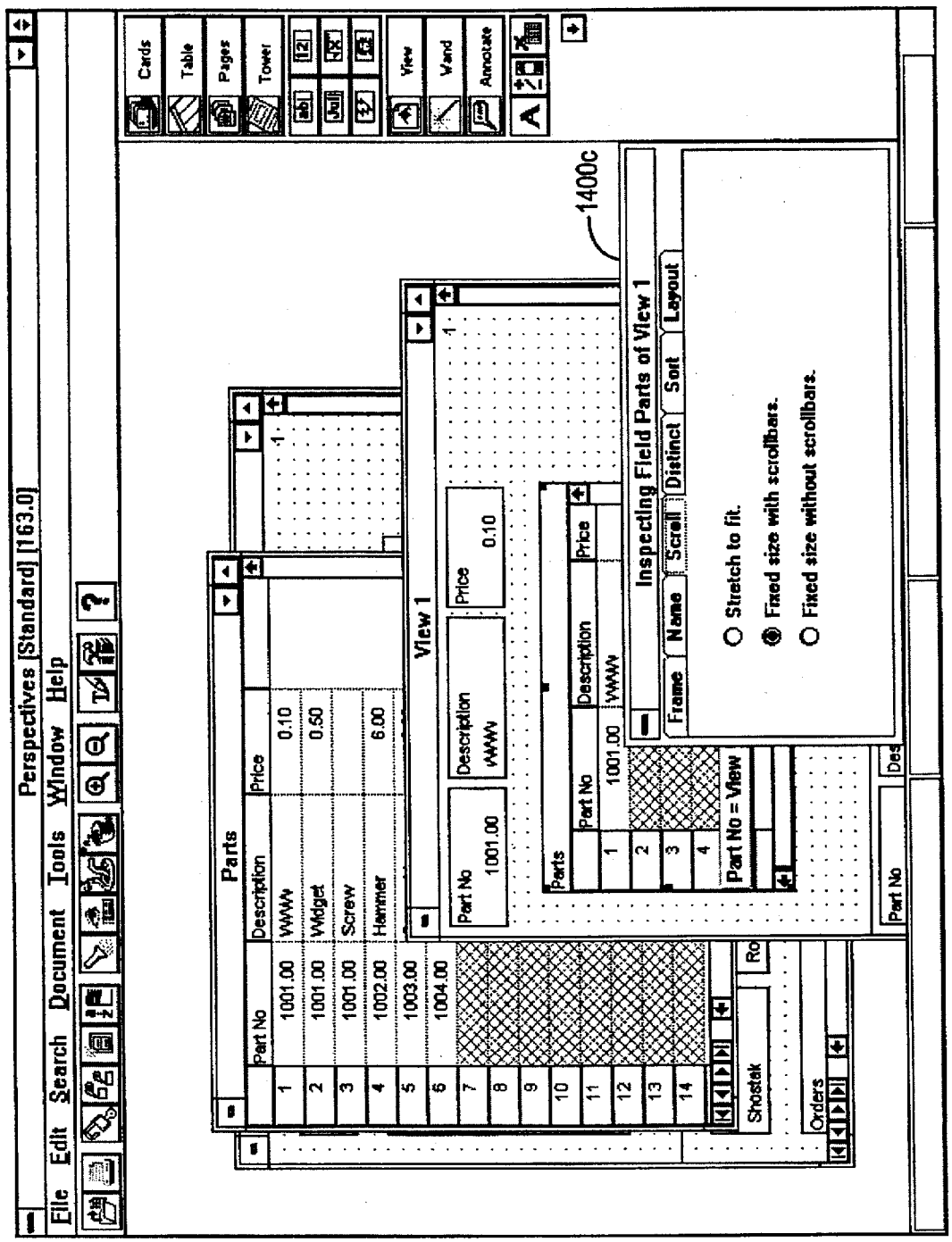
Figure 14D:
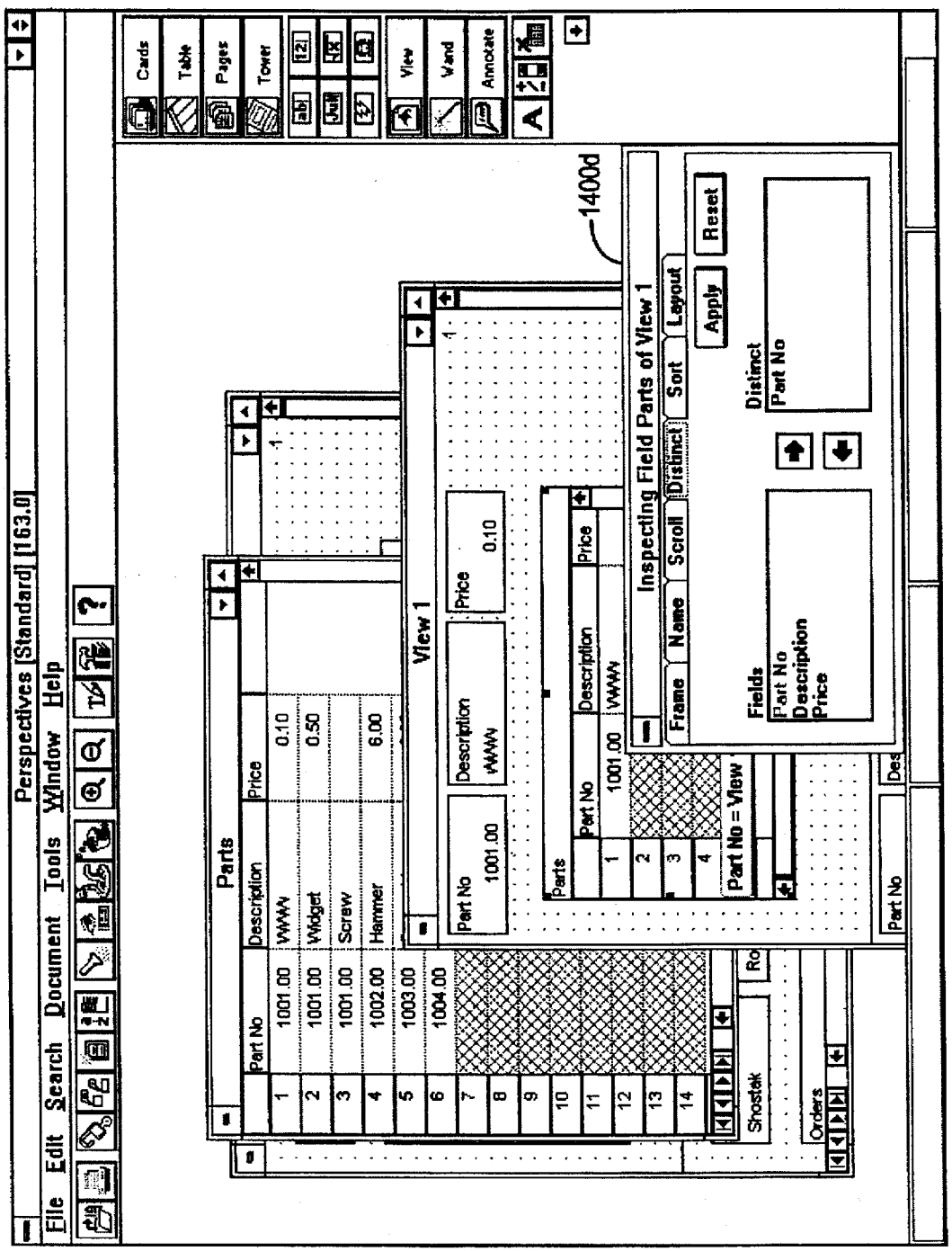
Figure 14E:
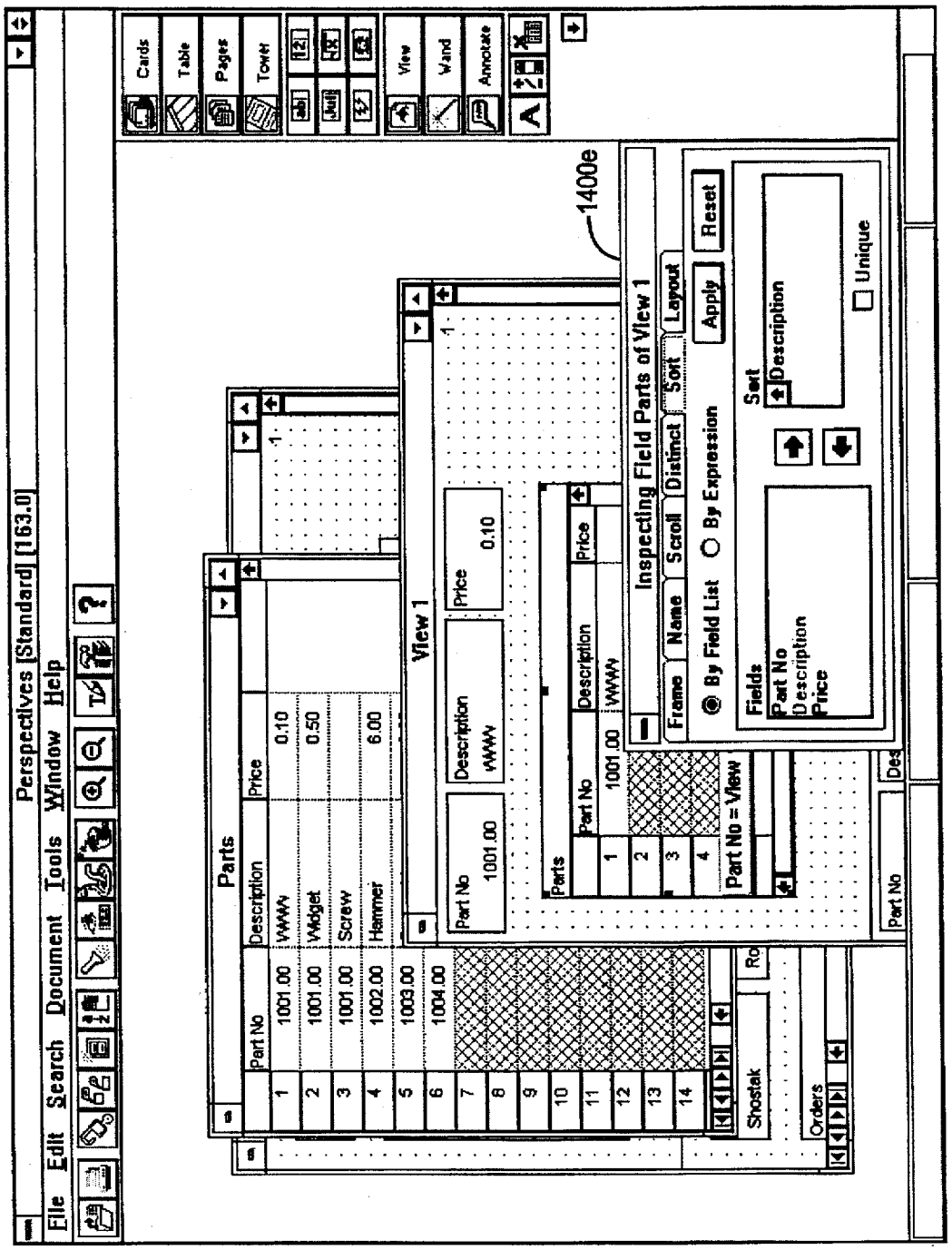
Figure 14F:
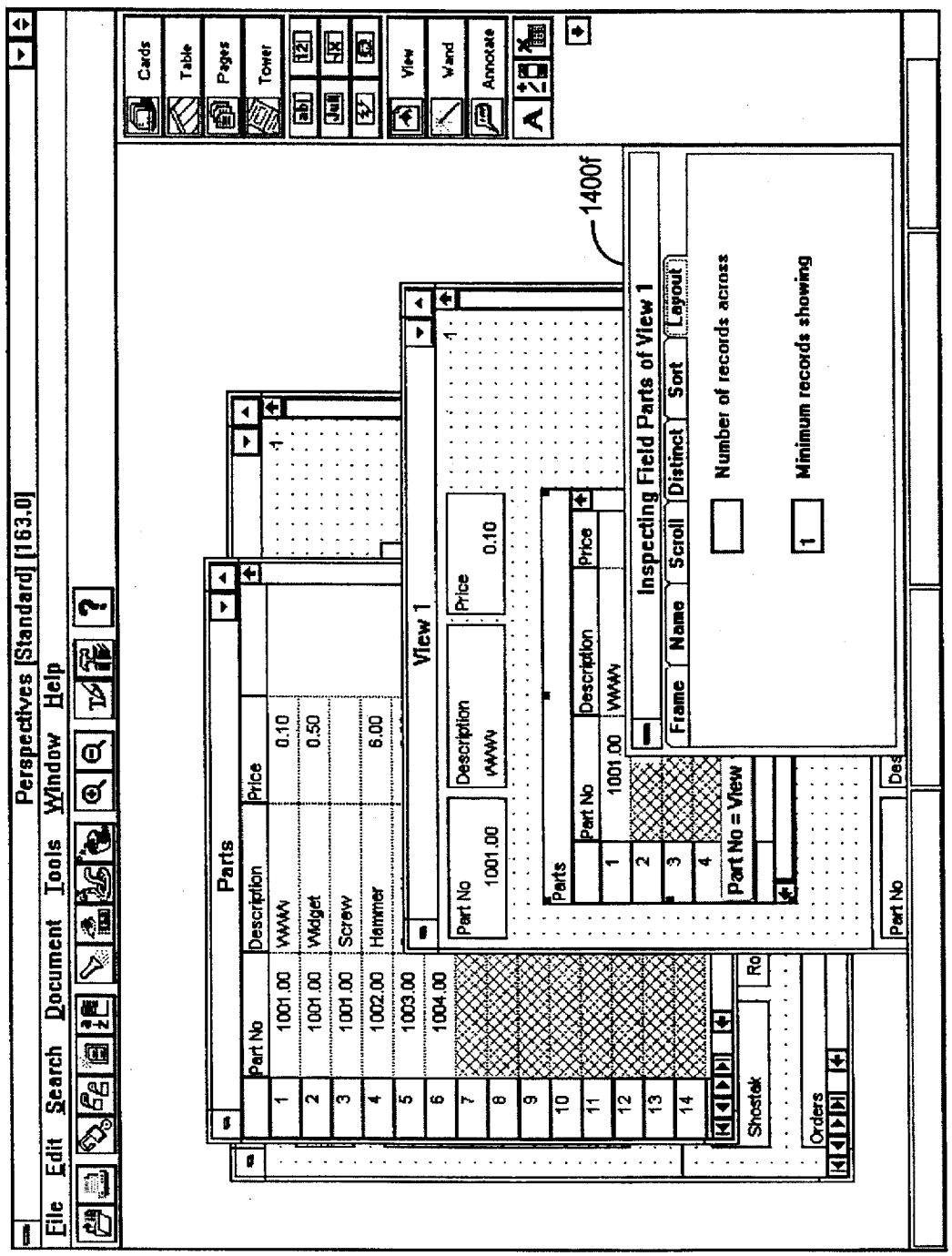

FIGS. 14A–F illustrate an exemplary method of the present invention for inspecting and setting properties of objects, such as the embedded Parts table of View 1. In response to a user request for property inspection (e.g., by the user right-clicking on the desired object), the system displays an inspector dialog specific for the object, such as inspector dialog 1400a. For the Parts table, specific properties include Frame, Name, Scroll, Distinct, Sort, and Layout. FIG. 14A illustrates that the Frame tab is associated with a particular property panel which has user-selectable choices for defining the Frame of the table (e.g., style, edge, color, shadow, fill, and the like). FIG. 14B illustrates the property panel associated with the Name property, as shown by the dialog 1400b. Again, the panel includes user-selectable choices for modifying the Name property. Similarly, FIG. 14C illustrates the panel associated with the Scroll property, as shown by the dialog 1400c. Dialog 1400d, shown in FIG. 14D, shows the property panel for the Distinct property, which specifies how many instances of duplicate records are displayed. Dialog 1400e, in FIG. 14E, shows the Sort panel which is associated with the Sort property. Here, the user can specify a sort order for the table. Finally, FIG. 14F illustrates the panel associated with the Layout property, as shown in the dialog 1400f.

10. Live maintenance of sort orders

In a preferred embodiment, the user can attach sort orders to both view and non-view objects—that is, to any sequence (at any level) in a document. The sort order is maintained in a live way. From the user's perspective, there is no notion of keys or indexes. All the user is doing is specifying, in a declarative fashion, that a given sequence, whether in a document, subdocument, or the like, has a user-specified sort order. From that point on, the system maintains that sort order for that given sequence (irrespective of how the data are stored in the underlying document).

Consider, for instance, an example where the user has a view in the form of a report showing the top ten sellers for a given month. The sequence of sellers may already have an order, such as in a descending order of units sold. Suppose further that during display of this report a new data record is posted (e.g., a sales order record) to a base table which causes another seller to become the number one seller. The report, which is live, will float that item (new top seller) to the top of the report.

Note particularly that, in the system of the present invention, the sort order is attached to a view (the report) which itself is an arbitrary query. An aspect of the "liveness" of the system, therefore, is that the system supports declarative specification at all levels of operation; there is no "sort command" per se, such as is commonly found in procedurally-oriented systems. In prior art systems, in contrast, new or additional sort orders (e.g., secondary indexes) are applied to underlying tables. Quite simply in prior art systems, such as Access® or Approach®, there is no way in which the user can specify a sort order on a live report. Instead, the user would have to instruct such systems to regenerate the report with the new sort order (which is applied in one pass and is not subsequently maintained).

Internal Operation

A. General Design Considerations

1. Storage of arbitrary objects

As can be discerned from the illustrated examples of system operation, the present invention employs data structures which are of a more general nature than ones employed by conventional relational database systems. Instead of having relational tables, for instance, the system of the present invention employs objects which have nested structures which, in turn, may themselves have view criteria, sort criteria, and the like associated with them. To support this level of functionality, it was necessary to create a new physical organization at the bottom level of the system (i.e., at the level of storage).

By way of review, each table in a conventional relational database is normally stored as either a list of records or fixed-size storage blocks. The data records in dBASE® are representative of the former approach. There, each record has a fixed size (regardless of user-supplied data which it may store from one record to another), so that the nth record is located at a fixed offset from the beginning of the file. Borland's Paradox® typifies the latter approach: it employs fixed-size blocks with a certain number of records per block. Either approach, however, is much less general than that required for the system of the present invention.

The approach adopted by the system of the present invention is much more object-oriented than that found in relational database systems. In particular, there is a level of organization of the system which comprises persistent storage of arbitrary C++ data structures. This approach affords complete flexibility, for instance, allowing creation of data structures with arbitrary pointers within them, yet be able to store all this in a flat file.

2. Incremental query

Another aspect central to operation of the system, yet entailing additional difficulties in the design of the system, is the notion of an incremental query. As shown above during the operation of the system, the views are characterized as incremental queries. The notion is that if a new record is added to the system, or an old record is deleted, or an existing record is modified, the system, rather than re-doing or re-processing the query in order to produce a new answer, is able to do just enough work to reflect the modification.

In conventional systems, in contrast, a change or modification to underlying data would require those systems to re-do the query. Consider an arbitrary query in Paradox® that was specified in QBE (Query-by-Example), for instance. In operation, the user runs the query to generate an Answer table. If the underlying data changes, however, there is no way for Paradox to understand how the Answer has changed (as a result of the change to the base table), except by rerunning the query. And this limitation of conventional systems also holds true for dynamic "filters." Operating on a per record basis, "filters" are limited to relatively simple query conditions. With the live views of the present invention, in contrast, the user can have a query of arbitrary complexity, including joins, calculations, summaries, and the like—query conditions which simply cannot be achieved using prior art filtering technique. All told, the design of the system of the present invention required the invention of new methods in order to modify the results of a query in an incremental way.

3. Incremental maintenance of reports

A third design difficulty is the "liveness" of reports. Because they are paginated, reports are complicated objects. Consider the example of adding another record to a group or sub-sequence anywhere in a report. The addition of that record can have the effect of completely changing the pagination from that point in the report down until the last page. For a long report, such as one for a database having twenty to thirty thousand records, the task of understanding how such an arbitrary change in a record affects pagination is not trivial but may, instead, be quite complex.

Think of a report in terms of a series of little boxes, one underneath the other, some of which cannot be allowed to straddle page boundaries. In other words, a box at risk of straddling a page boundary must be "pushed" to the next page. However, the action does not occur in isolation, since the act of pushing this box to a new page will now change the way subsequent boxes break across pages. Repositioning of subsequent boxes may, in turn, lead to repositioning of still other subsequent boxes, and so forth and so on. All told, an arbitrary change to any one little box in the report may, as a result of the above described rippling effect, trigger numerous pagination changes throughout the remainder of the report. And since any particular box may be of an arbitrary size, it is a complex task to understand how any particular change will propagate (since no simple relationship exists which defines the problem).

Prior to the present invention, the only way that systems were able to determine the effect of such a change on pagination was to completely re-run the report (which is analogous to the previously described approach of prior art systems re-running a query for determining the impact of a modification). Incremental maintenance of reports, therefore, has a set of problems associated with it that are parallel to but different from those associated with incremental maintenance of queries.

B. Record Geometries

1. General

To solve the foregoing problem, the system of the present invention stores not only the data (of each record) in the database, but also stores the geometry associated with each record. In other words, storage in a database of the system of the present invention includes storage for both data (i.e., user-supplied values) and size (as an indication of the volume required for displaying each piece of data). In this fashion, the system may recompute the pagination for a document yet not recompute entities (records) which have not been modified. Since the size information is captured in the underlying table, the task of repagination is greatly simplified: boxes which have not changed do not need their volumes recomputed.

2. B-tree approach

Figure 15:
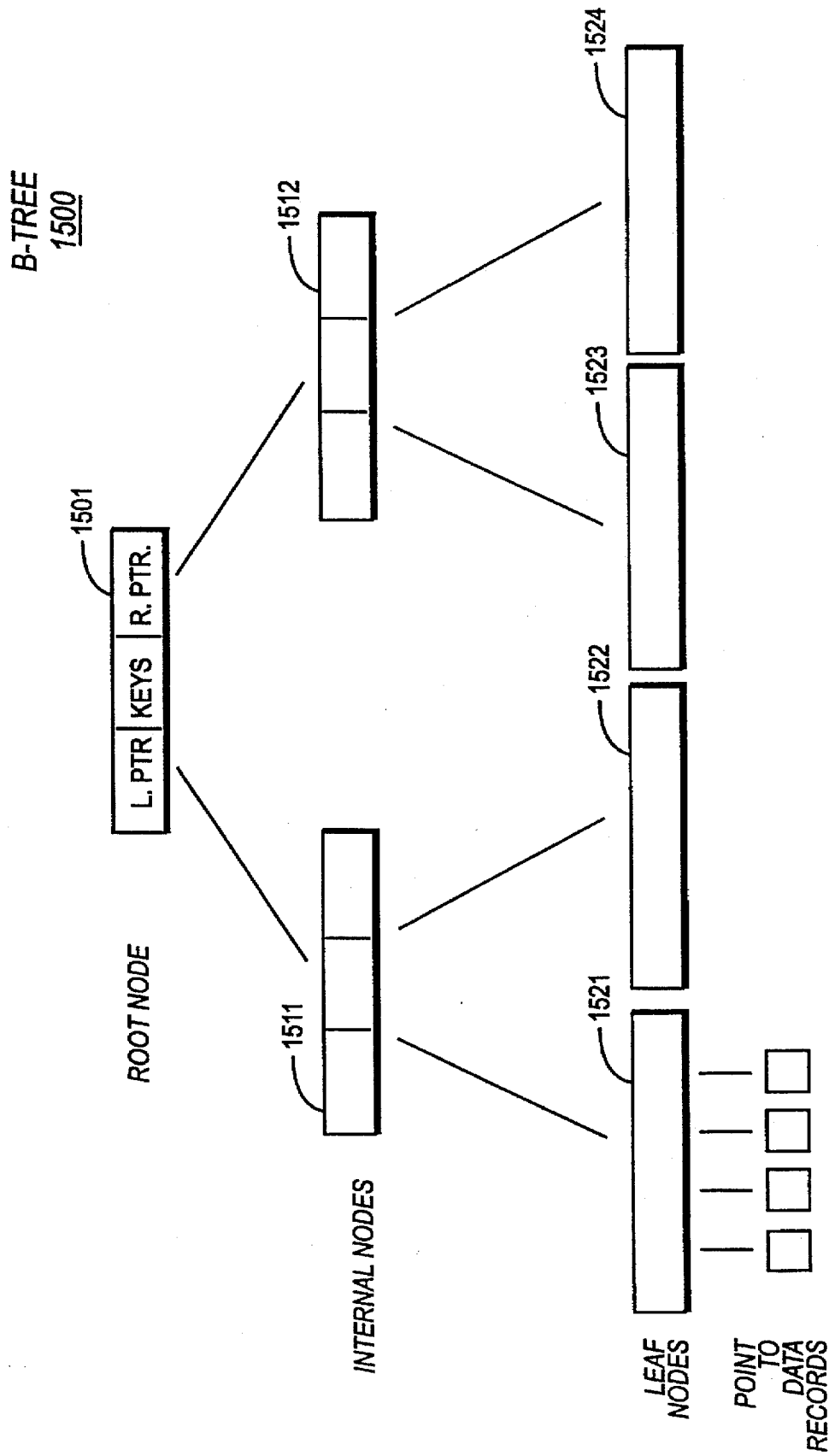
FIG. 15 is a block diagram illustrating general layout of a B-tree, which is employed by the system of the present invention for tracking geometries of records.

To understand the method of the present invention for storing record geometries for maintaining layout of forms and pagination of reports, it is helpful to first review the structure and operation of a conventional B-tree used for indexing records. FIG. 15 illustrates a simple B-tree 1500, which comprises a Root Node 1501, Internal Nodes 1511, 1512, and Leaf (terminal) Nodes 1521, 1522, 1523, 1524. As shown, therefore, a B-tree consists of a plurality of nodes arranged in a tree. Each node may, in turn, be thought of as a block of records. As shown by the Root Node 1501, each node stores one or more key values ("keys") together with pointers to left and right children nodes (e.g., Nodes 1511, 1512 for Root Node 1501). Of immediate interest is that searching for a particular record in the B-tree occurs by traversing one particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired.

To add a new record to the B-tree, only a single path through the tree need be modified. More particularly, the time required to make such a modification is proportional only to the size of the path through the tree. This in turn is proportional to the logarithm of the total number of records stored. By varying logarithmically with the total number of records, the approach reduces time required substantially (when compared, for instance, to sequential methods). In practice, therefore, it takes almost constant time to maintain a B-tree by adding a new record or removing an existing record (because only one part or path of the tree need be processed). The number of nodes on a given path bears a direct relationship to how long it takes to traverse the path, since the nodes are after all stored on disk. In other words, the time required to complete the operation is roughly proportional to the number of blocks which must be read in from the storage disk.

Compare the B-tree approach to a linear scan from the beginning of a database table. There, all of the blocks of records would have to be visited until the record sought is located. For a table of even moderate size, such an approach would typically be very slow. General techniques for the construction and operation of B-tree files is well documented in the technical, trade, and patent literature. For a general description, see Sedgewick, R., *Algorithms in C*, Addison-Wesley, 1990. For a description of B-tree indices implemented in a PC DBMS system, see Baker, M., *B-tree indexing: A look at indexing tradeoffs in dBASE, Clipper, and FoxPro, Programmer's Journal*, Vol. 8.6, November/ December 1990, pp. 42–46. Also, see SYSTEM AND METHODS FOR INFORMATION RETRIEVAL, International Application No. PCT/US91/07260, International Publication No. WO 92/06440, Apr. 16, 1992, which describes B-tree index for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

As described above, in the system of the present invention the geometry of the database (i.e., of a page report) is preferably stored in the nodes of an accompanying B-tree. In an exemplary embodiment, the geometry is maintained in the B-tree by storing the height of each record. Specifically, the heights of the records are accumulated in the nodes. If a new record is inserted, therefore, not only is the record inserted but its size is recorded as well. The impact of the size on the overall sequence can readily be determined by traversing the B-tree path corresponding to that sequence.

With this approach, repagination of a report can quickly be accomplished by refreshing a single path (as opposed to prior art approaches which would require regeneration of the entire report).

In a preferred embodiment, record geometry or volume is tracked by storing the height of each record. Generally for a form appearing on screen or a report which is printed out, the width of records will be fixed relative to the width of the document (e.g., fixed at less than 8.5 inches). For such an embodiment, it suffices to store record heights. Those skilled in the art will appreciate however that the storage of volume information may be extended to store both horizontal and vertical components for each record, thereby also allowing variable width of records. Thus, storage of additional dimensions can be accommodated as a straightforward extension to the preferred approach.

Geometries stored in the tree are used to quickly render a particular page in the report, in much the same manner that keys in a B-tree are used to locate a particular record by search criteria. Instead of a comparison of key values at each node, however, the approach for pagination accumulates record sizes along the path traversed. If the user wants to jump from the first page to the hundredth page in a report, for instance, the system of the present invention can quickly complete the task by traversing a single path of the tree and accumulate record geometries during that traversal. Each node records the sum of the heights of all of the records beneath it (at that node). To get to page 100 of the report (which is expressed internally as a certain number of inches from the beginning of the report), the system of the present invention would simply start traversing the tree for accumulating the relevant record sizes. By storing actual geometry of reports in a tree, the system can treat the report in a live manner to get to an arbitrary page in a report and know the records on that page, all without having to regenerate the report. The approach allows the system to immediately compute the page (and position on that page) where any arbitrary record is to appear.

C. Management of Display Lists

In systems that show data on screen and allow the user to page through the data (e.g., "browsing"), usually a "display list" is employed. A display list is just a data structure storing the items that are to be shown on screen at any given time. In a conventional database, the display list would typically be implemented as a static set of on-screen slots or positions in which such a system "fills in" data for the particular records that are currently showing.

If, for instance, records 20–30 are being shown, such a system would display a data grid and fill it out with information for records 20–30. If the user scrolls down (e.g., presses Page-down key), such a system would refresh the data grid with the next set of records. In such an implementation, record geometry is not an issue, as each record is forced to appear in a fixed position on screen. Such a system need only concern itself with filling in the data. Even if one were to consider a system capable of displaying a form having a detail table, such as Microsoft Access, one would still find that that detail table is always scrolled (i.e., has scrollbars on it), so that the overall form for that system remains static (the system need only just fill in data). Prior art systems, therefore, provided fixed slots where data had to fit (truncated) or had to be scrolled; these systems completely ignored variable record geometry.

In the system of the present invention, as previously illustrated, forms are far more general in nature. In particular, forms in the system of the present invention may have several levels of nesting of sequences and, moreover, these different levels of nesting are not necessarily scrolled. In other words, they are not implemented using fixed windows to data. As previously shown, for instance, scrollbars can be removed from a detail table, whereupon the table expands (as it would if one were printing a page report).

Forms in the system of the present invention, being more general in nature, do not adopt the prior art static display list approach. Instead, the system of the present invention computes dynamically a display list which corresponds to the current state of the data and "where" (i.e., what record) the user is located in the database he or she is examining. As previously illustrated, forms and reports in the system of the present invention have variable geometry—information is not displayed in static windows (e.g., ones having fixed-size slots). Recall that in the examples of FIGS. 7 and 8 records are illustrated having non-uniform geometry, as the number of detail records (in the detail table) varies from one master record to another. To show such variable geometry in a report (or an on-screen form), prior art systems must "flow" (i.e., regenerate) the document.

The system of the present invention, in contrast, recomputes dynamically the proper geometry for where the user is located in the document (i.e., what particular window or range of records the user is currently viewing). Given an arbitrary record or range of records, the system of the present invention can readily determine the sum of record volumes (sizes) which precede that record or range of records. Moreover, the impact of user changes can quickly be calculated. If, for instance, the user adds another line to a text field (i.e., so that that text field "stretches"), the system of the present invention can recalculate quickly what the new screen should look like (since it need only traverse a single path of the B-tree).

On occasion, the user may make a change which has a global impact on record geometry. A user may, for instance, select a new font and, as a result, change the volume of each and every record in the database. In such an instance, the system of the present invention re-scans the database for refreshing record volumes stored in the B-tree; the operation may be deferred until required (e.g., such as when required for rendering records on screen). Note, however, that user actions which globally impact record volumes almost always occur during initial design of a database. At runtime, in contrast, the user is usually adding or modifying data and presenting that data (e.g., in forms and reports). It is at that point (i.e., during everyday use) that it is important that response be in real time.

D. Architectural Design

Figure 16A:
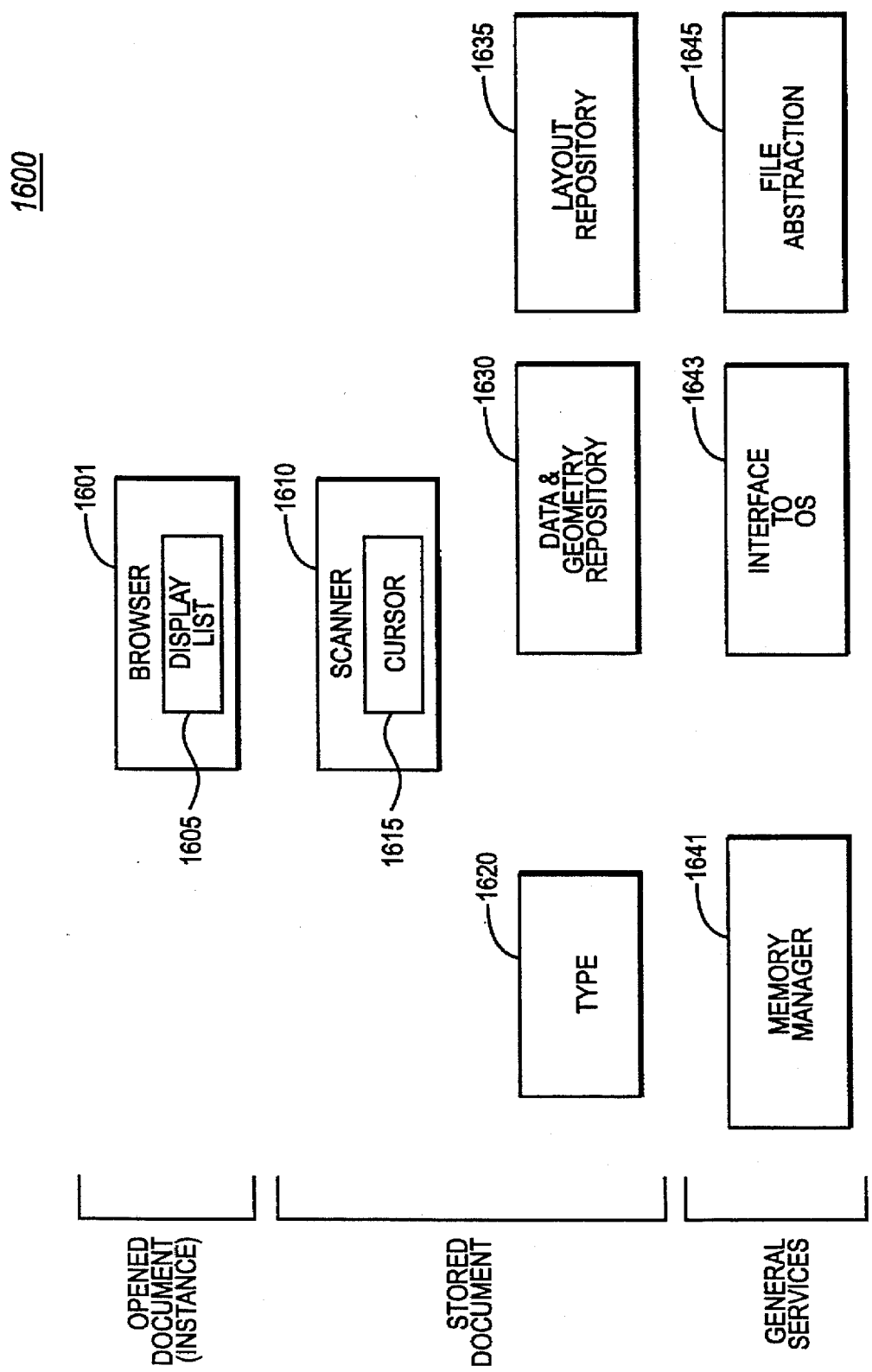
FIG. 16A is a hierarchical block diagram illustrating an architectural overview of the system of the present invention.

FIG. 16A is a block diagram providing an architectural overview 1600 of the system of the present invention. The following will provide a bottom-up description of the architecture.

1. General Service modules

At the bottom level are a number of general service modules: Memory Manager module 1641, Interface to Operating System (OS) module 1643, and File Abstraction module 1645. Memory Manager 1641 provides memory management services to the system, such as allocating and de-allocating memory. Interface to OS module 1643 provides an interface layer between the system and OS services available from DOS and Microsoft Windows; thus, it serves as middleware, buffering the connection between the system and various available operating services (making the system less tied to any particular operating system).

File Abstraction module 1645 provides file input/output (I/O) services. Recall that the user of the system deals with "projects" which contain one or more documents. In prior art systems, by contrast, users who would generally deal with tables, each of which would be stored as a single file (on a disk storage device). As previously stated, the system of the present invention stores each project as a single disk file. Since a single disk file may contain multiple documents, therefore, File Abstraction module 1645 includes services for managing multiple documents within a single file. In effect, it provides a file system (its own) within a file system (the operating system's file system). The File Abstraction module and other General Service modules may be implemented in a conventional manner.

At the next level of architecture 1600 are modules pertaining to a stored document (i.e., a database). Type module 1620 maintains a data structure providing a description for a given stored document. More particularly, a "Type" is a recursive description of a stored document. The recursive nature of the description is provided since, as previously described, documents may include nested structures. At a top level, Type refers to the "whole" document—that is, the sequence as a whole. At a lower level, the Type has the structure of particular top-level records which, recursively, may comprise fields, calculations, further nested sequences, and the like. Since the Type serves as a structural description of a stored document, it may be regarded as a "data dictionary." For a given document, Type can be used to enumerate all structures (regardless of levels of nesting) contained by that document. The Type data structure is itself a persistent object, being stored to disk as part of the project file.

2. Scanner

At the next level is Scanner module 1610. As shown, the module includes a Cursor object 1615. The Cursor 1615 is akin to a conventional cursor in a navigational database—that is, it tracks a particular "location" in the database. The Cursor 1615 is, however, more general in nature, since it must traverse not just flat tables but hierarchical structures. In this sense, it is like a cursor which navigates a tree structure, as opposed to one which simply navigates a flat set of records. Thus in contrast to a conventional database where a cursor traverses a linear set of records (either sequentially or through an index), Cursor 1615 traverses objects contained by a stored document. Moreover, there is no set order on what type of object must follow one another; instead, it will depend on what the user has done (i.e., what structures the user has created).

With an understanding of Scanner 1610, Data and Geometry Repository 1630 and Layout Repository 1635 will now be explained. Any particular document has storage associated with it which falls into one of two categories: data and layout. "Data" represents the actual record data (i.e., record values entered by the user). As shown, geometry information associated with each record is stored by the Geometry Repository module 1630. Layout, on the other hand, represents the schema—that is, all of the information that is needed to described visual presentation of the data to the user. Each document in a project will have a Data and Geometry Repository and a Layout Repository, as well as one instance of a Scanner and a Type.

Additional instances of the Scanner may be created. If a user creates an additional view on a document, a new instance of this Scanner is created. In particular, each view may show a different position of the document. Therefore, separate cursors (of the Scanner) are required for maintaining the location in each view. "View" in this context means an instance of an open document (not "view" in the general database sense).

3. Browser

At the highest level of architecture 1600 is Browser module 1601. The Browser 1601 is responsible for maintaining an Opened Document instance, a "View." When the user opens a new View on the workspace, the system provides a cursor (for navigation) and a Display List (for presentation). As shown, the Browser 1601 includes a Display List object 1605. In operation, the Browser retains the Scanner for determining where (i.e., cursor position) the user is located at (i.e., what record) in the information. The Browser also has the Display List which is a list of items currently displayed on the screen to the user. To render display of information, therefore, Display List 1605 accesses the previously-described B-tree record geometries maintained by the Scanner.

The general process of dynamically refreshing the Display List will be explained by way of example. Suppose, for instance, that the user "pages down" (i.e., scrolls) to record 27. The Browser 1601 must now refresh the Display List, since the user is now requesting display of different records. In order to create the new Display List, the Browser 1601 uses the Scanner 1610 to retrieve (from the Data Repository) the data and geometry associated with the records now to be displayed.

Consider a more general case. Suppose the user navigates downward by one record (e.g., presses "Enter" key) and that the user is viewing a page report. The system must determine where that next record is in the report. If the user is navigating from one top-level record to another, the "next" record may in fact be located dozens of pages beneath the then-current location. This is because the two records may be separated by page after page of detailed information (for the first one of the two records).

The Browser 1601 determines what to display on screen as follows. In constructing the Display List, the Browser 1601 accesses the Data and Geometry Repository 1630 (through Scanner 1610) and performs the previously-described B-tree computations (i.e., accumulation of record volumes), in order to find out exactly where that record of immediate interest is positioned in the report. Upon constructing the Display List 1605 with that information, the Browser 1601 paints the Display List to the screen.

The processing of user events, such as a keystroke, is done in a conventional manner. Each open document in a preferred embodiment is a Microsoft Windows' "window." As is known in the art, such a window can receive system and user events, such as keystroke events. Microsoft Windows, in the background, processes those events and posts corresponding "messages" to the appropriate target window (or windows). Thus when the user presses the "Enter" key in the example above, a Windows message is dispatched to the window associated with the Browser. In a conventional manner, the Browser window includes a "window procedure" for processing this and other messages it receives. At this point, the Browser may act upon the message.

E. Synchronization of Opened Documents

Figure 16B:
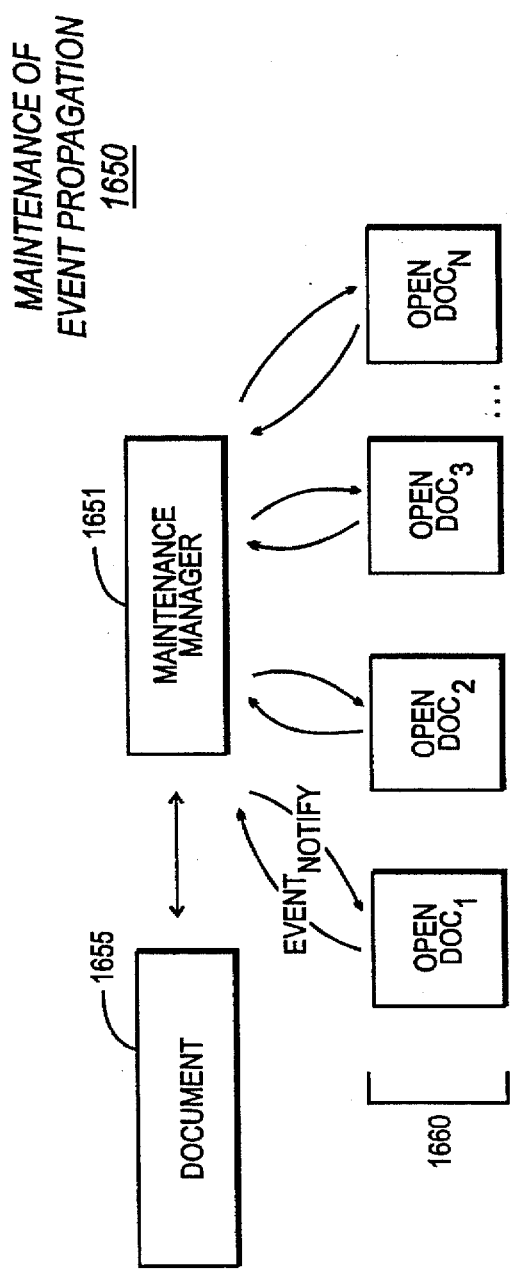
FIG. 16B is a block diagram illustrating maintenance of event propagation using a document list, in the system of the present invention.

When the user changes data (e.g., adds or modifies data in a record), those changes need to be propagated to all the views for that particular document. FIG. 16B is a block diagram 1650 illustrating maintenance of event propagation in the system. In particular, the system includes a Maintenance Manager module 1651 which effects synchronization. When an event occurs which results in a change to underlying user data (e.g., in Document 1655), Maintenance Manager 1651 receives a message reporting this change.

Figure 16C:
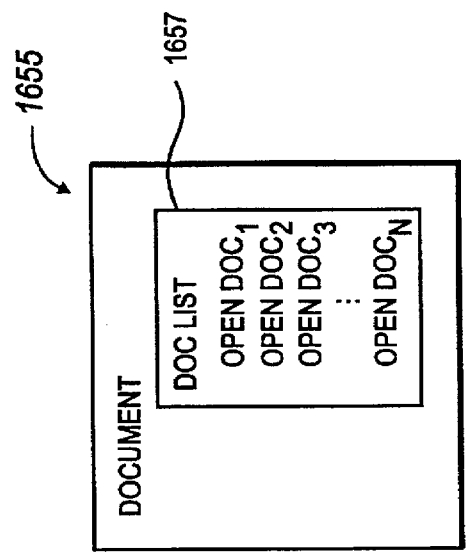
FIG. 16C is a block diagram showing in detailed view a document list which is maintained as part of a base document (database).

As shown in further detail in FIG. 16C, the document 1655 includes a Document List 1657 which lists the open documents (views) for the Document 1655. Upon creation of an Open Document instance or View, that Open Document registers itself with the document (database), via the Document List 1657. Thus as shown in FIGS. 16B–C, for Open Documents 1660, the Document List 1657 lists Open Document$_1$ to Open Document$_N$. Given asynchronous events which may occur in one or more of the open documents, the Maintenance Manager 1651 ensures that the other open documents are properly notified of the events. In other words, since the Open Documents 1660 are dependent upon the Document 1655, each registers an interest in events affecting that Document via the Document List 1657. When the user takes a view of a document (as previously illustrated), the system stores in the base document the fact that there is a view of it and that changes to the document must be propagated to the view. In a preferred embodiment, maintenance occurs regardless of whether the user has a particular view on screen at the time. This approach simplifies the task of maintaining the entire project in a coherent, consistent state.

F. B-Tree Storage

Figure 17A:
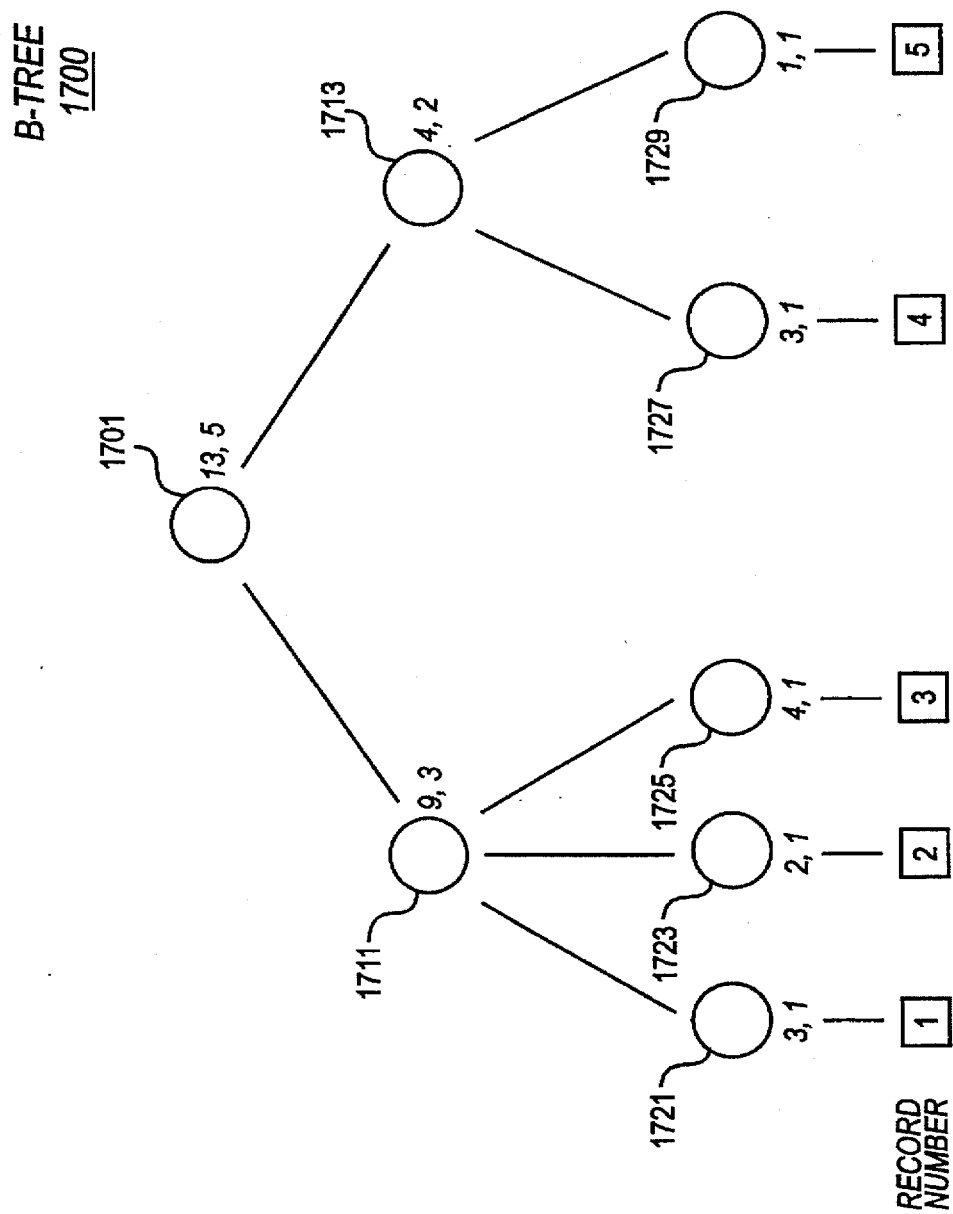
FIG. 17A–D are diagrams illustrating a B-tree of the present invention for storing and maintaining record geometries.

With reference to FIG. 17A, B-tree storage of record geometries will be illustrated in further detail. As shown, B-tree 1700 includes a Root Node 1701 having an accumulated record volume of 13 and a record count of 5 (expressed as 13, 5 in the figure). The Node 1701 points to two children or "Son" nodes: Node 1711 and Node 1713. Node 1711 stores or is associated with an accumulated record volume of 9 and a record count of 3. These values are derived by accumulating or summing the respective values for nodes which are Sons of the Node 1711, the accumulated volume of 9 for Node 1711 is determined by summing the volumes for the Sons of Node 1711 (i.e., Nodes 1721, 1723, 1725): 3+2+4=9. In a similar manner, the record count of 3 for Node 1711 is determined by adding together the individual record counts for the Sons of Node 1711: 1+1+1=3. As shown, Node 1713 stores record volume/record count (4, 2) derived from its Sons 1727, 1729. There, the accumulated volume is 4 (3+1) and the accumulated record count is 2 (1+1). For Root Node 1701, the accumulated record volume is 13. This is determined by adding the record volumes for each "Son" node (i.e., Node 1711 and Node 1713); 9+4=13. In a like manner, the accumulated record count for Root Node 1701 is the sum of the accumulated record counts for the Son nodes: 3+2=5.

Suppose, for instance, that the user wishes to go to record number 3. The system must determine, then, how far down in the report that record exists (i.e., on what page is the record). In practice, the system need not only find a page for a given record number but, also, must find the relevant record(s) for a given page. Accordingly, the present invention provides two methods, each one for traversing the tree. Because the tree stores the accumulated geometries, each method need only traverse a particular path through the tree. In this fashion, the present invention avoids having to perform a linear scan (such as done by prior art systems for regenerating a report). More particularly, the methods need only bring in (i.e., read from storage device) file blocks associated with nodes visited along a particular path.

Consider the task of finding the position in a report of the fourth record. In general terms, the method proceeds as follows. From the Root Node, one can see that the record count for the left branch (i.e., the one containing Node 1711) is 3. Since this is an insufficient number of records to satisfy the request (i.e., 3 is less than 4), the method proceeds down the right branch, to Node 1713. By accumulating the record count for each Son of Node 1713, the method quickly determines that record number 4 is associated with Leaf Node 1727: 3 (previously accumulated record count)+1 (record count of first Son)=4.

In a corresponding manner, suppose a user desires to go to a position in the report which is six units (e.g., inches, centimeters, or the like), from the top of the report. Now, the tree is traversed using the accumulated volumes. From the Root Node 1701, one can see that the request for 6 units is satisfied by the left branch, since Node 1711 is associated with an accumulated volume of 9. From Node 1711, the traversal method may proceed to count off the number of Son nodes required to satisfy 6 units. For the example of FIG. 17, this is satisfied by the third record, which starts at 5 units (3+2) and ends at 9 units (3+2+4). In other words, six units is one unit from the top of record number 3 and three units from the bottom of record number 3. The two tree traversal methods may be then summarized as: (1) method for determining report position (i.e., units from the top) for a given record number and (2) method for determining record number for a given report position (units).

In a preferred embodiment, methods for navigating a B-tree storing record geometries is implemented as a B-tree module, in the C/C++ programming language. The following global variables are defined for the module:

```
const USHORT   cMaxDepth = 20;   // Maximum tree depth.
class Node;
class Son;
```

As shown, cMaxDepth is a constant specifying maximum tree depth. Node is a data structure characterizing a particular node for the tree. Its construction will now be examined in further detail.

Figure 17B:
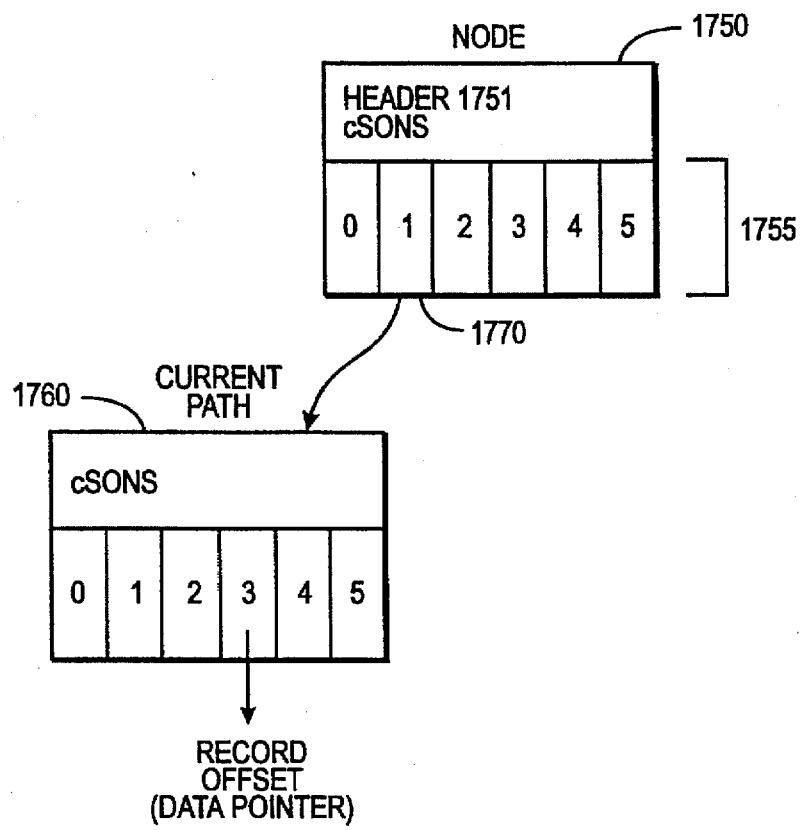

FIG. 17B illustrates the general layout of a Node 1750. As shown, the Node 1750 comprises Header (housekeeping) information 1751 and an array of Son slots. One Son slot exists for each link downward. In general, a "son" is a direct descendant of another node. Thus, a "son" slot points to a particular Son of a node. For terminal (i.e., leaf) nodes, however, each Son Slot points to a data record (e.g., by storing a file offset to that particular record). In other words, the Sons of leaf nodes are the data records.

With an understanding of Node and Son, the reader may now study methods of the present invention for processing B-tree-stored record geometries. The methods are implemented in a C++ class, "B-tree" class. An exemplary C++ class definition (simplified for clarification) is as follows:

```
class BTree {
   Node*      Nodes [cMaxDepth];      // Nodes on current path.
   SHORT      Sons [cMaxDepth];       // Sons of those nodes.
   DP         dpRoot;                 // Data pointer of root node.
   USHORT     Depth;                  // Depth of BTree.
   ...
public:
   BOOL       FindY (Y yS, Y y, RECNO& r, Y& yR);
   Y          GetCurrentY (Y yS);
};
```

The C++ programming language is described in the trade, technical, and patent literature; see e.g., Ellis, M. and Stroustrup, B., *The Annotated C++ Reference Manual*, Addison-Wesley, 1990. Additional information about object-oriented programming and C++ in particular can be found in Borland® C++: 1) *User's Guide*, 2) *Programmer's Guide*, and 3) *Library Reference*, all available from Borland International of Scotts Valley, Calif. The disclosures of each of the foregoing are hereby incorporated by reference.

As shown, the BTree class includes the following data members: Nodes, Sons, dpRoot, and Depth. Nodes is an array of nodes on the "current path." During system operation, the database cursor will be positioned on a "current record." The path through the B-tree which reaches this current record is defined as the "current path." The Nodes array stores pointers, in order, to the particular nodes on the current path (down to the current record). The Sons array indicates which Son (from the Son Slots) participates in defining the current path through the tree. For the current path shown in FIG. 17B, for instance, the Nodes array would store pointers to Node 1750 and to Node 1760; the Sons array would store, in a corresponding manner, a Son index of 1 (for Node 1750) in a Son index of 3 (for Node 1760). A Son index in this regard refers to the particular slot (i.e., ordinal position) of a node. Although the Sons array may be sufficient to characterize the current path through the tree, the relevant node pointers are stored as well in a preferred embodiment for efficiency reasons (which are shown in the GetCurrentY and FindY methods below).

The remaining data members of the B-tree class are dpRoot and Depth. The dpRoot member stores a data pointer to the Root Node. Depth, on the other hand, stores the current depth of the B-tree. The B-tree for FIG. 17B, for instance, has a depth equal to 2.

Figure 17C:
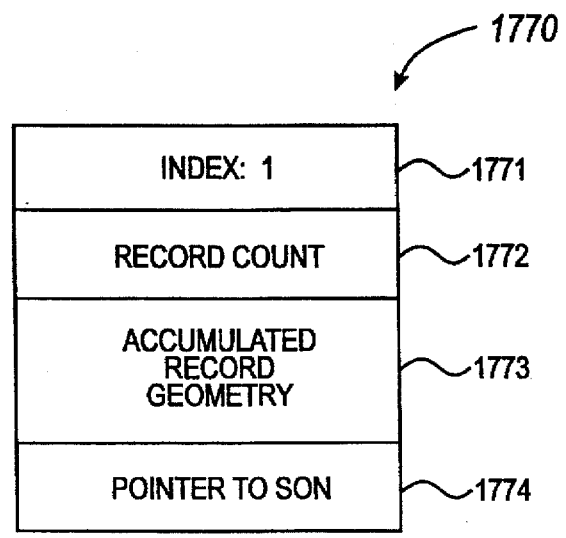

Each Son slot stores more than just a pointer to a Son Node. As shown in FIG. 17C, Son Slot 1770 comprises an Index 1771, a Record Count 1772, an Accumulated Record Geometry (total record height) 1773, and a Pointer to Son 1774. The Record Count is the number of records for the subtree beneath this Son. Similarly, the Accumulated Record Geometry stores the total height of the records for the subtree which depends from this Son.

Figure 17D:
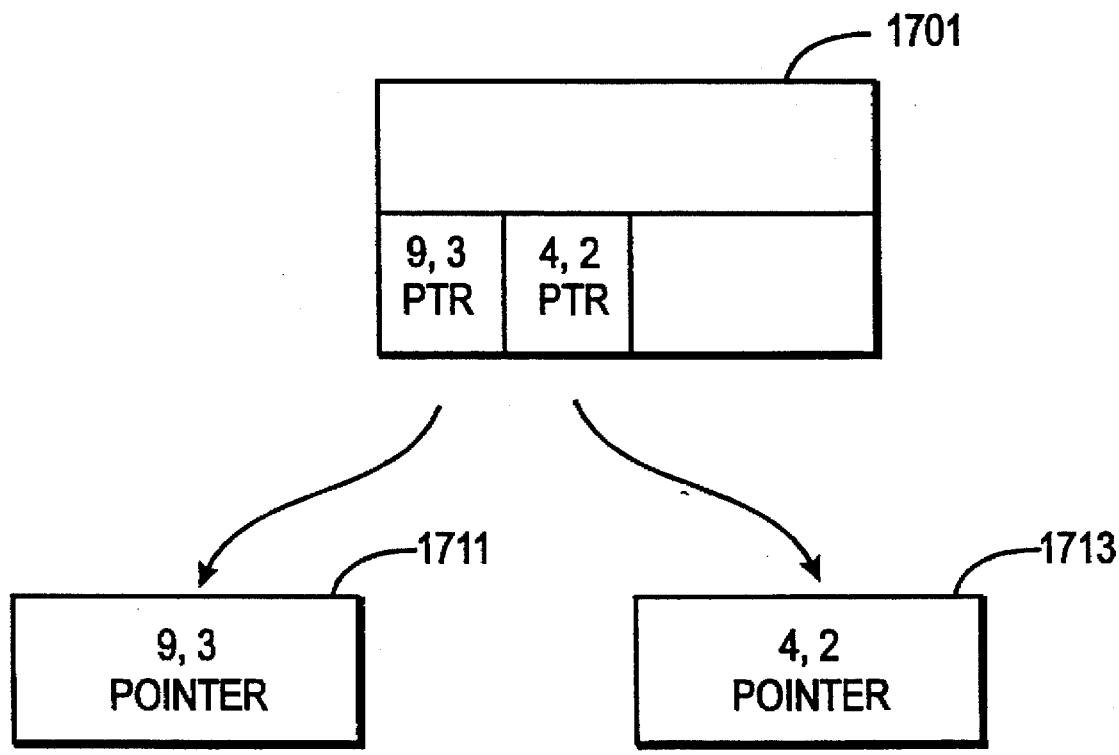

The storage of Accumulated Record Height and Record Count is more precisely indicated by FIG. 17D. Recall from FIG. 17A that Node 1713 is associated with a volume of 4 units and a count of 2. These quantities (i.e., 4, 2) are actually stored in the Son Slot of Node 1701 which points to Node 1713. In other words, the record volume and record count information for a node is stored in the slot of the node above corresponding to this Son node. In this manner, the method of the present invention can determine characteristics of a Son Node without having to actually visit that particular Son Node, for determining the above-described volume accumulation computation. If, on the other hand, this information were stored with the particular Son Node, this would potentially necessitate an additional disk access, for reading in the file block associated with that next or Son Node. Moreover, the total amount of work required (i.e., to page in a node and perform the volume computation) is never more than the depth of the tree (measured in the number of file blocks which must be accessed).

Methods of the present invention for navigating the tree will now be described. The FindY method determines the record number (r) and horizontal (i.e., Y axis) position (yR) of a record which "cuts across" a passed-in horizontal position (y) in a sequence beginning at a given starting horizontal position (yS); the method returns FALSE if y is beyond the end of the sequence (of possible records). In an exemplary embodiment, the method may be constructed as follows:

```
 1: // Determines record number (r) and y position (yR) of
 2: // record "cutting" position y in sequence beginning at yS.
 3: // Returns FALSE if y is beyond the end of the sequence.
 4:
 5: BOOL    BTree: :FindY (Y yS, Y y, RECNO& r, Y& yR)
 6: {
 7:     Node*     pN;
 8:     USHORT    d, i;
 9:     Y         yHSon;
10:     DP        dpR;
11:
12:     if (!Depth)
13:         return FALSE;           // Tree is empty.
14:
15:     r    =   0;                 // Running RecNo count.
16:     yR   =   yS;                // Running Y count.
17:     dpR  =   dpRoot;            // Data pointer to root node.
18:
19:     for (d = Depth; d- -;) {    // Navigate level-by-level thru Tree.
20:
21:         pN    = GetNode (dpR);
22:
23:                                 // Find covering Son.
24:         for (i = 0; i < pN->cSons; ++i)  {
25:                                 // Get height of ith Son.
26:             yHSon  =  GetSonGeoValue (d, pN, i, yR);
27:             if (yR + yHSon > y)
28:                 break;
29:             yR    +=  yHSon;    // Accumulate height.
30:                                 // And Record count.
31:             r     +=  GetSon(pN, i)->cRecords;
32:         }
33:
34:         if (i == pN->cSons)     // y is beyond Sequence.
35:             return FALSE;
36:
37:         dpR    =  GetSon(pN, i)->dp;
38:     }
39:     return TRUE;
40: }
```

(Line numbering shown to simplify the following description.)

This method addresses the problem of determining the pertinent record number for a given y position from the top of the report. If, for instance, the request is for the 100th page and each page is 8 inches (printable area), then y is passed as 800 (100×8 inches) and yS is passed as 0 (assuming this is at the record or top level). The coordinate system changes as one moves recursively through nested structures; this aspect is accounted for by adjusting the starting position (yS). Recall that a report may have nested sequences, and in a particular document a particular nest will begin at some position. Suppose, for instance, that the method has recursed one level to detail records; the position for the first record of that detail might actually be at 4 inches (not 0). The parameter r, which is passed by reference, is the quantity actually sought by this method. The method will set r to the record number for the record which cuts across the report at that distance. The yR parameter, which also is passed by reference, is set to the exact height at the top of the record. Note that a passed-in y position will often not align with a record boundary (unless that happens by chance). Therefore, yR is computed to specify the starting point of the record which cuts across the passed-in y position, so that the exact starting point of the record is known to the system.

In general, the method operates by traversing down the tree, proceeding right or left depending on where the accumulation of heights leads. At Lines 7–10, local variables are declared; these generally serve as indexing or temporary variables. At Lines 12–13, the method checks whether the tree is empty, by testing whether Depth is 0. Lines 15–17 initialize data members. Line 15 initializes the running record number count to 0; Line 16 initializes the running y count (yR) to the starting position (yS); and Line 17 initializes the data pointer local variable, dpR, to the Root Node.

Next, the method navigates through the tree level-by-level. At Line 19, a "for" loop is established to visit d levels of the tree, where d is set to the Depth. For the example of FIG. 17A, the Depth would be equal to 3. At each Depth, the Node Pointer local variable, pN, is set to point to the node at this position (for the current level in the tree). In the first pass through the "for" loop, GetNode simply returns the Root Node.

At this point, the method is "visiting" a particular node. At Line 24, another "for" loop is established for examining the Son slots for the node being visited. At Line 26, the yHSon local variable is set equal to the geometry value stored by the Son Slot under examination for each pass through the "for" loop. For the Node 1701 shown in FIG. 17D, for instance, the very first pass through this loop at Line 26 would result in yHSon being set equal to the value of 9. At Lines 27–28, the method determines whether adding the just-set value of yHSon to the running y count (yR) would exceed (i.e., be beyond) the end of the sequence. If so, the appropriate accumulated height has been achieved and the method "breaks" from this nested "for" loop. Note that during the first pass through this "for" loop, the running y count stores a value of 0 (since it was initialized to 0 at Line 16).

Assuming the appropriate accumulated height has not been reached, at Line 29 the method adds the value of yHSon to the running y count (yR). Then at Line 31, the method sets the running record count (i.e., the r local variable) to the accumulated record count stored in the Son Slot under examination. After Line 31, the method loops back to Line 24, to begin examination of the next Son Slot. Upon reaching Line 32, the method has completed the inner "for" loop; all Son Slots of interest have been visited.

At Line 34, the method tests whether the y value sought is beyond the sequence. This is determined by examining whether the index counter for the inner "for" loop, i, indexes past the last Son Slot. If "Yes" at this step, then the method returns FALSE at Line 35. This would happen in the instance where the requested distance is beyond the end of the sequence. At Line 37, the method calls GetSon to get the Son node for the current node, in preparation for traversing to the next level of the tree. After Line 37 the method loops back to Line 19 for any remaining levels of the tree. At the conclusion of Line 38, the method has completed its level-by-level navigation through the tree. Upon reaching Line 39, the method has successfully accumulated both Height and Record Count for the y position sought. Having been successful, the method may conclude by returning TRUE.

Complementing the above method is GetCurrentY. In particular, the method is invoked with the Nodes and Sons arrays set to the current path and returns the y value for the current record (as pointed to by the current path). The record of interest is implicitly defined by the Nodes and Sons arrays. In general, the method operates by traversing the current path and accumulating heights, starting from yS (i.e., the starting position of the sequence itself). In an exemplary embodiment, the method may be constructed as follows:

```
 1: // Returns Y position of current Record, given that of Sequence.
 2:
 3: Y    BTree: :GetCurrentY (Y yS)
 4: {
 5:     USHORT   i, iSon, d;
 6:     Y        yR;
 7:     Node*    pN;
 8:
 9:     yR          =  yS;
10:                                         // Navigate down current path.
11:     for (d = Depth; d- -;) {
12:
13:         pN    =  Nodes [d];             // Bring in current Node.
14:         iSon  =  Sons [d];              // Son in current Node.
15:
16:         for (i = 0; i < iSon; ++i)      // Accumulate height.
17:             yR  +=  GetSonGeoValue (d, pN, i, yR);
18:
19:     }
20:     return yR;
21: }
```

The specific steps of the method are as follows. At Line 9, the local variable yR is set to the passed-in sequence position, yS. At Line 11, a "for" loop is established for navigating down the path, level-by-level. At Line 11 the current node, as stored in the Nodes array, is stored in a local variable, pN. Similarly, at Line 14, the current Son, as specified by the Sons array, is stored in a local variable, iSon. Then at Line 16, an inner "for" loop is established to accumulate the Height from the Sons (at that Node), the accumulation being stored in a local variable, yR.

Upon reaching Line 19, the current path has been traversed and the relevant heights have been accumulated. Accordingly, the method concludes at Line 20 by returning the accumulated height, yR.

G. Type

Recall that storage and maintenance of information in the system of the present invention is quite unlike that found in conventional systems. In classical relational databases, for instance, structure of a database is easily described in terms of what tables comprise the database and what field types comprise each table. In the system of the present invention, in contrast, each document has a structure or "type" which is a recursive data structure. At one level a document may have a "record type"; the record type begets field types, positioned at the next level. A field type may be a number or date type, or recursively might be another type (i.e., an arbitrary type). Just as a B-tree is a recursive structure, a Type object (i.e., an object of class Type) is also a recursive structure. Thus, Type characterizes the recursive structure of a document in the system of the present invention.

Figure 18:
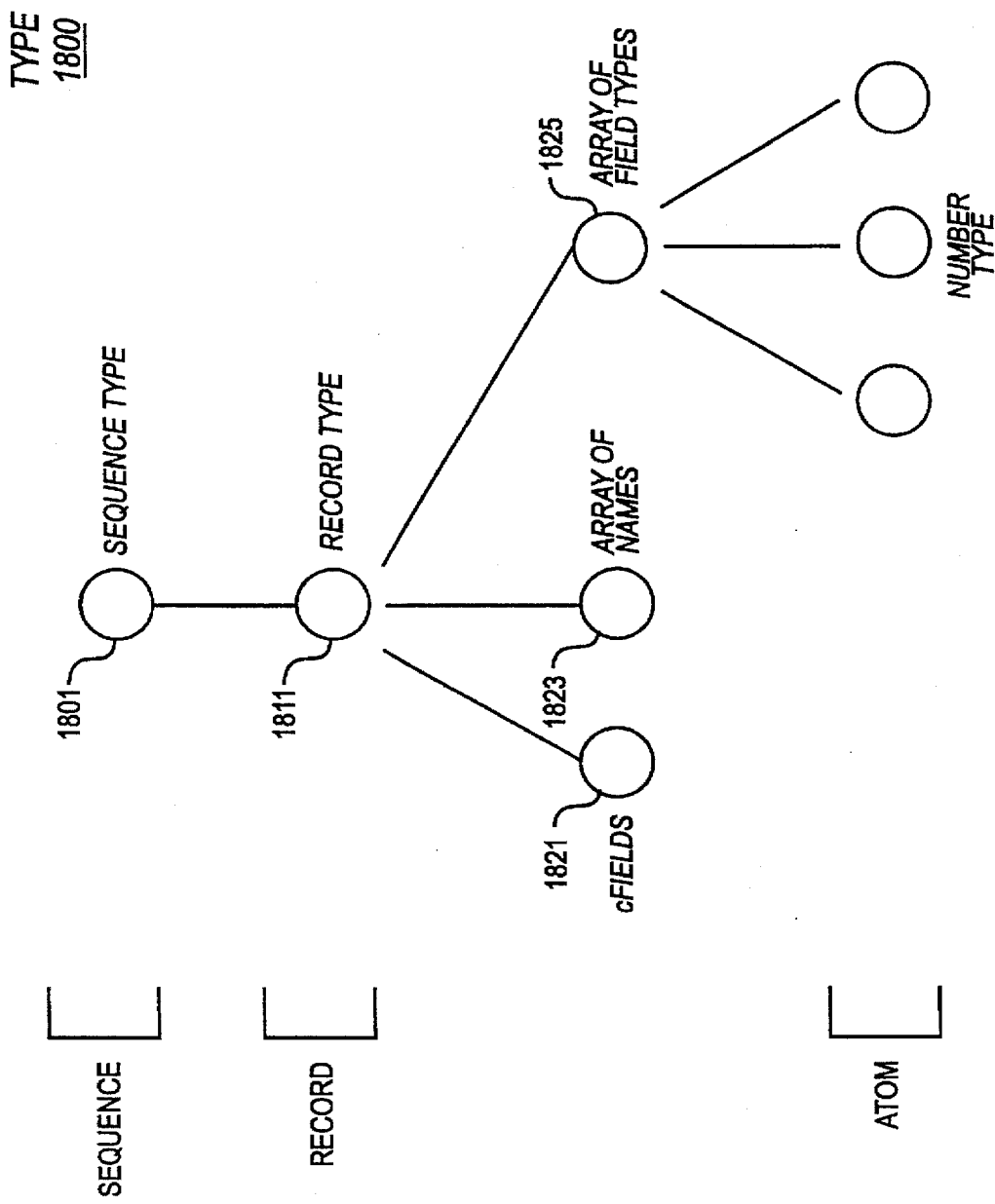
FIG. 18 is a diagram illustrating a B-tree of the present invention for representing nested "Types" which comprise the structure for characterizing a document in the database system.

FIG. 18 diagrammatically represents Type as a recursive structure 1800. At the top level in a document is Sequence Type 1801. The Sequence Type is, in turn, associated with a Record Type 1811. In other words, Sequence Type 1801 in conjunction with Record Type 1811 characterize the top level of the document as having a sequence of records.

The Record Type itself has three components: Count of Fields 1821, Array of Names 1823, and Array of Field Types 1825. Count of Fields 1821 simply specifies the number of fields for this record (as specified by Record Type 1811). Array of Names 1823 specifies a name for each field of the record. Similarly, Array of Field Types 1825 stores information specifying a field type for each respective field of the record. The type of field is recursively a Type, such as a Number Type, Date Type, or the like. These latter types are, generically, "Atom" types—cannot be further subdivided. All told, Type 1800 describes the recursive data structure present in a document.

In an exemplary embodiment, a Type class may be constructed as follows:

```
1:  // Abstract class for all Types.
2:
3:  class Type {
4:
5:  protected:
6:
7:      TYPEID      ID;                 // ID (Index in Types table).
8:      GEOID       g;                  // Type of geometry.
9:
10: public:
11:                 Type ( TYPEID    ID,
12:                         GEOID    g
13:                         );
14:                 TYPE ();
15:
16:     TYPEID      TypeID ();          // Returns ID.
17:
18:     virtual USHORT  FieldWidth ();  // Width of stored value.
19:     USHORT      DataWidth ();       // FieldWidth w/o geometry.
20:     USHORT      ValueWidth ();      // Width of Value.
21:
22:     GEOID       GetGeoID ();
23:     virtual VOID    SetGeoID (GEOID GeoID);
24:
25:     virtual BOOL    IsAtom ();      // TRUE if atomic.
26:     virtual BOOL    IsField ();     // TRUE if a FieldType.
27:     virtual BOOL    IsCalcField (); // TRUE if a Calc Atom.
28: };
```

As shown, the Type class includes two protected data members of the following type: TYPEID and GEOID. TYPEID is an enumerated type, defined as follows:

```
enum TYPEID {                   // ID's of known Types.
    // Special types
    Type_Error,
    Type_Blank,
    // Atom types
    Type_Date,
    Type_Integer,
    Type_Float,
    Type_Text,
    Type_Bool,
    Type_Image,                 // BitMap.
    Type_Ole,                   // OLE Type.
    Type_CAtom,                 // Calculated Atom.
    // Record/Sequence types
    Type_Rec,                   // Record.
    Type_Seq,                   // Sequence.
};
```

Essentially, TYPEID specifies a Sequence Type, Record Type, or Atomic Type, such as shown above. Additionally, an Error Type and a Blank Type are defined. The former is employed to specify an error condition, such as when a user enters an incorrect formula in a calculated field. The latter specifies a blank field—that is, one not otherwise associated with a particular atom type. During operation, the system performs type checking on the tree, for identifying and eliminating type errors (e.g., adding a date to a bitmap in a calculated field).

Type also stores in it a Geometry ID (GEOID) specifying whether the particular type has geometry information stored with it (recall that geometry is stored in the B-tree along with the data). Whether geometry needs to be stored depends on the particular structure at hand. Consider a "plain" table. Such a table would have no geometry which would have to be stored, since such a table would employ the fixed-slot approach (previously described); there, all of the records are the same size, so there is no need to store in the database the height of each record. In other words, since height is constant for records in such a table, there is no need to expend storage space in the B-tree for tracking height.

On the other hand, given a Tower view (such as described in UI examples above) which have nested tables of variable geometry, each record of the outer-most sequence (i.e., the master sequence) could have a different height. In such a case, the Sequence Type and Record Type associated with that would have a Geometry ID of Geo_Stored.

GEOID is an enumerated type which may be defined as follows:

```
// Geometry IDs.
enum GEOID {
    Geo_None,                   // No stored geometry.
```

| | |
|---|---|
| Geo_Stored, | // Stores own Geometry. |
| Geo_Viewed | // Views Geometry. |
| }; | |

Geo₁₃None indicates that there is no stored geometry associated with the type. Geo_Stored, on the other hand, indicates that there is geometry associated with the type. Geo_Viewed, a third alternative, occurs in the case where the user takes a view of a document which itself has variable-size records. Even though the records in the view have separate sizes, there is no need to store the respective record geometries, as this information is already stored in the B-tree associated with the base document. To determine the geometry for a particular record in the view, the system need only look to the base document.

Continuing with the description of the Type class, Lines 10-27 set forth public methods of the class. Specifically, Lines 11-13 set forth a class constructor which is passed TYPEID and GEOID as parameters. Alternatively, a constructor taking no parameters is set forth at Line 14. Lines 16-23 set forth various access routines, such as for returning a TYPEID, Field Width, Dated Width, Value Width, and the like. Note that the Field Width access routine, FieldWidth, is defined as virtual. Accordingly, its specific implementation is specified by a subclass (derived from class Type). Lines 25-27 specify boolean virtual methods, for specifying whether the Type is an Atom, is a Field, or is a Calculated Field. Again, these are virtually defined methods; specific implementation is provided by the various subclasses of class Type.

FieldWidth specifies the width of a stored value. For instance, Date is stored as four bytes; thus, FieldWidth would return a value of 4, when implemented by a base class supporting a Date Type. FieldWidth specifies therefore the storage required for representing the type on disk. ValueWidth specifies the storage requirement for the type once it is brought in from disk to memory. For instance, date may be stored on disk as a 32-bit integer, yet once it is brought into memory it may be parsed into a Date structure (e.g., such as a C struct comprising Month, Day, and Year integers). DataWidth is similar to FieldWidth (i.e., width stored in the file), except that the DataWidth also includes the bytes required to represent the height (for this type of object).

AtomType is a class derived from Type. The AtomType class characterizes atoms, such as Date, Text, Image, or the like. In an exemplary embodiment, the class may be defined as follows:

```
class AtomType : public Type {
    BOOL    bNavigable;           // TRUE if navigable.
public:
            AtomType ( TYPEID    ID,
                       BOOL      bNavigable = TRUE
                     );
    BOOL    IsAtom ();            // Always returns TRUE.
};
```

As shown, AtomType includes additional information, in particular a boolean field which specifies whether the atom is navigable—that is, be rendered on display with a tab stop. For a calculated field, for instance, this boolean would be set to FALSE (to prevent the user from navigating the cursor to that field). As shown, the AtomType constructor takes a TYPEID (e.g., TYPE_DATE) together with the navigable boolean. IsAtom, which always returns TRUE for objects instantiated from class AtomType, provides implementation for the IsAtom method virtually-defined in the base class. Specific types, such as DATE_TYPE, FLOAT_TYPE, TEXT_TYPE, and BOOL_TYPE, are in turn derived from AtomType.

RecType is a type which represents records. In an exemplary embodiment, this derived class may be defined as follows:

```
class RecType : public Type {
protected:
    FIELDNO      cFields;
    Char**       Names;
    Type**       Types;
public:
                 RecType ( FIELDNO       cFields,
                           Char**        Names,
                           FieldType**   Types
                         );
    // Field functions.
    FIELDNO      CountFields ();
    Char**       FieldNames ();
    FieldType**  FieldTypes ();
};
```

Recall that records are distinguished by three pieces of information: Number of Fields (cFields), Names, and (recursively) Types. Types would store an entry for the Number of Fields (cFields); Types are recursively more types. The public section of the class definition, therefore, includes a constructor taking the cFields, Names, and Types data members. This is followed by access methods, which simply return values for the respective protected data members of the class (i.e., cFields, Names, Types).

SeqType is a "sequence type" and is also derived from Type. In an exemplary embodiment, SeqType class may be constructed as follows:

```
class SeqType : public Type {
protected:
    RecType*     tyR;             // Corresponding RecType.
public:
                 SeqType (RecType* tyR);
};
```

The Sequence Type may be thought of as a type representing the sequence above the type representing the record. As shown, the class includes as a protected member a pointer to the corresponding record type, tyR. In the Public section of the class definition, a SeqType access method is provided for returning a copy of the tyR RecType pointer. The maintenance of sequence as a separate type is done for consistency. Other abstractions in this system are keyed to various levels; accordingly, maintaining sequence as a separate level lends consistency to the model.

H. Scanner

Recall that the Scanner includes the cursor. For a document on screen, the cursor provides a means for navigation, including for reading data from and writing data to the document. At any particular time, the Scanner is pointing to a specific location in the document (database); the document is, as previously described, maintained as a tree structure. At any particular time, therefore, the Scanner points to a particular location in the tree, such as a record, field, sequence, or the like. Accordingly, the class defined for Scanner includes methods for navigating up and down levels of the tree, as well as across nodes at a particular level. In an exemplary embodiment, a Scanner class may be constructed as follows:

```
// Abstracted class definition for Document scanner
// (cursor abstraction).
...
class Scanner {
public:
    // Vertical navigation.
    BOOL    ToField (FIELDNO n);         // Down to lower level.
    VOID    ToFather ();                  // Up to higher level.
    // Horizontal navigation.
    BOOL    ToRecNo (RECNO r);
    BOOL    ToNextRecord ();
    BOOL    ToPrevRecord ();
    // Geometric navigation.
    BOOL    ToY (Y yS, Y y, RECNO& r, Y& yR);
    BOOL    FindY (Y yS, Y y, RECNO& r, Y& yR);
    RECNO   CountRecords ();              // In current Sequence.
                                          // Data modification.
    BOOL    InsertNewRecord (Message& m);
    VOID    EditRecord ();
    BOOL    DeleteRecord (Message& m);
    BOOL    DeleteAllRecords (Message& m);
    VOID    Read (Value*& v);   // Read/Write atomic value.
    BOOL    Write (Value* v, Message& m);
    BOOL    PostRecord (Message& m, BOOL bEndMode = TRUE);
    VOID    UndoPostRecord (RECNO& r);
};
```

The first method, ToField, navigates to the nth field for a given record; the target field may be an Atom or a Sequence, for instance. The ToField method, therefore, navigates vertically—dropping down one level. In a corresponding manner, the ToFather method navigates upwardly, taking the Scanner up to a higher level. If, for instance, the Scanner is currently pointing to an atomic level (e.g., Number Field), ToFather takes the Scanner up one level to the record which contains that Number field. Repeating the ToFather method again takes the Scanner up to the Sequence, in which that record is included.

The next three class methods, which assume the cursor is positioned at a record, navigate horizontally. Specifically, ToRecNo position the Scanner to the record specified by the record number passed as a parameter. ToNextRecord positions the Scanner at the next record. Complementing this is ToPrevRecord, which positions the Scanner at the previous record. Although these cursor primitives appear similar to cursor primitives for navigating conventional databases, their functionality is in fact quite different. In particular, the methods of the present invention navigate records by jumping from one record node in a tree to a sibling node. Conventional navigation techniques, in contrast, are fairly simple, as they need only deal with flat tables.

In addition to navigation by record, the class includes methods for geometric navigation. Instead of navigating a document record-by-record, for instance, a user might want to navigate page-by-page. Accordingly, Scanner includes the previously-described ToY and FindY methods. Ultimately, calls to these primitives are passed to the corresponding B-tree object (which provides specific implementation for these methods). Note that there is nothing in conventional databases analogous to these geometric navigation primitives. More particularly, conventional databases do not maintain structures of varying geometry. Even a graphical form from a conventional database has no variable geometry; instead, fixed slots (with or without scrollbars) are employed, as previously described. The unification of forms and reports in the system of the present invention necessitates these navigation methods which can handle geometry as well as structure.

Next, the CountRecords method returns the number of records for the current Sequence (which the cursor is positioned at before calling the method). This, in turn, translates into a call to the B-tree for determining the number of records (i.e., record nodes). If the cursor were positioned in a Detail Table having four records, for example, the CountRecords method would return 4.

Following the CountRecords method is a collection of data modification methods. InsertNewRecord method opens up a blank record at the current position. EditRecord allows modification of an existing record (as opposed to a new one). DeleteRecord simply deletes the current record. DeleteAllRecords deletes all records for the current Sequence. The Read and Write methods are provided for reading and writing atomic values. These are employed when the cursor is positioned at an Atom (e.g., field). When a record is first displayed or later refreshed, the Read method is invoked for reading the data associated with the record. Conversely, if the user modifies the data, the Write method is called to write the data back to the database. Collectively, the Read and Write methods provide an interface to the Data Repository 1630. The physical organization of the Data Repository itself is hidden (transparent) at the level of the Scanner.

Finally, PostRecord and UndoPostRecord are provided for posting or undoing user modifications to a Record. PostRecord returns a boolean for indicating whether the method completed successfully. If the user attempts to post a record which violates a validity check, for instance, the method will not post the changes but would simply return FALSE.

I. Incremental Maintenance of Views

Consider an example of a View of a stored document. Suppose the View includes a selection criterion, such as Count>3 (shown in FIG. 8I). The View is maintained by tree structures which store pointers to the records in the base document. As previously described, if a change is made to the base document, the system generates a message which is propagated to the View. The message includes, as part of it, the key (i.e., key value) which uniquely identifies that record in the base document. Upon receiving such a notification, the View determines whether that changed record (as is uniquely identified by its key value) is present in the View, in the first place. If that record is present in the View, the View must then determine whether the change causes that record to be deleted from the View. As previously described, this maintenance notification occurs regardless of whether the View is currently active on the screen (so that responsiveness and consistency of the system are maintained). Upon occurrence of a change to the base document, therefore, all views dependent upon that base document are updated accordingly.

Specific processing of the message occurs as follows. Upon receiving the notification, the View looks up the record in the View which corresponds to the changed record in the base document; this lookup is effected through the key (which may be the record number). In the event that the record is not in the View in the first place, the View would have to make further determination of whether to now insert the record into the View (e.g., as a result of it now meeting the user criterion). Thus the View must decide whether to remove the record from the View (if it no longer satisfies the selection criteria), or conversely to add the record to the View (if it now does satisfy the selection criteria). Similar determinations are made by the View in cases where a record is inserted or deleted from the base document.

Having updated the View, the system is not finished, however. Specifically, other views may depend on that View, thus the change in the View must be propagated to other dependent views. All told, the process ripples through to the last dependent view.

In addition to the propagation of data modifications, design changes also propagate. If a user changes the design of a View, such as specifying a new selection criterion, that View is updated as well as all views dependent upon that View. Again, this is all done automatically, so that the user is unaware of the process.

Contrast this approach to that of a dynaset or "live" answer table. Although a dynaset includes storage having pointers to corresponding records in the base table, the dynaset is not updated automatically when a change is made to the base table. Moreover, the dynaset approach is ill-suited for use as a live view. In particular, that approach would require re-executing the query for each modification to the base table. The resource and time requirement for re-executing the query makes this approach impractical. The incremental maintenance approach of the present invention, in contrast, handily solves the problem of providing a live view, yet does not entail resource-impractical operations (e.g., re-executing queries for each modification).

Figure 19:
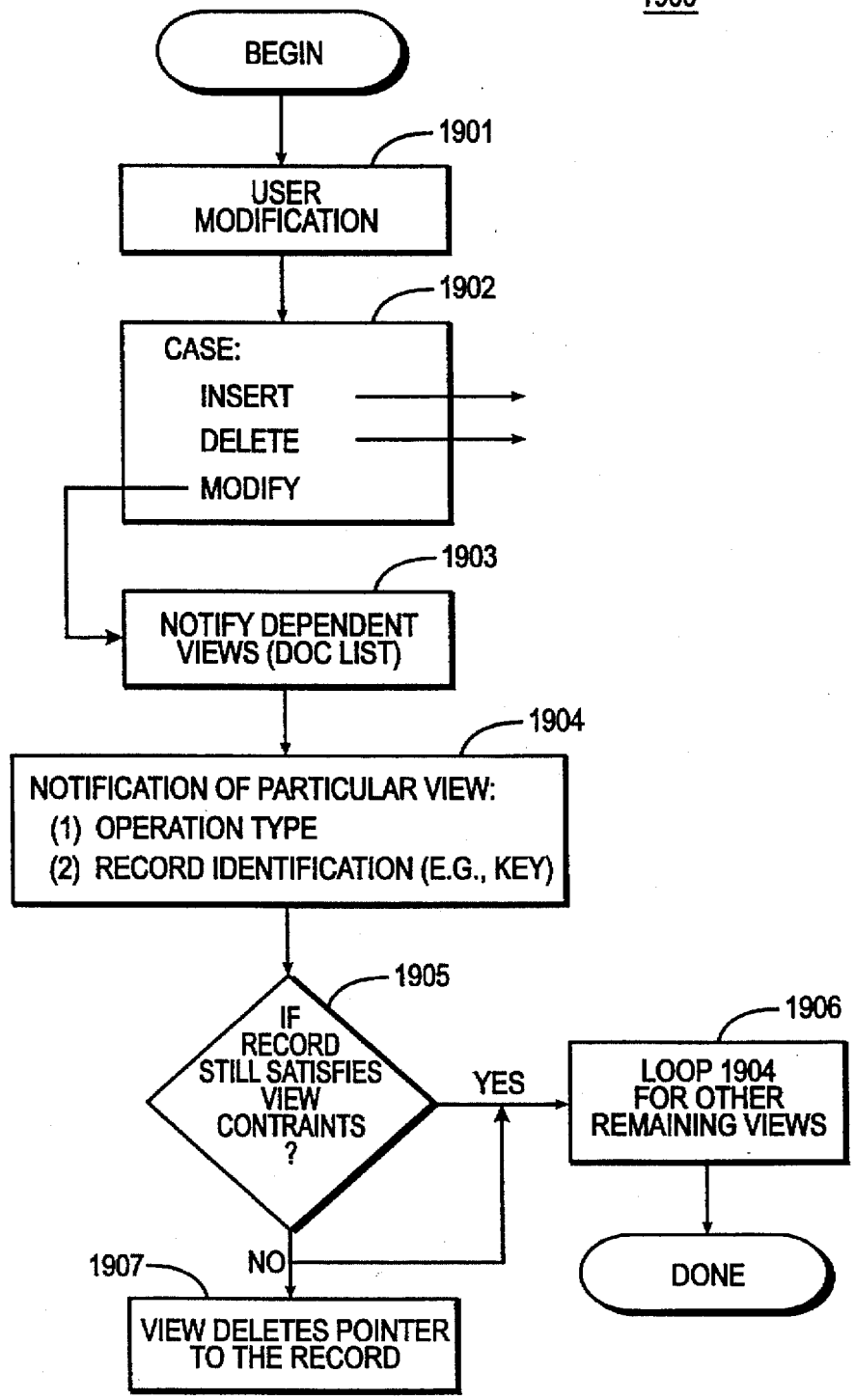
FIG. 19 is a flowchart illustrating a method of the present invention for incremental maintenance of live views.

FIG. 19 is a flowchart 1900 illustrating the method of the present invention for incremental maintenance of views. At step 1901, a user modification occurs, such as the user changing data in a field of a particular record. At step 1902, the method will follow a particular branch of logic, based on whether the user modification was an "Insert," "Delete," or "Modify" operation. The remaining steps of the method will be illustrated by following the "Modify" case arm, which includes elements of both "Insert" and "Delete."

The document which was modified has a list of views (Doc List) which are dependent on it. These dependents are notified at step 1903. Step 1904 illustrates notification of a particular view. Here, the View is notified what operation type occurred (e.g., Insert, Delete, or Modify), as well as identification (e.g., key and/or record number) of the affected record.

At step 1905, the method checks whether the modified record still satisfies the View constraints. If "Yes" at this step, then at step 1906 the method loops back to step 1904 for processing of other remaining views; if no other views remain at this point, the method is done. In other words at step 1905, if the record still satisfies the View constraint then that particular View need not be changed (other than refreshing the particular data value which has changed). If, on the other hand, the record does not still satisfy the View constraint at step 1905, then the method proceeds to step 1907 where the View (which itself is stored as a tree) deletes the pointer to the record, thereby removing it from the View. Thus, step 1907 leads to deletion of the entry in the View (i.e., B-tree pointer) which corresponds to the record. At the completion of this step, the method will loop back to 1904 for any other remaining views, or terminate in the case of no remaining views.

Consider a user modification which keeps a particular record in a View yet changes the associated record geometry, such as an operation where the user adds a substantial amount of text to a text field of a particular record. Recall that the View stores in its B-tree the geometry associated with the record. If this geometry is modified (e.g., record grows larger), the B-tree is updated with the new geometry. More particularly, the path which leads to this particular record is recalculated using the new geometry for the record. In a corresponding manner, the stored geometry at each level in the B-tree is updated to reflect the change. Since only the path for the record is refreshed, the process is particularly efficient—there is no need to globally recalculate the effect on the View.

In a like manner, if a record is inserted or deleted, the geometry along the path associated with the record is refreshed accordingly. Again, the operation is particularly efficient, since only a single path through the tree need be traversed.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system having a database storing a plurality of data records, a method for creating a "live" report of said database, the method comprising:
    (a) for each data record, storing with the database information describing record geometry required for presenting each said data record in the report;
    (b) receiving a request for displaying a certain page of the report;
    (c) converting said request for displaying a certain page of the report into a request for displaying a portion of the report located at a certain distance from one end of the report wherein said certain distance is computed from: (page number for said certain page)×(distance of printable area of each page);
    (d) determining from said stored record geometries which particular data records fall on said certain page; and
    (e) presenting the report to a user by rendering on a display device said particular data records determined in step (c) to fall on said certain page.

2. The method of claim 1, wherein said record geometry comprises volume required for displaying a particular record in the report.

3. The method of claim 1, wherein said record geometry comprises a height required for displaying a particular record in the report.

4. The method of claim 1, wherein step (a) includes:
    storing a B-tree with said database, said B-tree having leaf nodes pointing to particular database records in the database, and wherein each node in the B-tree stores an accumulated record geometry for records of nodes beneath it.

5. The method of claim 4, wherein each node in the B-tree also stores an accumulated record count for records of nodes beneath it.

6. The method of claim 4, wherein step (c) includes:
    determining which record lies at said certain page by:
    (i) traversing said B-tree for accumulating record volumes stored at nodes of the B-tree, and
    (ii) upon accumulating sufficient record volumes which at least equal a distance to said certain page, reading from the B-tree the record number pointed to by the B-tree at that accumulated volume.

7. The method of claim 6, wherein substep (i) includes:
    starting from a root node of the B-tree, traversing nodes of the B-tree until accumulated record volumes stored by nodes which have been traversed meet or exceed a volume required to reach said certain page of the report.

8. The method of claim 1, wherein no data record is allowed to straddle a page boundary of the report.

9. The method of claim 1, further comprising:
    receiving user input for modifying a particular data record; and
    in response to said user input, updating the information describing record geometry required for presenting said particular data record.

10. The method of claim 9, further comprising:
    re-determining from the updated stored record geometries which particular data records fall on said certain page; and updating presentation of the report, so that said certain page continues to be displayed with correct data records.

11. In a computer system having a database storing a plurality of data records, a method for creating a "live" report of said database, the method comprising:
(a) for each data record, storing in a B-tree information describing record geometry for presenting each said data record in the report, said b-tree comprising a plurality of nodes, each node storing an accumulated record count together with an accumulated record geometry for records of nodes beneath said each node
(b) receiving a request for displaying a certain page of the report;
(c) determining which particular data records fall on said certain page by traversing the B-tree for accumulating record geometries having a distance equal to or greater than a distance from said certain page from one end of the report; and
(d) presenting the report to a user by rendering on a display device said particular data records determined in step (c) to fall on said certain page.

12. The method of claim 11, wherein said step (c) further includes:
storing a running total of accumulated record geometries; as each node is visited, adding the record geometries stored by the node to said running total so long as the running total does not exceed the distance from said certain page from one end of the report.

13. The method of claim 11, wherein said record geometry comprises a width required for displaying a particular record in the report.

14. The method of claim 11, wherein said record geometry comprises width and height required for displaying a particular record in the report.

15. The method of claim 11, wherein each data record comprises a plurality of data fields, at least some of the data fields storing a variable amount of database information.

16. The method of claim 15, wherein each data record further comprises a variable number of nested detail data records.

17. The method of claim 16, wherein each nested detail data record itself comprises a plurality of data fields.

18. In a computer system having a database storing a plurality of data records, a method for creating a "live" report of said database, the method comprising:
(a) for each data record, storing with the database information describing record geometry required for presenting each said data record in the report;
(b) receiving a request for displaying a certain data record on the report;
(c) determining from said stored record geometries on which particular page of the report said certain data record falls by traversing the B-tree for accumulating record counts until a record count is reached which is equal to said certain data record, storing a running total of accumulated record geometries, and, as each node is visited, adding the record geometries stored by the node to said running total so long as the running total does not exceed the distance from said certain page from one end of the report; and
(d) presenting the report to a user by rendering on a display device said particular page determined in step (c) to be the particular page on which said certain data record falls.

19. The method of claim 18, wherein said record geometry comprises volume required for displaying a particular record in the report.

20. The method of claim 18, wherein said record geometry comprises a height required for displaying a particular record in the report.

21. The method of claim 18, wherein step (a) includes:
storing a B-tree with said database, said B-tree having leaf nodes pointing to particular database records in the database, and wherein each node in the B-tree stores an accumulated record geometry, for records of nodes beneath it.

22. The method of claim 21, wherein each node in the B-tree also stores an accumulated record count for records of nodes beneath it.

23. The method of claim 22, wherein step (c) includes:
determining on which page said certain data record falls by:
(i) traversing said B-tree for accumulating record counts stored at nodes of the B-tree, and
(ii) upon accumulating a record count which is equal to a record number for said certain data record, reading from the B-tree the accumulated volume pointed to by the B-tree at that accumulated record count.

24. The method of claim 23, wherein substep (i) includes:
starting from a root node of the B-tree, traversing nodes of the B-tree until accumulated record counts stored by nodes which have been traversed equal a record number required to reach said certain data record of the report.

25. The method of claim 18, wherein no data record is allowed to straddle a page boundary of the report.

26. The method of claim 18, wherein step (b) includes converting said request for displaying a certain data record of the report into a request for displaying a portion of the report at a location positioned a certain number of data records from one end of the report.

27. The method of claim 26, wherein said certain data record is specified by a record number for said data record, said record number indicating a position for said data record in said database relative to all data records.

28. The method of claim 18, further comprising:
receiving user input for modifying a particular data record; and
in response to said user input, updating the information describing record geometry required for presenting said particular data record.

29. The method of claim 28, further comprising:
re-determining from the updated stored record geometries on which particular page of the report said certain data record falls; and
updating presentation of the report, so that said certain data record continues to be displayed on the correct page of the report.

30. The method of claim 18, wherein said record geometry comprises a width required for displaying a particular record in the report.

31. The method of claim 18, wherein said record geometry comprises width and height required for displaying a particular record in the report.

32. The method of claim 18, wherein each data record comprises a plurality of data fields, at least some of the data fields storing a variable amount of database information.

33. The method of claim 32, wherein each data record further comprises a variable number of nested detail data records.

34. The method of claim 33, wherein each nested detail data record itself comprises a plurality of data fields.

* * * * *